US007218809B2

(12) United States Patent
Zhou et al.

(10) Patent No.: US 7,218,809 B2
(45) Date of Patent: May 15, 2007

(54) INTEGRATED PLANAR COMPOSITE COUPLING STRUCTURES FOR BI-DIRECTIONAL LIGHT BEAM TRANSFORMATION BETWEEN A SMALL MODE SIZE WAVEGUIDE AND A LARGE MODE SIZE WAVEGUIDE

(75) Inventors: Yan Zhou, Pleasanton, CA (US); Seng-Tiong Ho, 120 Picardy La., Wheeling, IL (US) 60090

(73) Assignee: Seng-Tiong Ho, Wheeling, IL (US)

( * ) Notice: Subject to any disclaimer, the term of this patent is extended or adjusted under 35 U.S.C. 154(b) by 0 days.

(21) Appl. No.: 11/216,758

(22) Filed: Aug. 31, 2005

(65) Prior Publication Data

US 2006/0062521 A1 Mar. 23, 2006

Related U.S. Application Data

(63) Continuation of application No. 10/083,674, filed on Oct. 19, 2001, now abandoned.

(60) Provisional application No. 60/242,213, filed on Oct. 20, 2000.

(51) Int. Cl.
*G02B 6/26* (2006.01)
*G02B 6/42* (2006.01)

(52) U.S. Cl. .......................................... 385/28; 385/43

(58) Field of Classification Search .................. 385/27, 385/28, 43, 49, 122, 124, 146, 129–132
See application file for complete search history.

(56) References Cited

U.S. PATENT DOCUMENTS 4,152,044 A 5/1979 Liu ............................ 385/131

(Continued)

*Primary Examiner*—Sung Pak
*Assistant Examiner*—Daniel Petkovsek
(74) *Attorney, Agent, or Firm*—Brinks Hofer Gilson & Lione

(57) ABSTRACT

Composite optical waveguide structures or mode transformers and their methods of fabrication and integration are disclosed, wherein the structures or mode transformers are capable of bi-directional light beam transformation between a small mode size waveguide and a large mode size waveguide. One aspect of the present invention is directed to an optical mode transformer comprising a waveguide core having a high refractive index contrast between the waveguide core and the cladding, the optical mode transformer being configured such that the waveguide core has a taper wherein a thickness of the waveguide core tapers down to a critical thickness value, the critical thickness value being defined as a thickness value below which a significant portion of the energy of a light beam penetrates into the cladding layers surrounding the taper structure thereby enlarging the small mode size. This primary tapered core structure may be present in either a vertical or horizontal direction and may be combined with further up taper or down taper structures in the directions transverse to the primary taper direction. Another aspect of the present invention is directed to a non-cylindrical graduated refractive index (GRID) lens structure. The non-cylindrical GRIN structure has a graded refractive index having a maximum value at its core and a minimum value at its outer edges. The grading of the refractive index is provided in a either the vertical or horizontal directions and may have either a fixed refractive index or a graded refractive index in the transverse directions. Yet another aspect of the present invention is directed to composite optical mode transformers that are combinations of the taper waveguide structures and the non-cylindrical graduated refractive index structures. Yet another aspect of the present invention is the further integration of the mode transformers with V-grooves for multiple input/output fibers and alignment platform for multiple input/output photonic chips or devices.

23 Claims, 59 Drawing Sheets

Top view

U.S. PATENT DOCUMENTS

| | | | | |
|---|---|---|---|---|
| 4,919,504 | A | 4/1990 | Colas et al. | 385/130 |
| 5,217,749 | A | 6/1993 | Denton et al. | 427/488 |
| 5,259,049 | A | 11/1993 | Bona et al. | 385/50 |
| 5,276,693 | A | 1/1994 | Long et al. | 372/6 |
| 5,515,464 | A | 5/1996 | Sheem | 385/49 |
| 5,719,973 | A | 2/1998 | Monroe et al. | 385/34 |
| 5,930,423 | A | 7/1999 | Chen et al. | 385/49 |
| 6,052,397 | A | 4/2000 | Jeon et al. | 372/46 |
| 6,181,722 | B1 | 1/2001 | Dutting et al. | 372/45 |
| 6,369,984 | B1 * | 4/2002 | Sato | 385/43 |
| 6,631,225 | B2 * | 10/2003 | Lee et al. | 385/28 |
| 6,697,551 | B2 * | 2/2004 | Lee et al. | 385/28 |
| 2003/0118310 | A1 * | 6/2003 | Steinberg et al. | 385/132 |

* cited by examiner

Top view

Mask top view

Side view

Photoresist pattern top view

Si tapered down/narrow section top view

Top view

Photoresist pattern top view

Si tapered up/wide section top view

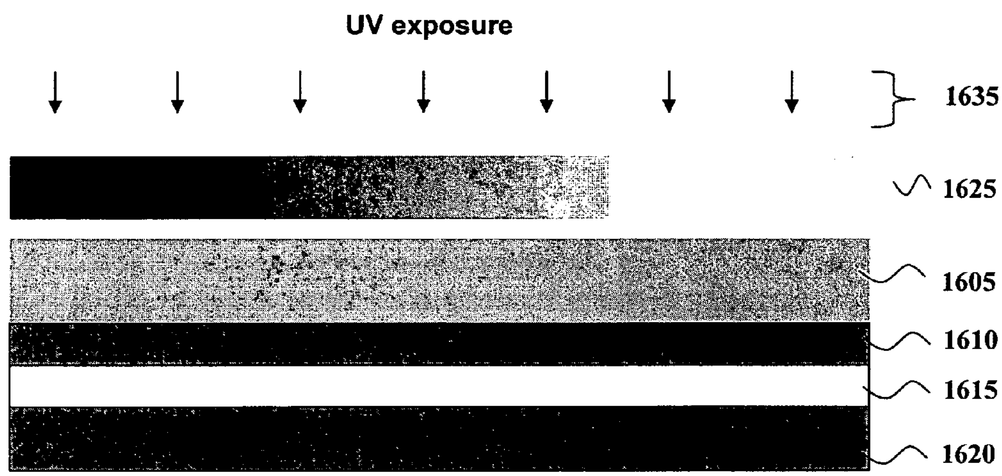
Side view-Fig 24A
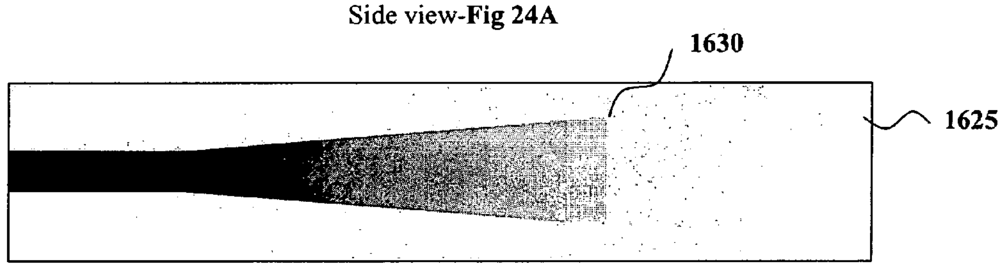
Mask top view-Fig 24B
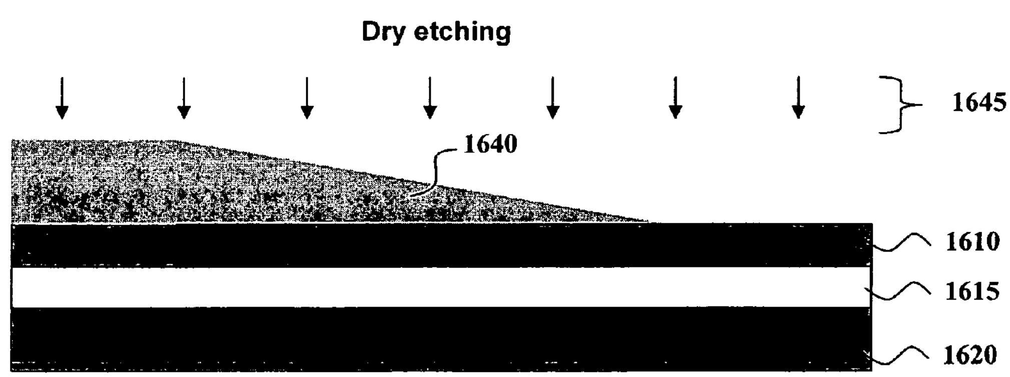
Side view-Fig 24C

Photoresist pattern top view-Fig 24D

Side view-Fig 24E

Si tapered up/wide section top view

1700 side view top view top view side view

Cross sectional view

Cross sectional view

Cross sectional view

Cross sectional view top view side view

Cross sectional view

Cross sectional view

1900

Side view

Top view

Side view

Top view

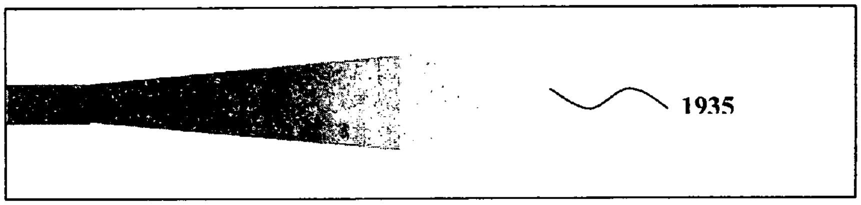
Mask top view Fig 36G
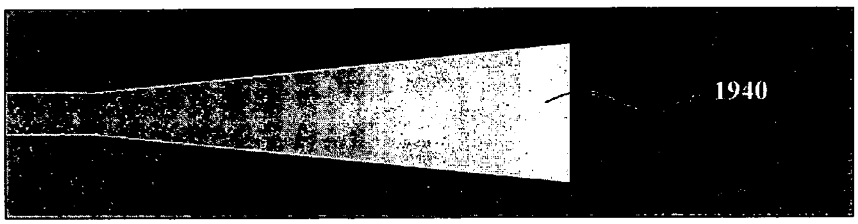
Photoresist pattern top view Fig 36H
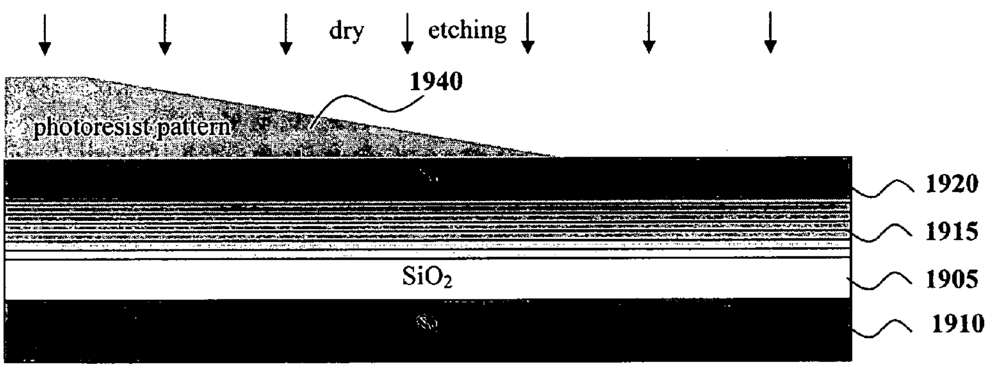
Side view Fig 36I
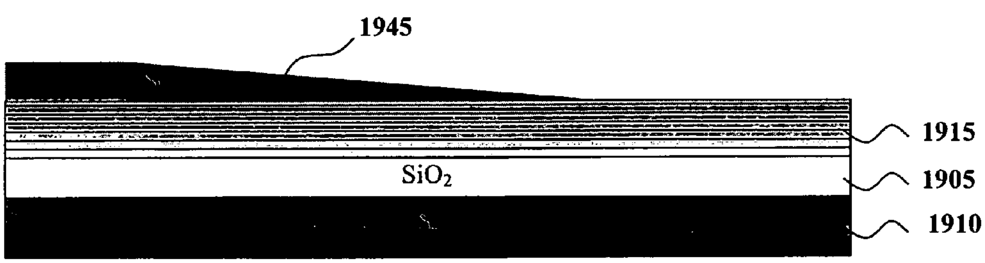
Side view Fig 36J Top view Side view Mask Top view Mask top view photoresist pattern top view Side view Side view Top view Side view Mask Top view Top view

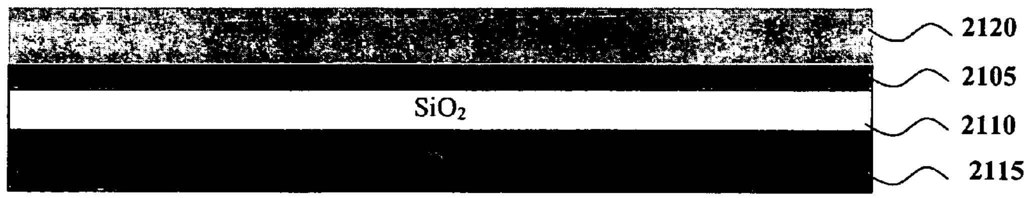
Fig 42A
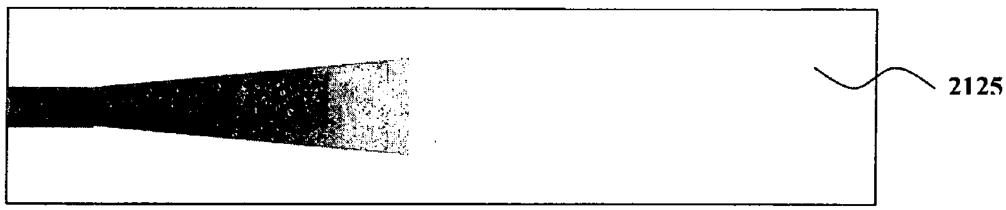
Mask top view Fig 42B
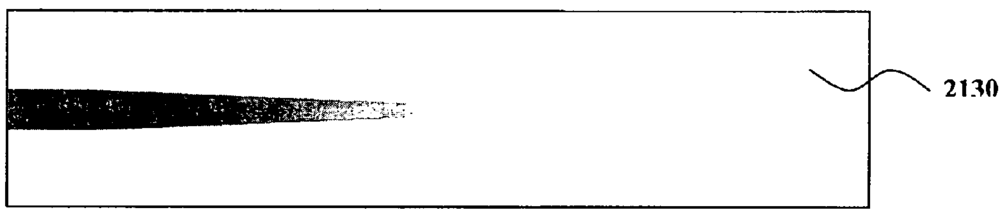
Mask top view Fig 42C
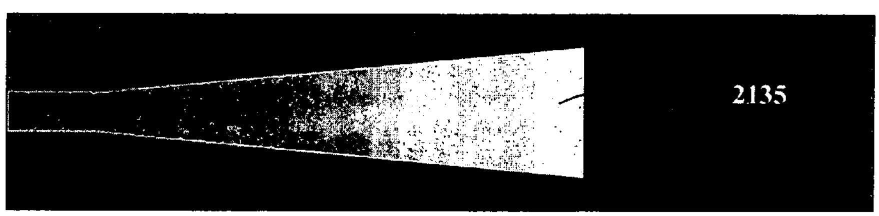
photoresist pattern top view Fig 42D
photoresist pattern top view Fig 42E Side view Side view Top view Top view Side view mask mask Top view Top view- Fig 42N

INTEGRATED PLANAR COMPOSITE COUPLING STRUCTURES FOR BI-DIRECTIONAL LIGHT BEAM TRANSFORMATION BETWEEN A SMALL MODE SIZE WAVEGUIDE AND A LARGE MODE SIZE WAVEGUIDE

CROSS REFERENCES TO RELATED APPLICATIONS

This application is a continuation of U.S. patent application Ser. No. 10/083,674, filed Oct. 19, 2001 now abandoned, and this application also claims the benefit of U.S. Provisional Application 60/242,213, filed Oct. 20, 2000, entitled, MULTIPORT INTEGRATED COUPLER FOR BI-DIRECTIONAL LIGHT BEAM TRANSFORMATION BETWEEN A SMALL SIZE WAVEGUIDE AND A LARGE SIZE WAVEGUIDE, the entire contents of which applications are hereby incorporated by reference in their entirety as if set forth in full in this document.

BACKGROUND OF THE INVENTION

1. Field of the Invention

The present invention relates, in general, to optical structures that enable optical beam transformation between a large-mode-size waveguide and a small-mode-size waveguide, and methods of making the same. In particular, the present invention relates to methods for transforming the optical mode between a photonic device and one or more optical fibers. The present invention also relates, in particular, to the integrated fabrication of such structures on a module platform or the photonic device, their connections with one or more input/output optical fibers.

2. Description of the Related Art

The current strong demand for bandwidth over the Internet has resulted in great demand for photonic device components in optical communications and data or information processing. These device components include fiber optics, non-linear crystal optics, and integrated optics in such material systems as dielectrics, polymers, optical crystals, and semiconductors (also called electro-optic or optoelectronic systems).

Optical-crystal and dielectric-material-based discrete optical components such as $LiNbO_3$-based-modulators, glass ion-exchange-based optical power splitters and flame-hydrolysis-deposited silica-on-silicon multiplexers/demultiplexers, can play certain roles, but their sizes are generally large and their functions are limited. Hence, in the long run, it is very unlikely that they can compete with waveguide based photonic devices such as Photonic Integrated Circuits (PICs), which can be made very small and also multifunctional with high packing density similar to today's large scale integration of microelectronic circuits.

Waveguides are used for inputting and out putting light energy for such photonic devices to optical fibers. The input/output waveguides in a photonic device are typically made up of dielectric or semiconductor materials. A photonic device may contain one or more such input/output waveguides. Unless otherwise specified, such input/output optical waveguides will be referred to as device waveguides below.

In spite of the promise of waveguide based photonic devices, in general, and photonic integrated circuits, in particular, however, several challenges remain. One challenge is at the optical interface. Light must be efficiently coupled, with high precision and stability, between drastically dissimilar components and materials, in a cost effective, manufacturable way. There are several issues that need to be addressed with respect to this challenge, including the following:

(1) The drastically different spot or mode profile in terms of size and symmetry between a fiber and a photonic device waveguide.

(2) The difficulty in the alignment of a fiber and a photonic device waveguide, as well as of any other intermediate component such as a ball lens.

(3) The difficulty of coupling multiple fibers to a photonic device with multiple device waveguides efficiently in a cost effective way.

Prior-art efforts addressing each of these challenges are summarized below.

(1) Prior Art in Dealing with the Mode-Size Conversion Issue

With regard to mode-size conversion, in order to ensure single-mode operation (as required for high-speed, large-capacity optical signal manipulation), the dimension of a device waveguide is typically one order of magnitude less than that of a silica fiber waveguide. The result is a substantial mode-field mismatch between these two waveguides. As shown in FIGS. 1(*a*) and (*b*), for optimal performance, the mode profile of a single-mode optical fiber 110 is circular, and its size is generally about 5 to 10 μm in diameter, whereas the mode profile of a photonic device waveguide 120 is elliptical and its dimension is typically less than 1 to 3 μm—as small as 0.2 μm for high-density photonic integrated circuits.

Various methods are currently used for transforming the optical modes between an optical fiber and a device waveguide. These methods are broadly summarized below.

Method 1—Butt-Coupling Method

The simplest coupling arrangement is a direct butt-joining between a fiber and a semiconductor laser (or other semiconductor waveguide) as shown in FIG. 2. Since light is only required to couple in one direction—i.e., from the laser 210 to the fiber 220—one can adjust the gap distance 230 to allow the divergent cone of light 240 to expand and roughly match the size of a fiber core 250. One problem with this approach is the relatively low coupling efficiency caused by the large divergence angle and the fact that a fiber can only capture and guide a narrower cone of light within a small capturing angle. As a result, the typical coupling efficiency for a direct butt-joining is less than 5–30% depending on the size of the device waveguide. In spite of the low coupling efficiency, this technique is being explored by NEC of Japan (among others) for low-cost mass packaging of transceivers because this technique requires the fewest of components, which minimizes component cost. (Kenji Yamauchi et al., "Automated mass production line for optical module using passive alignment technique," 50th Electronic Components and Technology Conference, May 21–24, 2000, Las Vegas, Nev., USA).

Method 2—Lensed Fiber or Microlens Method

A method improved over the direct butt-joining technique is to make the fiber end into a lens 310 (lensed fiber) as shown in FIG. 3 so that more light can be captured by the fiber. (Kazuhiko Kurata, "Mass production techniques for optical modules," 48th Electronic Components and Technology Conference, May 27–28, 1998, Seattle, Wash., USA). Another improved method uses a separate lens 410 placed in the gap 420 as shown in FIG. 4. Various lenses have been used, including glass ball lenses and GRIN (graded refractive index) rod lenses, as well as aspheric injection molded plastic lenses. (Keith Anderson, "Design and manufacturability issues of a co-packaged DFB/MZ module," 49th Electronic Components and Technology Conference, Jun. 2–4, 1999, San Diego, Calif., USA). With these lenses, the coupling efficiency is increased to 50% to 70% for device waveguide mode about 2 μm in size.

Method 3—Cylindrical Lenses Method

Besides geometric discontinuities between a device waveguide and an optical fiber, the imperfect coupling efficiency results also in part from the elliptical shape of the light cone emerging from a typical device waveguide such as that from a Fabry-Perot cavity semiconductor laser, which causes a non-perfect match with the circular mode pattern of the fiber. A method to correct for such elliptical or astigmatic beam shape is shown in FIG. 5, which illustrates the use of a combination of two perpendicular cylindrical lenses 510 and 520 of different focusing powers along the vertical lens (510) and lateral lens (520) directions, which can circularize the elliptical beam and theoretically increase the coupling efficiency to about 85% for a typical semiconductor laser with a mode size of about 1 μm (vertical) by 3 μm (horizontal). (Sun-Yuan Huang et al., "High coupling optical design for laser diodes with large aspect ratio," 49th Electronic Components and Technology Conference, Jun. 2–4, 1999, San Diego, Calif., USA).

Method 4—Cylindrical Lensed Fiber Method

A cylindrical lensed fiber (CLF) has also been used. (Soon Jang "Automation manufacturing systems technology for opto-electronic device packaging" 50th Electronic Components and Technology Conference, May 21–24, 2000, Las Vegas, Nev., USA). Although the coupling efficiency with the use of a CLF can be high (.about. 90%), the cost is also high because a CLF is not easy to make, and achieving high coupling efficiency also requires difficult labour-intensive alignment, as a practical matter.

Method 5—Laterally Tapered Rectangular Waveguide on Top of a Large Rectangular Waveguide Method Another approach to mode-size conversion is to place a laterally tapered rectangular waveguide on a large mode size rectangular waveguide, where light coupling between the top and the bottom waveguide occurs as a result of the top lateral taper. This method can serve the function of mode-size conversion in both the vertical and horizontal directions, but it is not well accepted in practice due to the difficulty in integrating such a structure with a device waveguide and also the cost of manufacturing such a structure. FIG. 6 shows such a polymer based waveguide structure 610 inserted between a semiconductor laser 620 and a fiber 630. (D. J. Goodwill et al., "Polymer tapered waveguides and flip-chip solder bonding as compatible technologies for efficient OEIC coupling," 47th Electronic Components and Technology Conference (ECTC), May 18–21, 1997, San Jose, Calif., USA). One difficulty in this approach is the integration of such a tapered waveguide 610 made of polymer with a laser 620 made of semiconductor material due to the large difference in their coefficients of thermal expansion and mechanical stabilities. In the case where such a structure is made of the same semiconductor material as that of the semiconductor laser, it would require the epitaxial growth of a large bottom waveguide layer and the cost will be high.

Method 6—Vertically Tapered Down Rectangular Waveguide Method

To enable easy integration, vertically tapered down semiconductor waveguide spot-size converters that squeeze the guided optical mode into the cladding have been integrated with semiconductor lasers. (Aaron E. Bond et al., "High speed packaged electroabsorption modulators for optical communications" 50th Electronic Components and Technology Conference, May 21–24, 2000, Las Vegas, Nev., USA; Y. Inaba et al., "Multiquantum-well lasers with tapered active stripe for direct coupling to single mode fiber" IEEE Photonics Technology Letters, Vol. 6, pp. 722, 1997; M. Kitamura, "Method of making a tapered thickness waveguide integrated semiconductor laser," U.S. Pat. No. 5,792,674, issued Aug. 11, 1998; Jeon et al., "Laser diode device having a substantially circular light output beam and a method of forming a tapered section in a semiconductor device to provide for a reproducible mode profile of the output beam," U.S. Pat. No. 6,052,397, issued Apr. 18, 2000). Although this method can enlarge the optical mode in the vertical direction, Problems associated with such structures include the required length of the tapered down structure that will lead to additional light propagation loss and the additional expense of III–V semiconductor materials.

2) Costs of Photonic Device Module Connection with Optical Fibers [Problem #2]

While the above-mentioned methods may be employed to transfer optical energy somewhat efficiently between an optical fiber and a device waveguide of about 2 μm in size, the approaches of these methods are costly. Typically, an enclosure is used to house the device, the discrete mode-transferring element (e.g. a ball lens), and the optical fiber, thereby forming a packaged module. To align the device waveguide to the fiber and the mode transferring module, most photonic device manufacturers are still performing manual alignment under a microscope because of the very disparate nature of the components, their high price and low product volumes. Such a process is not well suited to high-volume, low-cost production.

Existing techniques for fixing a fiber (and lens) in position with respect to a rectangular semiconductor waveguide include epoxy curing, soldering, mechanical fixture, and laser welding. In order to reduce the need for manual placement/alignment and fixing in the packaging process, efforts have been focused on automating the fixing process. For example, Newport, JDS-Uniphase and NEC are developing automatic parts-handling and assembling procedures using machine vision combined with micro-stages or micro-robots to achieve sub-micron precision (Soon Jang, "Automation manufacturing systems technology for opto-electronic device packaging," 50th Electronic Components and Technology Conference, May 21–24, 2000, Las Vegas, Nev., USA; Peter Mueller and Bernd Valk, "Automated fiber attachment for 980 nm pump module," 50th Electronic Components and Technology Conference, May 21–24, 2000, Las Vegas, Nev., USA; Kazuhiko Kurata, "Mass production techniques for optical modules," 48th Electronic Components and Technology Conference, May 27–28, 1998, Seattle, Wash., USA).

At the same time, the concept of a silicon optical bench (SiOB) on which V-grooves are wet-etched to guide the mounting or placement of photonic components including fibers, lenses, and even semiconductor chips has been well accepted; SiOBs are disclosed in several U.S. patents (e.g., Murphy, "Fiber-waveguide self alignment coupler," U.S. Pat. No. 4,639,074, issued Jan. 27, 1987; Albares et al,. "Optical fiber-to-channel waveguide coupler," U.S. Pat. No. 4,930,854, issued Jun. 5, 1990; Benzoni et al., "Single in-line optical package," U.S. Pat. No. 5,337,398, issued Aug. 9, 1994; Francis et al., "Waveguide coupler," U.S. Pat. No. 5,552,092, issued Sep. 3, 1996; Harpin et al., "Assembly of an optical component and an optical waveguide," U.S. Pat. No. 5,881,190, issued Mar. 9, 1999; Roff, "Package for an optoelectronic device," U.S. Pat. No. 5,937,124, issued Aug. 10, 1999). It is very likely that high precision automation will be combined with silicon V-groove technology to produce fiber-pigtailed or fiber-connectable photonic devices. The V-groove technology, however, still needs some alignment procedure.

In spite of the above-mentioned approaches, the current packaging cost is still very high. For example, about 70 to 80% of the total cost of any fiber-pigtailed III–V optoelectronic module such as an optical transceiver is due to its packaging. Moreover, most of the prior art has been aimed at solving the semiconductor-laser-to-fiber coupling problem, which is one-directional. For future dense wavelength division multiplexing (DWDM) optical communication systems, bidirectional multi-port devices like M×N switches will be in large demand, and the prior art is not able to provide an adequate solution.

(3) Difficulty of Current Methods for Multiple Fiber Connections [Problem #3]

The current methods are somewhat adequate for large photonic device with one input/output waveguide, they generally become difficult when more than one input/output and fibers are involved. This is because the yield for the alignment procedures referred to above rapidly decreases as the number of input and output fibers increases. This yield reduction can seriously limit the application of such coupling and packaging techniques to high-density photonic integrated circuits, for which tens to hundreds of input and output fibers are expected to be connected to a single photonic chip.

The main criteria needed for optical mode transferring methods and devices to achieve a cost-effective and efficient optical energy transfer between a device waveguide and one or more optical fibers can be more specifically described as follows:

(i) The methods and devices should be able to achieve mode size transformation from about 10 μm down to about 2 μm (for λ=1.55 μm) or in the reverse direction for typical waveguide devices.

(ii) The methods and devices should be able to achieve mode size transfer from about 10 μm to below 1 μm (for λ=1.55 μm) or in the reverse direction for more challenging waveguide devices such as high-density semiconductor photonic integrated circuit.

(iii) The methods and devices should be capable of achieving self-alignment between the photonic device and the optical fibers or other intermediate beam transferring elements. Self-alignment lends itself to low-cost manufacturing. It also allows cost-effective coupling between a photonic device and more than one optical fibers.

(iv) The methods and devices should have low optical reflection and absorption losses between the photonic device and the optical fibers.

(v) The methods and devices should have the flexibility of transferring the vertical and lateral mode size separately. This allows it to correct for beam astigmatism in the device waveguide mode.

(vi) The methods and devices should have high yield and low fabrication costs.

The current mode transformation methods can not adequately achieve the majority of criteria (i)–(vi). For example, the ball lens method can achieve (i) and (iv) but not (ii), (iii), (v) and (vi)

What is still needed in the field, therefore, are devices and methods for transferring the mode size between photonic device and one or more optical fibers that satisfy some or a majority of criteria (i) to (vi) above.

The present invention described herein overcomes the various difficulties encountered by the previous methods by the use of new optical structures referred to as integrated composite coupling structures (ICCS). The mode transformation device or mode transformer is referred to as an Integrated Composite Mode Transformer (ICMT). With the use of the new optical structures according to the present invention, disadvantages associated with prior methods are addressed.

BRIEF SUMMARY OF THE INVENTION

The integrated composite coupling structures of the present invention provide an integrated approach to optical mode transformation. The integrated approach allows fabrication of a large number of couplers using established processes used frequently in electronics industries and photonic integrated circuit industries, thereby resulting in lower fabrication cost. The composite optical structures allow the beam to be transformed differently in the vertical and lateral directions.

An embodiment of the present invention provides a planar optical structure that can transform the vertical mode size between a photonic device and an optical fiber. The size of the optical structure is small relative to the optical fiber diameter, which reduces alignment sensitivity. In one aspect of the present invention, the vertical mode transformation is achieved via the use of a micro vertical graded refractive index (μ-VGRIN) structure that is capable of beam size transformation down to below λ/1.5 (or 1 μm for λ=1.5 μm). Moreover, the μ-VGRIN structure can be fabricated according to the present invention using established process technology such as Jon-Assisted-Deposition with low cost and low optical loss.

In another aspect of the present invention, a composite structure is formed by combining a μ-VGRIN structure with a horizontal taper structure to achieve separate transformation of the horizontal and vertical beam mode sizes, thereby allowing 2-D beam transformation capable of astigmatic beam size correction. The composite structure can include a cascaded or concurrent geometry.

In yet another aspect of the present invention, an integrated composite coupling structure or its composite variants is further integrated to an alignment V-groove structure for fiber on one side and a alignment platform for photonic chip on the other side to achieve self-alignment between the photonic device, the optical fiber and the coupling structure (or its composite variants).

In yet another aspect of the present invention, μ-VGRIN structure is combined with a micro-lateral graded refractive index (μ-LGRIN) structure to achieve separate transformation of the vertical and lateral beam sizes. The μ-LGRIN structure can be fabricated with low cost and large quantity using UV-imprinting process used in the photonic industry. The composite μ-VGRIN and μ-LGRIN structure can include a cascaded or concurrent geometry.

In yet another aspect of the present invention, a high-refractive-index-contrast vertical sharp taper (HRC-VST) and dielectric structure is used for which the relative refractive index of the vertical taper material is substantially higher than that of the dielectric material. The high index contrast allows beam transformation down to about λ/15 (or 0.1 μm for λ=1.5 μm) when the taper is made up of silicon and the dielectric is made up of glass. The HRC-VST can be fabricated according to the present invention using established processes in the electronics and photonics industries with low costs.

In yet another aspect of the present invention, a composite structure is formed by combining an HRC-VST structure with either a high-refractive-index-contrast laterally gradual taper (HRC-LGT) or a μ-LGRIN structure to achieve separate transformation of the vertical and lateral beam sizes thereby allowing 2-D transformations capable of astigmatic beam size correction. The composite structure can include a cascaded or concurrent geometry.

In yet another aspect of the present invention, a HRC-VST structure or a composite variant is further integrated to a V-groove structure for fiber on one side and an alignment platform for photonic chip on the other side to achieve self-alignment between the photonic device, the optical fiber and the HRC-VST structure (or its composite variants).

In yet another aspect of the present invention, the sharp taper is in the lateral/horizontal direction, resulting in a high-refractive-index-contrast lateral sharp taper (HRC-LST) which provide beam transformation in the lateral/horizontal direction.

In yet another aspect of the present invention, a plurality of μ-GRIN structures, sharp taper structures, gradual taper structures and their composite variants are further integrated to a V-groove structure for fiber on one side and an alignment platform for photonic chip on the other side to achieve self-aligned beam transformation between a photonic chip device and more than one. optical fibers.

In yet another aspect of the present invention, a μ-GRIN structure or a sharp taper structure, or one of their composite variants is fabricated directly on a photonic device chip.

A better understanding of the features and advantages of the present invention will be obtained by reference to the following detailed description that sets forth illustrative embodiments, in which the principles of the invention are utilized, and the accompanying drawings.

BRIEF DESCRIPTION OF THE DRAWINGS

FIGS. 24A–F illustrates exemplary fabrication steps for the module of FIG. 22.

DETAILED DESCRIPTION OF THE INVENTION

Contents of Detailed Description

I. General Background and Terminology

II. General Introduction

Figure 1A:
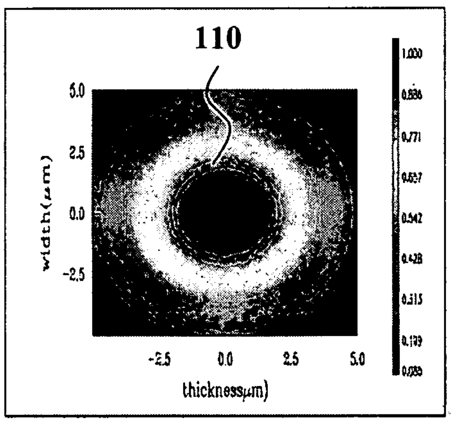
FIG. 1A illustrates the mode profile of a typical single-mode fiber.
Figure 1B:
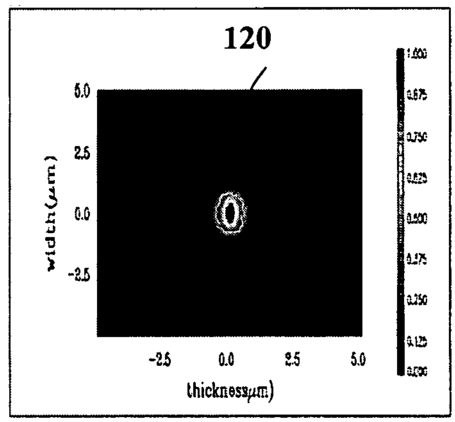
FIG. 1B illustrates the mode profile of a typical single mode III–V compound semiconductor channel waveguide.
Figure 2:
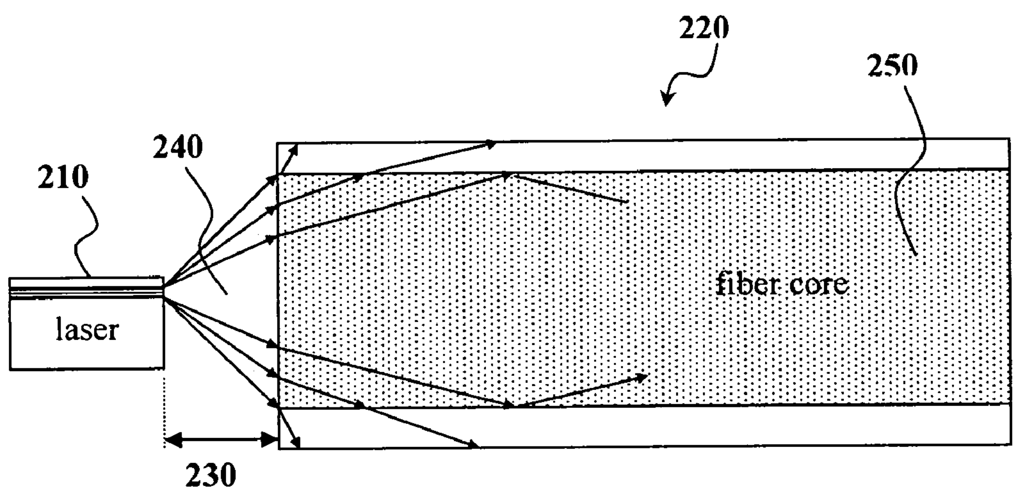
FIG. 2 shows a prior-art system in which light is transmitted directly from a semiconductor laser to a single mode optical fiber.
Figure 3:
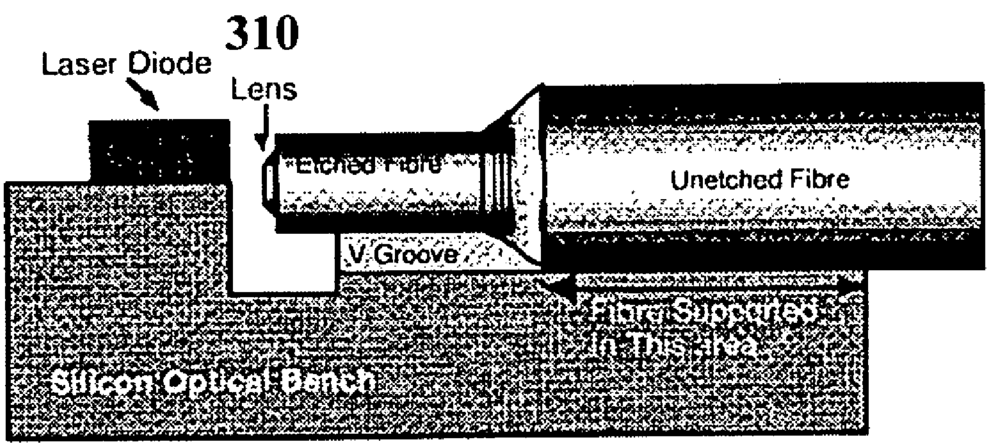
FIG. 3 shows a prior-art system in which light is transmitted from a semiconductor laser into a lensed optical fiber.
Figure 4:
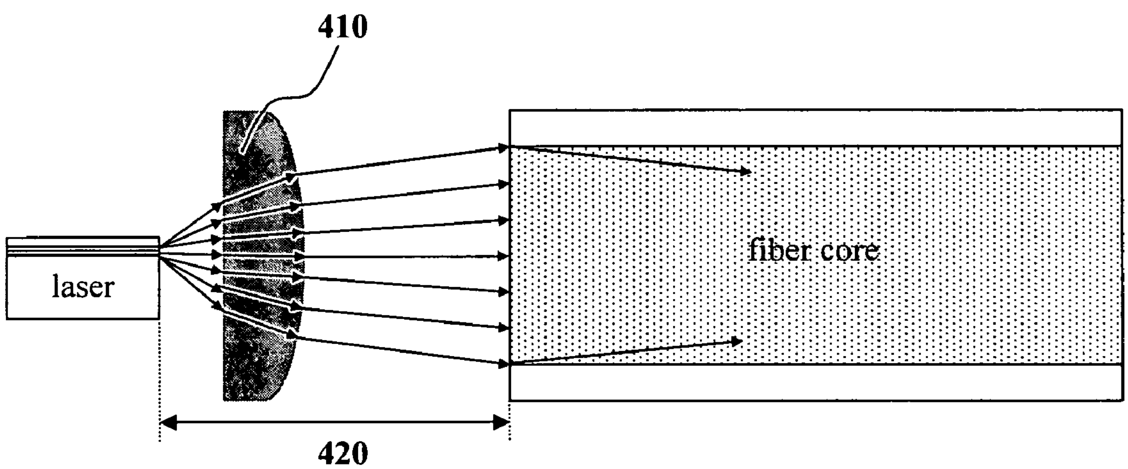
FIG. 4 shows a prior-art system in which light is transmitted via a lens from a semiconductor laser into an optical fiber.
Figure 5A:
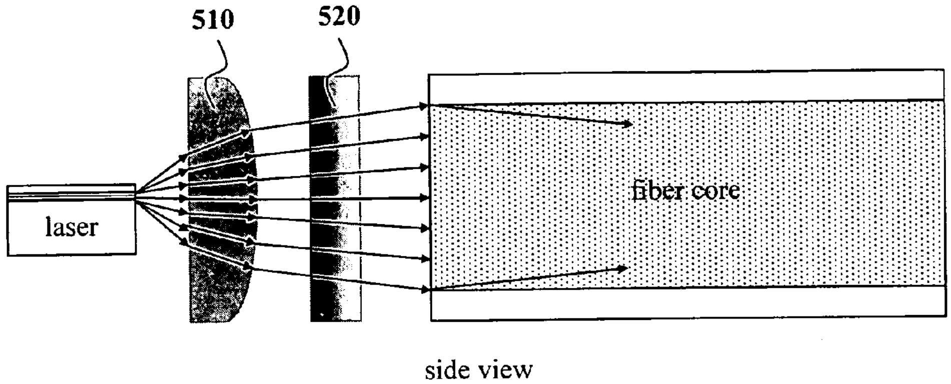
FIG. 5 shows side and top views of a prior-art system in which light is transmitted via two perpendicular cylindrical lenses of different focusing powers from a semiconductor laser into an optical fiber.
Figure 5B:
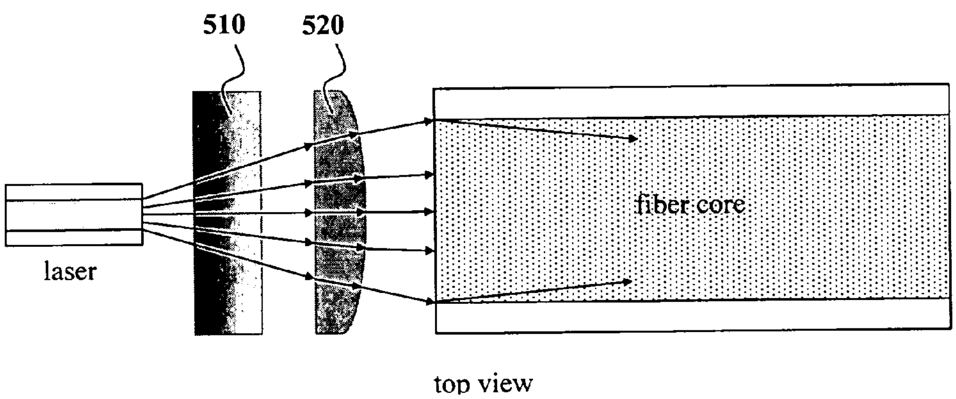
Figure 6:
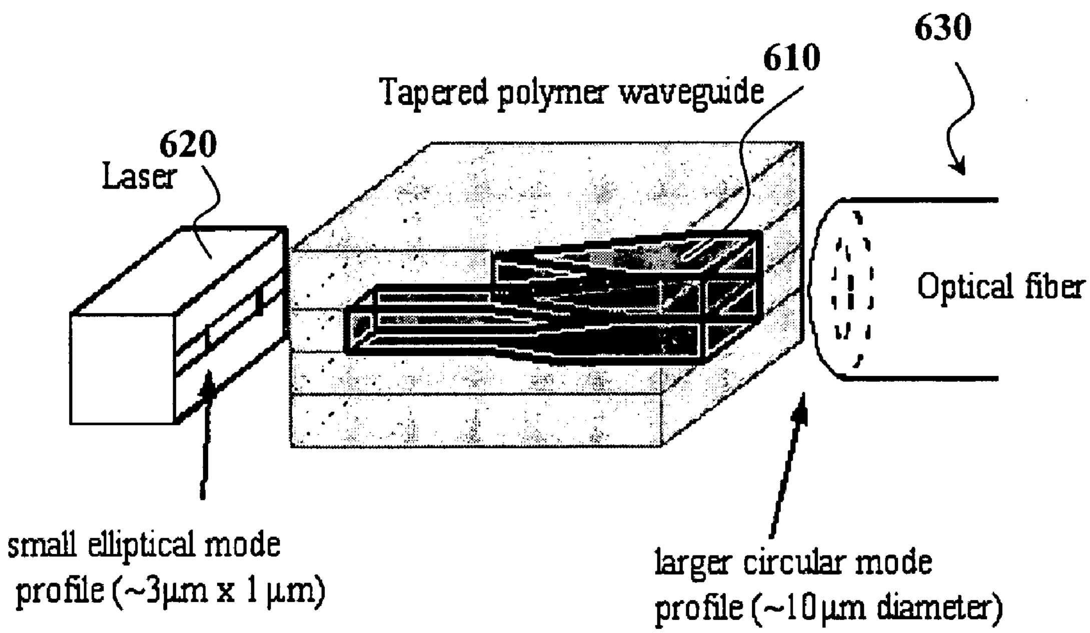
FIG. 6 shows a prior-art system in which light is transmitted via a tapered polymer waveguide from a semiconductor laser into an optical fiber.

III. Exemplary devices and embodiments (1) Exemplary device 1: a high-refractive-index-contrast vertical sharp-down-taper (HRC-VSDT) ICMT device (2) Exemplary device 2: a high-refractive-index-contrast lateral sharp-down-taper (HRC-LSDT) ICMT device (3) Exemplary device 3: a high-refractive-index-contrast-lateral gradual-up-taper (HRC-LGUT) ICMT device (4) Exemplary device 4: a vertical sharp-down-taper and lateral gradual-up-taper (VSDT×LGUT) ICMT device (5) Exemplary device 5: a lateral-step-refractive-index and vertical-step-refractive-index (LSRIN×VSRIN) ICMT device (6) Exemplary device 6:

(A) a composite-lateral-step-refractive-index and vertical-graded-refractive index (LSRIN×VGRIN) ICMT device (B) a composite-lateral-graded-refractive-index and vertical-graded-refractive index (LGRIN×VGRIN) ICMT device (7) Exemplary device 7: a vertical-sharp-down-taper-and-lateral-gradual-up- taper-cascaded-with-a-vertical-graded-refractive-index-and-lateral--step-refractive-index (VSDT×LGUT+VGRIN×LSRIN) ICMT device (8) Exemplary device 8: a vertical-sharp-down-taper-and-lateral-sharp-down- taper-embedded-in-a-symmetric-vertical-graded-refractive-index-and--lateral-graded-refractive-index (VSDT×LSDT+VGRIN×LGRIN) ICMT device (9) Exemplary device 9: a vertical-sharp-down-taper-cascaded-with-a--nonsymmetric-vertical-graded-refractive-index-(VSDT+NSVGRIN) ICMT device

(10) Variations of exemplary devices and integration of ICMT with v-grooves for fiber alignments platform for photonic chips IV. Applications Description of the Specific Exemplary Embodiments I. General Background and Terminology Described herein are various exemplary processes and embodiments of the integrated composite mode transformer (ICMT) structures of the present invention. The structures can, for example, be used to provide efficient beam transformation between a photonic waveguide device and one or more optical fibers, wherein the transformation can correct for astigmatic beam sizes in the waveguides of the photonic devices. The ICMT structures can further be placed on a platform for self-alignment with the photonic device and one or more optical fibers.

To be consistent throughout the present specification and for clear understanding of the present invention, the following background and terminological definitions are hereby provided for terms used therein:

a) Refractive Index, Optical Wavelength, Law of Reflection, Snell's Law of Refraction, Critical Angle As is well known, light is an electromagnetic wave oscillating at very high frequency. When light travels in an electrically nonconductive medium such as glass, its speed will be reduced as compared to traveling in a vacuum and the ratio of the phase velocity of light in a vacuum (c) to that in a medium (v) is the refractive index n of the medium, $$n = \frac{c}{v}$$

Due to the fact that the frequency of the wave will not change as light travels from vacuum into a medium, the optical wavelength in a medium, λ, is thus reduced to $\lambda=\lambda_0/n$, where $\lambda_0$ is the wavelength in a vacuum.

Figure 7:
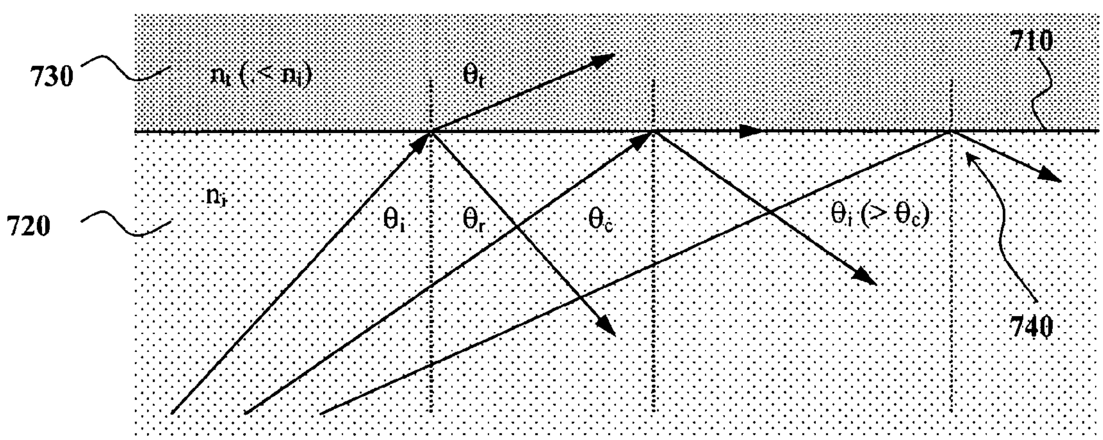
FIG. 7 shows an optical interface between two media, illustrating the principles of reflection, refraction, the critical angle, and total internal reflection.

Light can be regarded as a ray traveling in a straight line within a medium of the same refractive index if the size of the medium (such as a lens) is much greater than the wavelength. At an optical interface 710 of two different refractive indices $n_i$ and $n_t$, a light ray will be reflected back into the first medium 720 ($n_i$) and also refracted/transmitted into the second medium 730 ($n_t$) as shown in FIG. 7. Law of reflection tells us that the angle of incidence ($\theta_i$) equals the angle of reflection ($\theta_r$) and Snell's law of refraction says that the retraction angle ($\theta_t$) is related to the incidence angle ($\theta_i$) through the equation $$n_i \sin \theta_i = n_t \sin \theta_t.$$

Figure 8:
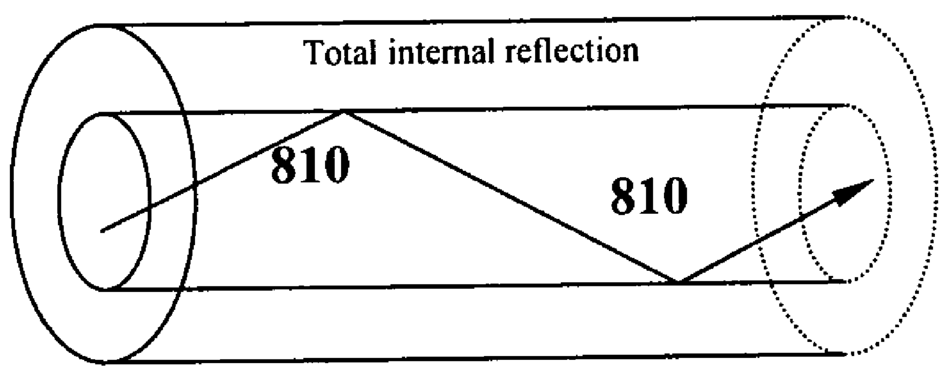
FIG. 8 illustrates a principle of light guiding in a step-index optical fiber or waveguide.

However, if $n_i > n_t$, as $\theta_i$ increases to a particular value called the critical angle, $\theta_c$ will reach 90°, and afterwards, the incident light ray will be totally reflected 740. Thus, as shown in FIG. 8, light guiding in a step refractive index optical waveguide or fiber can be explained by successive total internal reflections 810.

(b) Optical Waveguide, Planar Waveguide, Channel Waveguide

From the above, we see that an optical waveguide is made up of a material with a high refractive index, surrounded by materials with a lower refractive index. The optical energy that is guided lies primarily within the layer with high refractive index. The layer with high refractive index is called the waveguide core while the surrounding layers with low refractive indices are called the waveguide cladding. If the waveguide is in the form of a two-dimensional layered structure, it is known to those skilled in the art as a planar waveguide for which optical energy will be confined to guide along a plane. If the waveguide core is in the form of a cylindrical or rectangular or other bar type shape, it is known to those skilled in the art as a channel waveguide. While the present application is primarily directed towards channel waveguides, planar waveguides are often used to demonstrate the basic idea of the principles involved because of their simplicity.

Figure 9:
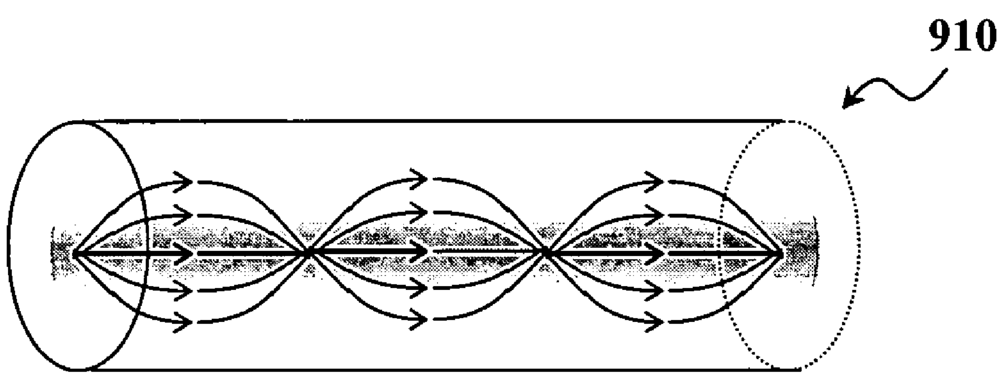
FIG. 9 illustrates a principle of light guiding in a GRIN optical fiber or waveguide.

(c) Graded Refractive Index and Related Waveguide Structures, Parabolic Distribution Periodic Focusing As shown in FIG. 9, in a graded refractive index (GRIN) optical waveguide or fiber 910, the waveguiding material has a refractive index that decreases continuously from the central axis. In this case, light rays travel through the waveguide or fiber in a fashion as shown in FIG. 9. Such a GRIN waveguide relies on refraction and not reflection, except possibly at the cladding layer.

Figure 10:
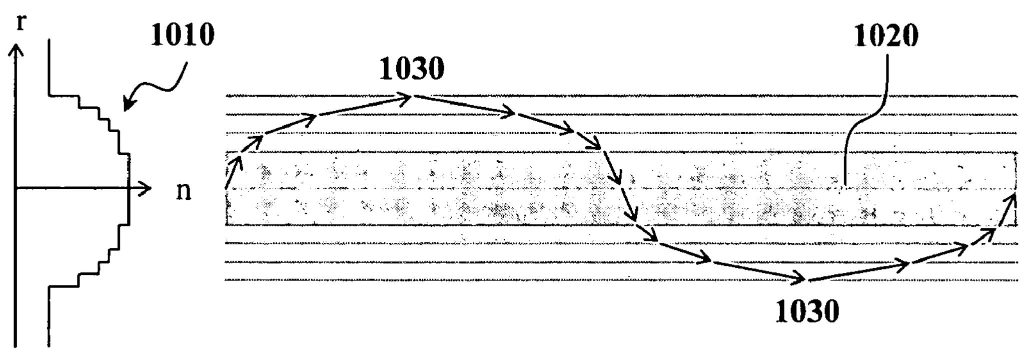
FIG. 10 illustrates a principle of approximating a continuous graded refractive index change by using a series of small refractive index steps.
Figure 11A:
FIG. 11A illustrates a planar silicon waveguide film.
Figure 11B:
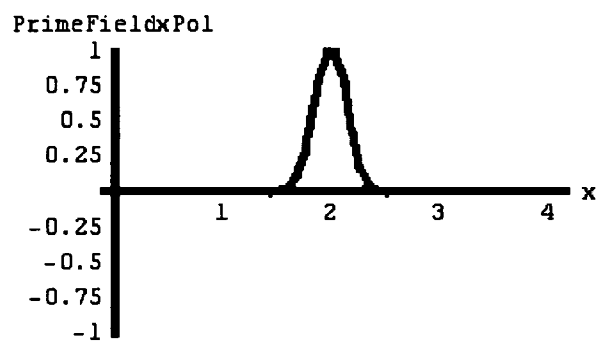
FIGS. 11B–G show a profile of the propagating mode of a silicon waveguide film with a thickness of 0.4 micron, 0.3 micron, 0.2 micron, 0.1 micron, 0.05 micron, and 0.01 micron, respectively.
Figure 11C:
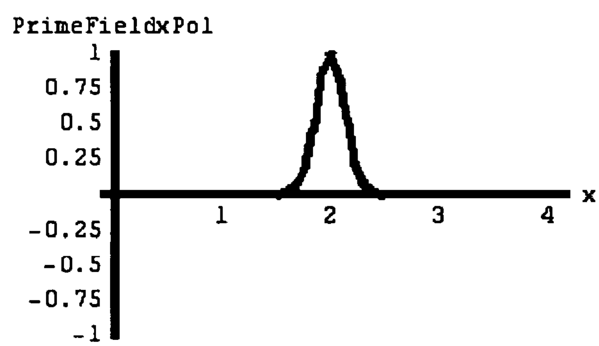
Figure 11D:
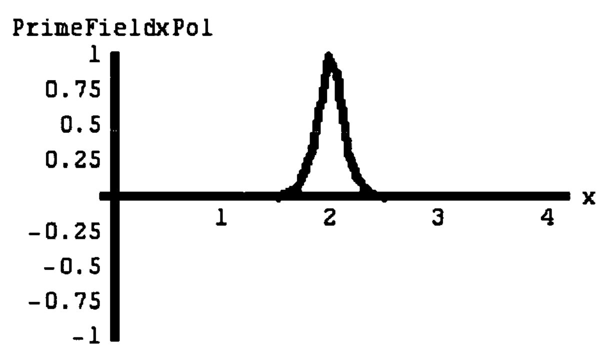
Figure 11E:
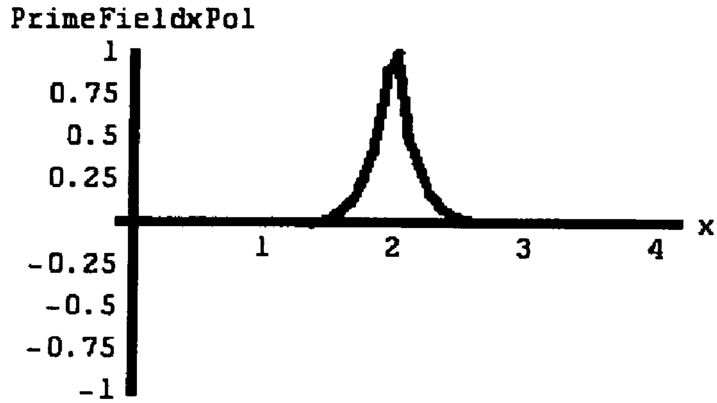
Figure 11F:
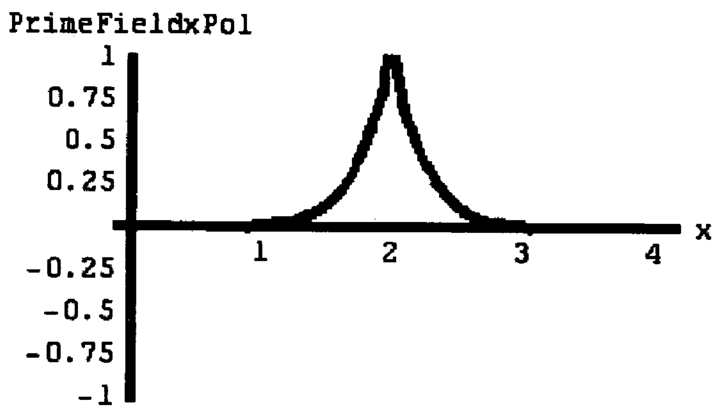
Figure 11G:
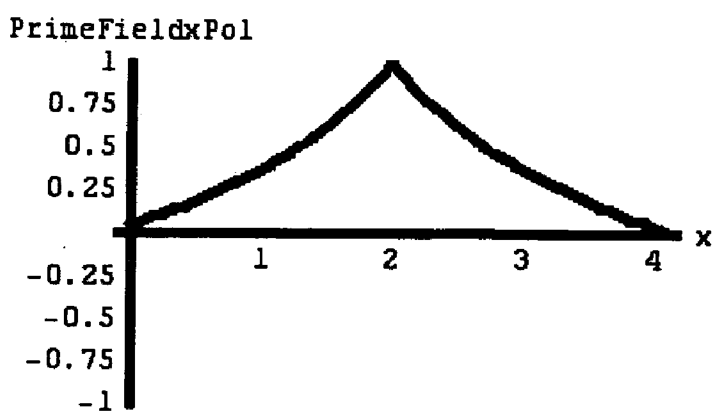

A parabolic refractive index distribution will cause the light rays to bend towards the axis and to get refocused periodically. As shown in FIG. 10, the behavior can be simply explained by modeling the continuous change as a series of small step changes 1010. Note that at each step or interface, the bending of the ray follows the law of refraction. As the ray travels from the axis 1020 to the low refractive index region, at each step or interface, it will bend further towards the horizontal direction until the incident angle exceeds the critical angle in which case, the ray will be totally internally reflected 1030. Now the ray is traveling from low to high refractive index medium and hence, the law of refraction tells us that at each boundary or interface, the ray will bend towards the axis until it crosses the axis. Afterward, it will repeat the cycle. Note that, in addition to guiding light, the GRIN waveguide also functions as a lens to focus or expand/collimate a beam of light if the waveguide is cut into the right length.

Figure 12:
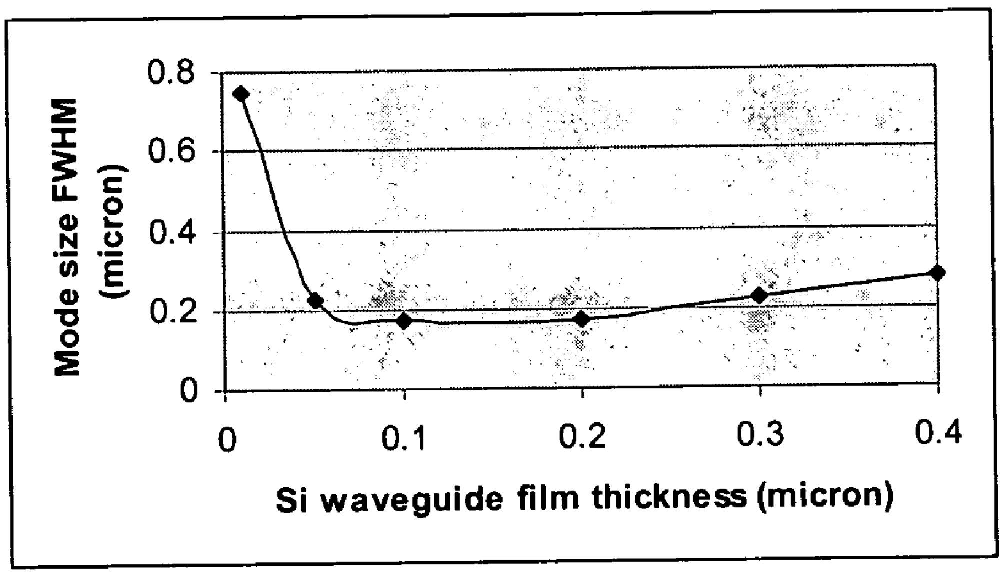
FIG. 12 shows the mode size of the propagating mode of a silicon waveguide as a function of the waveguide core thickness.

(d) Wave Behavior and Critical Wave-Behavior Dimension (CWBD) for Waveguide Taper When the size of the guiding region is no longer much larger than the wavelength but rather smaller than the wavelength, the ray concept can no longer give an accurate picture of how light propagates, and one must resort to wave theory to better describe light propagation. As an example, consider a semiconductor taper embedded in a glass medium. There exists a critical wave-behavior dimension (CWBD) for the waveguide taper of $\mathrm{CWBD} = \lambda_0 / (4\sqrt{(n_c^2 - n_{cl}^2)})$ (where $\lambda_0$ is the wavelength in vacuum, $n_c$ is the refractive index of the tapering waveguide core and $n_{cl}$ is the refractive index of the waveguide cladding), below which light will penetrate substantially into the cladding medium while being guided. FIGS. 11*b* to 11*f* show the electric field profile of the propagating mode for a silicon waveguide 1119 (FIG. 11*a*) with a thickness equal to 0.4 μm, 0.3 μm, 0.2 μm, 0.1 μm, 0.05 μm, and 0.01 μm, respectively. In FIG. 11, the x-axis indicates space position across the waveguide in μm, the y-axis indicates normalized electric field of the lowest transverse electric ("TE") mode. The wavelength of light is 1.5 μm, the refractive index of the cladding 1120 is assumed to be 1.5 and the refractive index of the silicon waveguide core 1110 is assumed to be 3.5. FIG. 12 plots the mode size (given by the full-width at half maximum of the mode intensity) as a function of the waveguide core thickness t. From FIG. 12, as the Si waveguide thickness decreases, the mode size first decreases and then starts to become larger at approximately $$t = 1.5/(4\sqrt{(3.5^2 - 1.5^2)}) \approx 0.1\ \mu\mathrm{m}.$$

(c) Propagating Refractive Index of Waveguide, Waveguide End Facet Reflectance, Sharp-Tip Tapered Waveguide, Sharp Taper and Gradual Taper In an optical waveguide, it is useful to define the propagating refractive index of the waveguide as $n_g = n_c \sin(\theta_i)$. This propagating refractive index takes a value between the refractive index of the core $n_c$ and the refractive index of the cladding $n_{cl}$. As the waveguide gets thinner, $\theta_i$ approaches the critical angle, and $n_g$ approaches the refractive index of the cladding $n_{cl}$. In fact, most of the optical energy will reside in the cladding when t is very small. If this waveguide (thinner than the critical wave-behavior dimension CWBD) is abruptly terminated at an end facet, beyond which is filled by the cladding material, the reflectance (percentage of reflected optical power with respective to the incident optical power) for a guided wave hitting the end facet is given approximately by the end facet reflectance of $$R = \left(\frac{n_g - n_{cl}}{n_g + n_{cl}}\right)^2.$$

Hence, such end-facet reflectance can be reduced to zero provided $n_g$ approaches $n_{cl}$, which will be the case if the waveguide is very thin (i.e. all is transmitted).

A waveguide with a gradually decreasing or increasing thickness along the direction of propagation is called a taper waveguide. A taper waveguide can in some way be seen as composed of many waveguide sections with decreasing or increasing thickness. From the above discussion, we see that a waveguide taper that tapers down to a near-zero thickness will first reduces the mode size and when the mode hits a region with a thickness smaller than the critical thickness, the mode size will starts to be enlarged. Furthermore, since the thickness of the waveguide approaches zero at the taper end, we can expect the optical power reflection at the taper end is to be negligible. Thus, a waveguide taper that tapers down to near zero thickness (a sharp-tip tapered waveguide) can be used to enlarge the mode size of a guided wave and also reduce the end facet reflection to a negligible value at the same time. Such a sharp-tip tapered waveguide will be referred to as "sharp taper" as opposed to "gradual taper"; a gradual taper will not taper down to reach the CWBD or reach a sharp tip. A gradual taper, for example, will slowly reduce the mode size and is typically used as a mode reducer. Furthermore, a gradual down taper will have reflection at the end face and will typically use anti-reflection techniques to reduce the end facet reflection.

The foregoing description serves as a general background providing a context within which embodiments of the present invention will be described below and are not meant to restrict any of the embodiment of the present invention.

II. General Introduction

When a submicron semiconductor channel waveguide is to be connected to a single mode optical fiber with a typical dimension of about 10 μm, one critical need is the expansion or enlargement of the mode size from the semiconductor channel waveguide to match that of the optical fiber, or the reverse process.

According to the embodiments of present invention, several different mode transformation and coupling structures can be cost effectively fabricated in either a single structure format or a composite structure format forming various mode transformation modules.

As discussed above, the integrated composite mode transformer (ICMT) structures include at least three types of basic mode transformation structures, namely:

(I). The sharp-taper structure (ST) includes a sharp tapering in either the vertical direction (VST) or the lateral direction (LST). These structures may be referred to below simply as ST, VST, and LST, respectively, with the high-refractive-index-contrast assumed. The sharp taper can further be distinguished as down or up depending on the direction of assumed mode propagation. For the purpose of nomenclature convenience only, the mode propagating direction below is taken to be from the photonic chip to the optical fiber. Those skilled in the art will readily be able to generalize it to other mode propagating configurations.

(II). The gradual-taper structure (GT), includes gradual tapering in either the vertical direction (VGT) or the lateral direction (LGT). These structures may be referred to below simply as GT, VGT, and LGT respectively. The gradual taper can further be distinguished as down or up and the propagating direction issue is as described in (I).

(III). The micro graded refractive index structure (μ-GRIN) includes a graded refractive index distribution in either the vertical (μ-VGRIN) or lateral (μ-LGRIN) directions. These structures may be referred to below simply as GRIN, VGRIN, or LGRIN. The GRIN structure can further be distinguished as symmetric or non-symmetric depending on whether the graded index has a profile symmetric or asymmetric with respect to the optical axis of propagation for the input wave.

Further, the sharp taper (ST) and the gradual taper (GT) may be in the form of high refractive index contrast structures and will be referred to as HRC-ST and HRC-GT, respectively. The high refractive index contrast enables much shorter tapering lengths to be used while maintaining large transformation of mode sizes.

A brief description of some of these basic module types are provided below.

(I). HRC-ST (High-Refractive-Index-Contrast, Sharp Taper Structure)

In this structure type, a high-refractive-index waveguide layer with vertical or lateral tapering to a sharp tip provides the mode size transformation. For the case of vertical tapering, the high-index waveguide layer is fabricated on top of a lower cladding layer. The upper and side cladding material may be either identical to or different from the lower cladding; hence the cladding index can be either symmetric or asymmetric. One novel feature of embodiments of this structure is the high contrast of the refractive index of the down taper waveguide core relative to the refractive index of the cladding, which confines propagating light to a very small mode size. For example, for the case where the material of the waveguide core is Si; the refractive index can be as high as about 3.5. The cladding material can be glass of various compositions that can have a range of refractive index values from about 1.45 to about 2.5. The sharp point of the taper must reach a dimension smaller than the critical wave-behavior dimension of $CWBD=\theta_0/(4\sqrt{(n_c^2-n_{cl}^2)})$ introduced above. In that case, transformation of the mode size from as small as λ/15, (submicron for λ=1.5 μm) to a few λ (a few microns for λ=1.5 μm) can be typically achieved.

(II). HRC-GT (High-Refractive-Index-Contrast, Gradual Taper Structure)

In this structure type, a gradual taper provides the mode size transformation in either the lateral or the vertical direction. The mode size transformation is due to the fact that gradual mode size will follow the waveguide size if the waveguide changes size gradually. One aspect of the embodiments of this structure is the high contrast of the refractive index of the taper waveguide core relative to the refractive index of the cladding, which allows it to achieve large changes in the mode size within a short propagation distance.

(III). μ-GRIN (Micro-Graded-Refractive-Index Structure)

In this structure type, a graded refractive index layer with either a vertical or lateral refractive index gradient provides the mode size transformation. For the case of a vertical graded refractive index structure, a stepwise refractive index distribution (e.g., the core has a first constant index, and the cladding has a second constant index, lower than the first) or a graded refractive index distribution (index varies throughout the waveguide, in one of the embodiments, being highest near the center) is present in the vertical direction. One feature of the embodiments of this structure is the smallness of the structure, for which the GRIN structure is less than about 50 μm. This thickness is small relative to the diameter of the optical fiber.

The above three basic beam-transforming structure types together with other waveguide structures, are combined in various composite ways in the vertical and lateral directions, to form different basic beam-transforming modules. The composite structures allows a basic module to transform the beam size in either the vertical or lateral direction, or both the vertical and lateral directions.

Furthermore, two or more basic modules can be cascaded spatially to form a combined module. The combined module can be used to either increase the degree of mode transformation over that of a basic module, or to have one basic module perform the vertical mode size transformation and another basic module perform the lateral mode size transformation.

Figure 13:
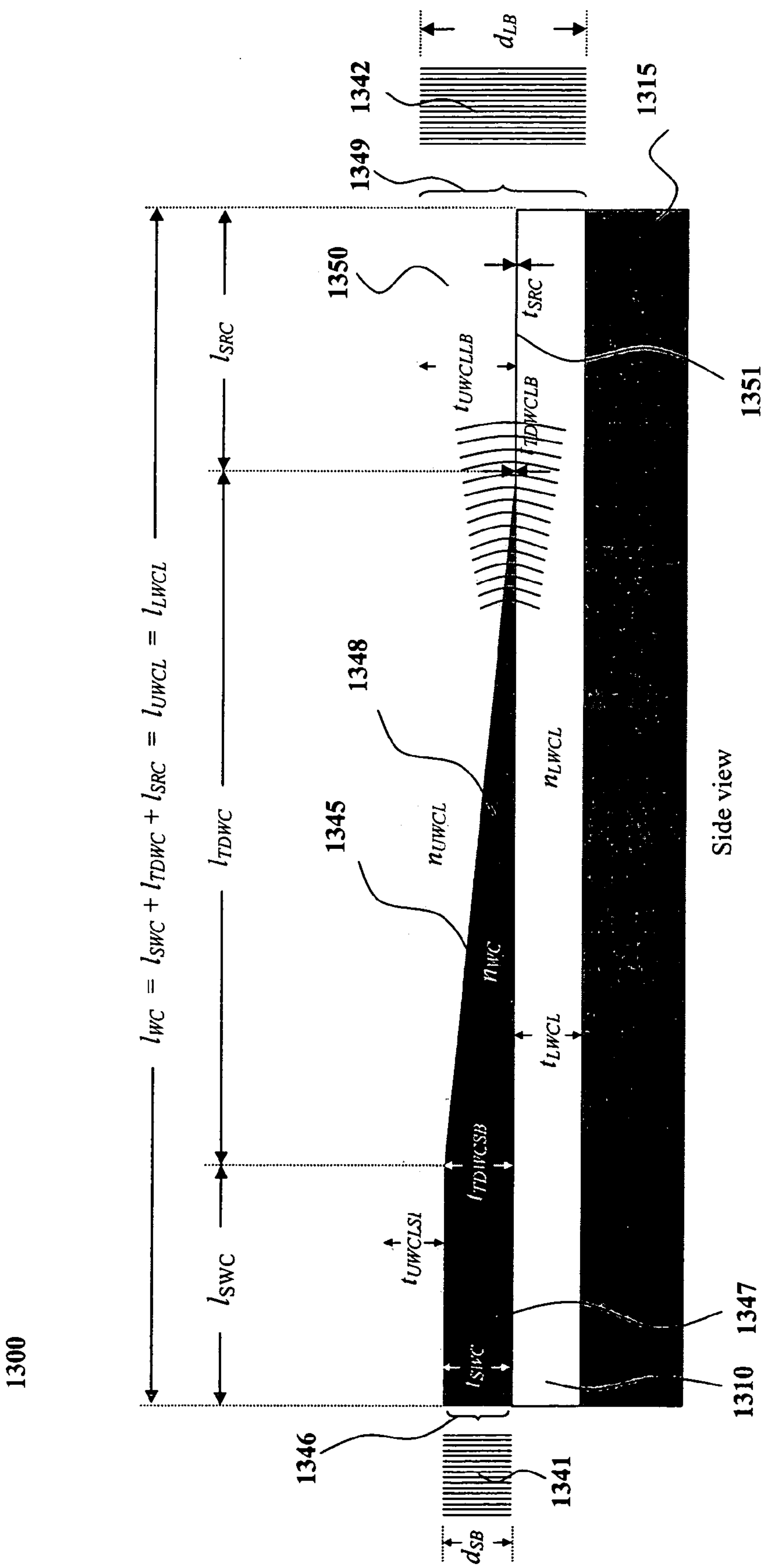
FIG. 13 is a side view of a vertically down-tapered basic mode transformation module according to the present invention.
Figure 14:
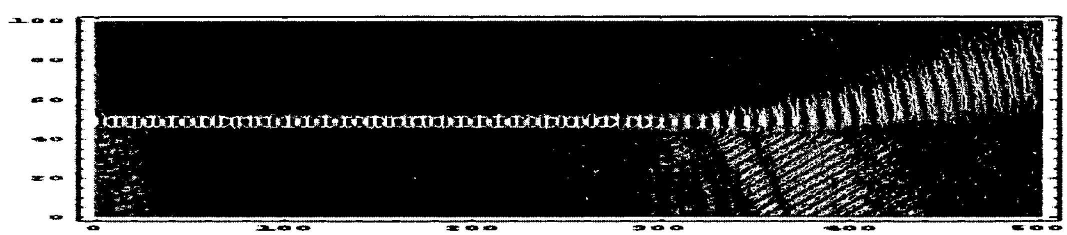
FIG. 14 is a result of a computer simulation of light propagation in the module of FIG. 13.

Described below are specific embodiments of various mode transforming devices based on the integrated composite mode transformer (ICMT) structures of the present invention. The various basic modules as well as the combined modules will be described. In the sequence of presentation below, this includes:

(1) A downward VST or vertical sharp down taper (VSDT) to enlarge the vertical mode size of an optical beam from a photonic chip to an optical fiber (e.g., FIGS. 13–15).

Figure 16:
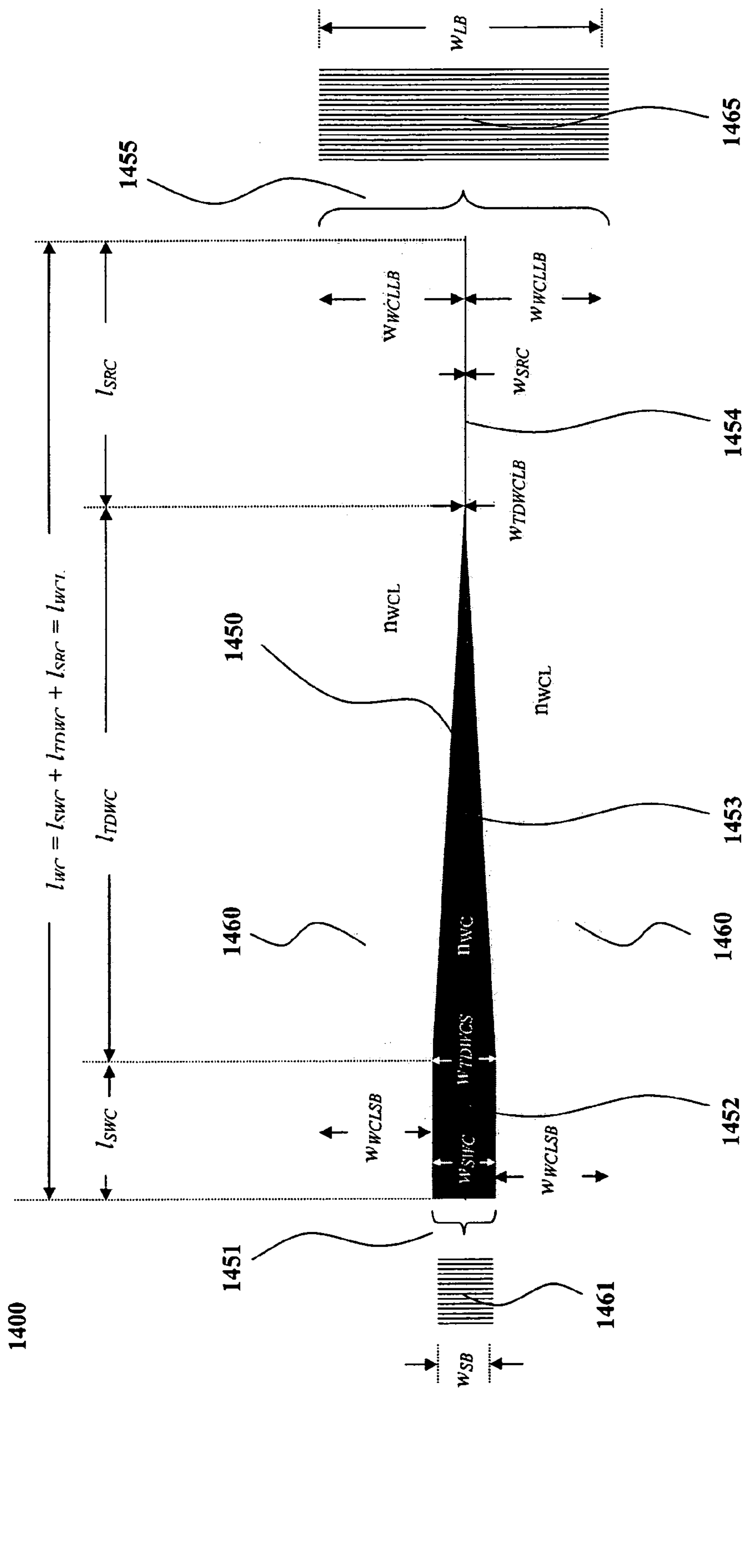
FIG. 16 is a top view of a horizontally/laterally down-tapered basic mode transformation module according to the present invention.
Figure 17:
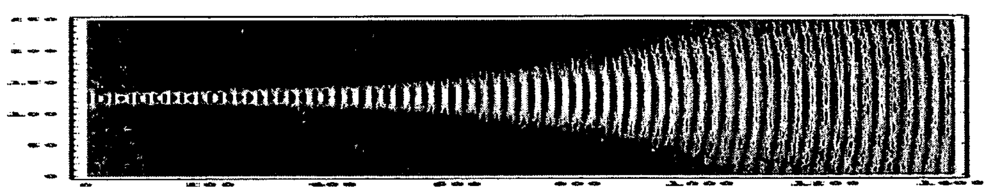
FIG. 17 is a result of a computer simulation of light propagation in the module of FIG. 16.

(2) A downward LST or lateral sharp down taper (LSDT) to enlarge the lateral mode size of an optical beam from a photonic chip to an optical fiber (e.g., FIGS. 16–18).

Figure 19:
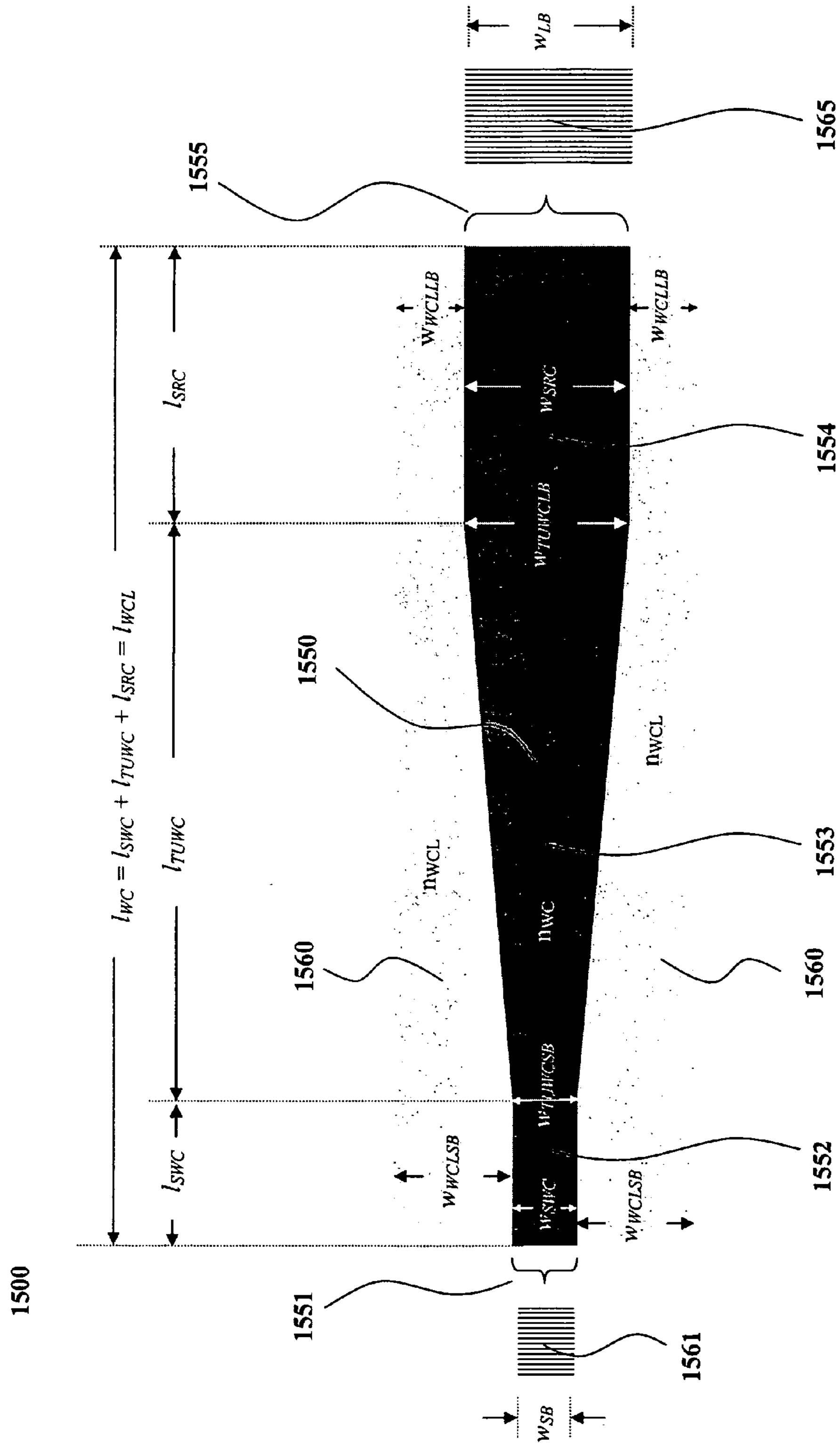
FIG. 19 is a top view of a horizontally/laterally up-tapered basic mode transformation module according to the present invention.
Figure 20:
FIG. 20 is a result of a computer simulation of light propagation in the module of FIG. 19.

(3) An upward LGT or lateral gradual up taper (LGUT) to enlarge the lateral mode size of an optical beam from a photonic chip to an optical fiber (e.g., FIGS. 19–21).

Figure 22A:
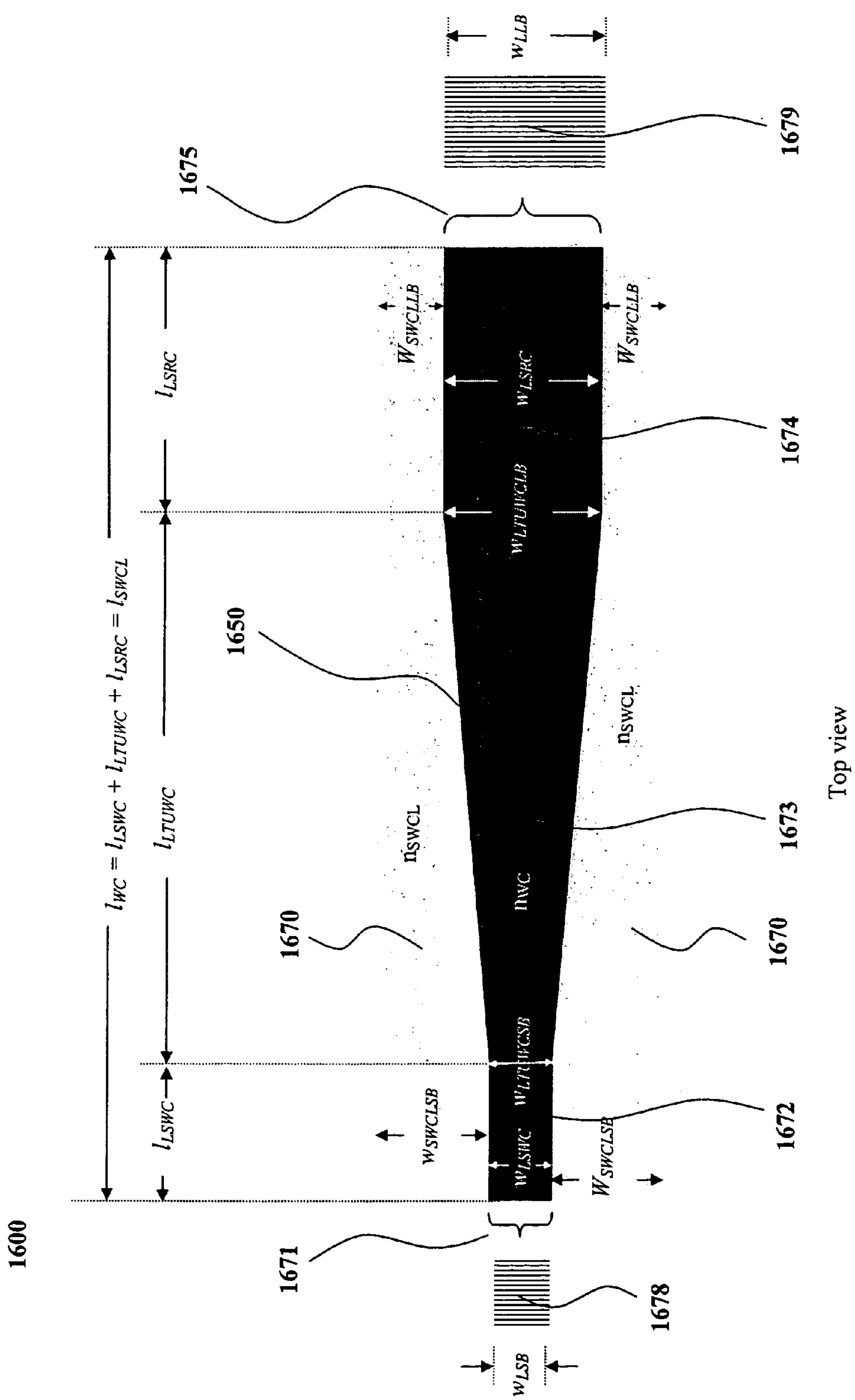
FIGS. 22A–B are, respectively, a top and a side view of a vertically down-tapered, horizontally/laterally up-tapered basic mode transformation module according to the present invention.
Figure 22B:
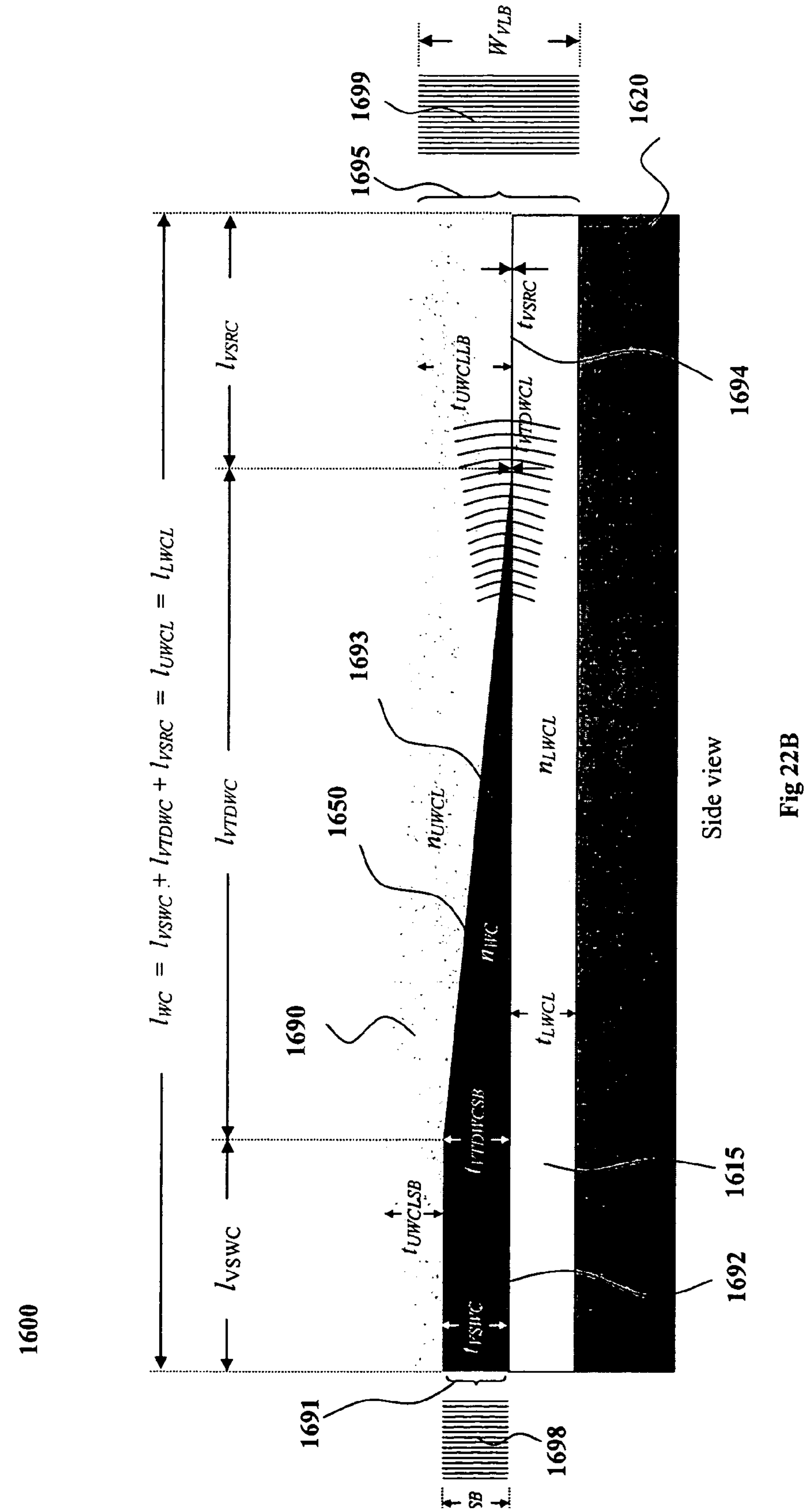
Figure 23:
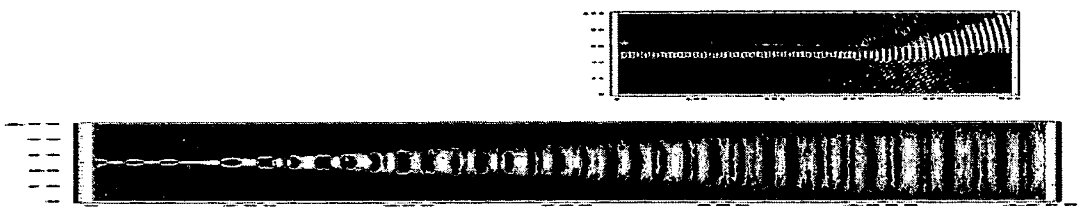
FIG. 23 is a result of a computer simulation of light propagation in the module of FIG. 22.
Figure 24F:
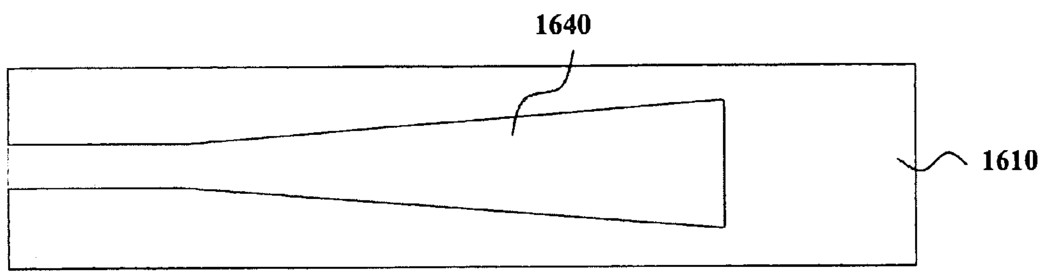
Figure 24F:
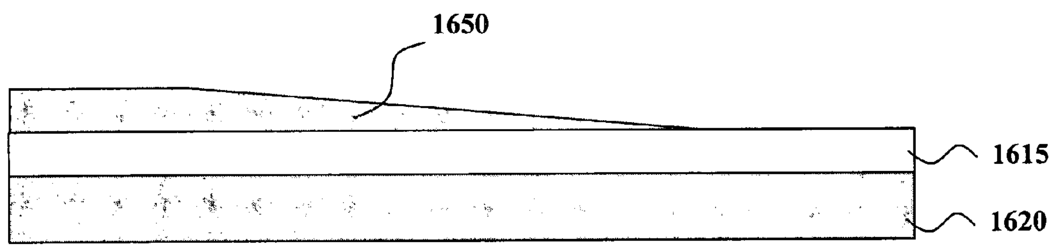
Figure 24F:
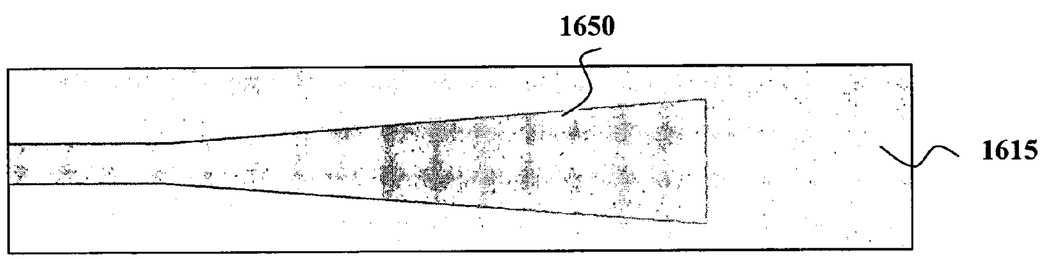

(4) A composite VSDT and LGUT structure forming a (VSDT×LGUT) module to enlarge the mode size vertically and laterally for an optical beam from a photonic chip to an optical fiber (e.g., FIGS. 22–24).

(5) A step-refractive-index (SRIN) waveguide module that provides simple wave propagation without mode size transformation. This SRIN module is used as a basic module to combine with other modules (e.g., FIGS. 25–27). In the case illustrated in FIGS. 25–27, a vertical step index waveguide (VSRIN) and a lateral step index waveguide (LSRIN) structures are combined to provide simple mode waveguiding in both the vertical and the lateral directions.

Figure 28:
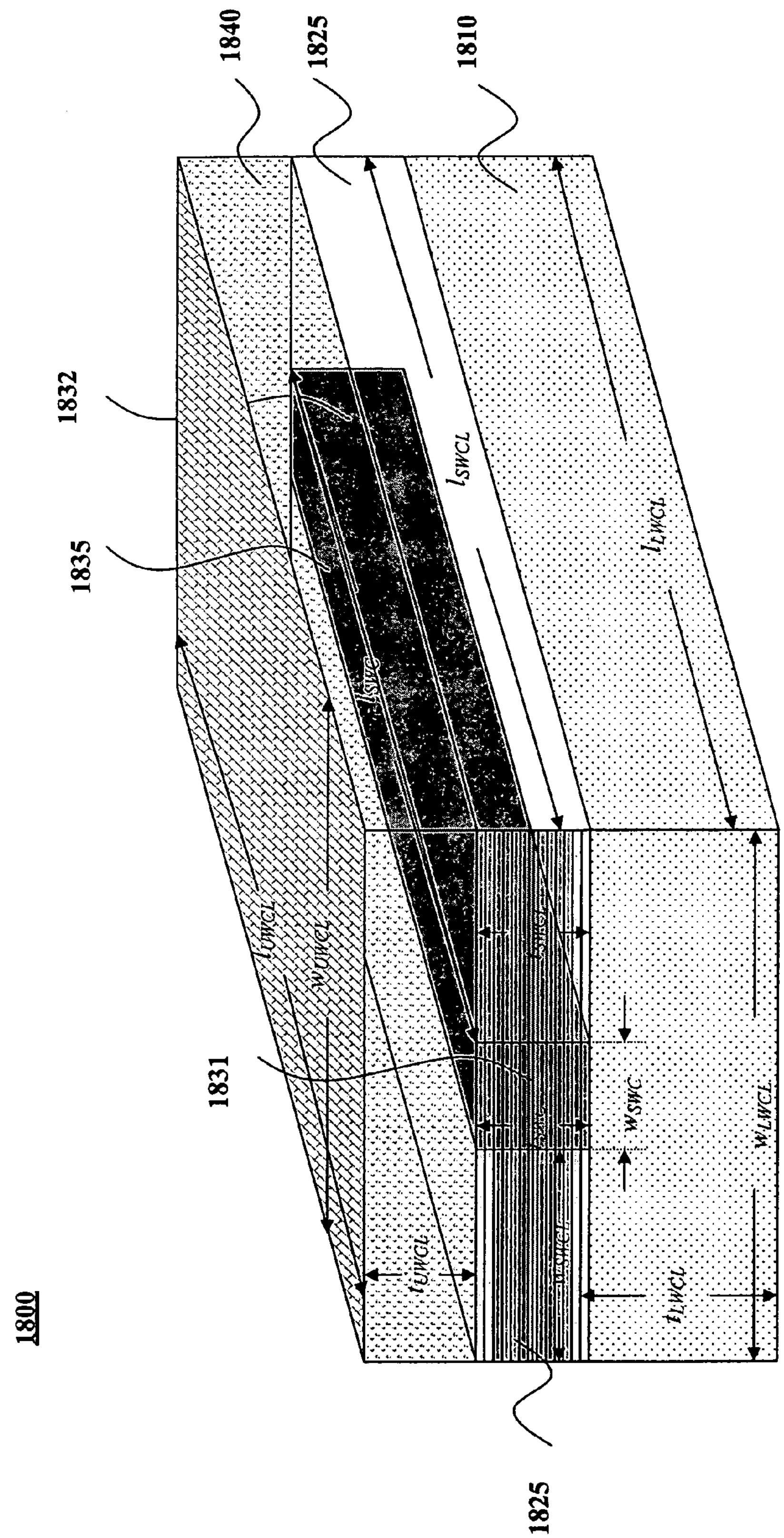
FIG. 28 is a perspective view of a glass/polymer waveguide module with a step refractive index in the horizontal/lateral direction and a graded refractive index in the vertical direction according to the present invention.
Figure 29A:
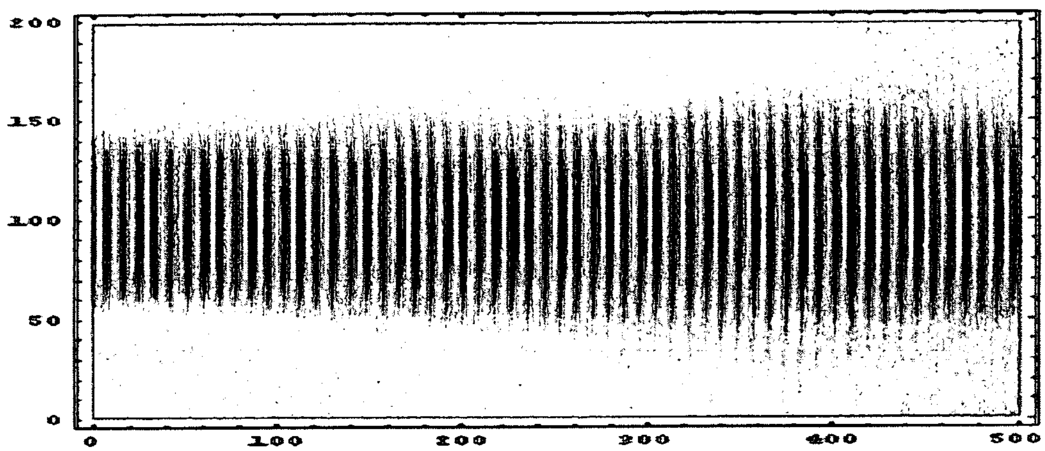
FIG. 29 is a result of a computer simulation of light propagation in the module of FIG. 28.
Figure 29B:
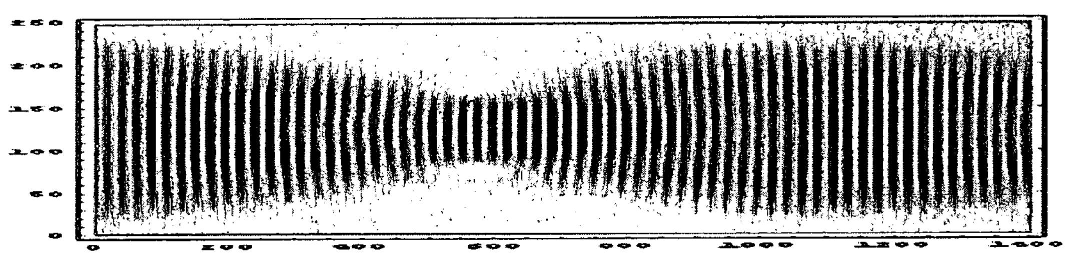

(6) A composite vertical graded refractive index (VGRIN) and LSRIN structure forming a (VGRIN×LSRIN) module to enlarge the vertical mode size for an optical beam from a photonic chip to an optical fiber (e.g., FIGS. 28–30).

Figure 31:
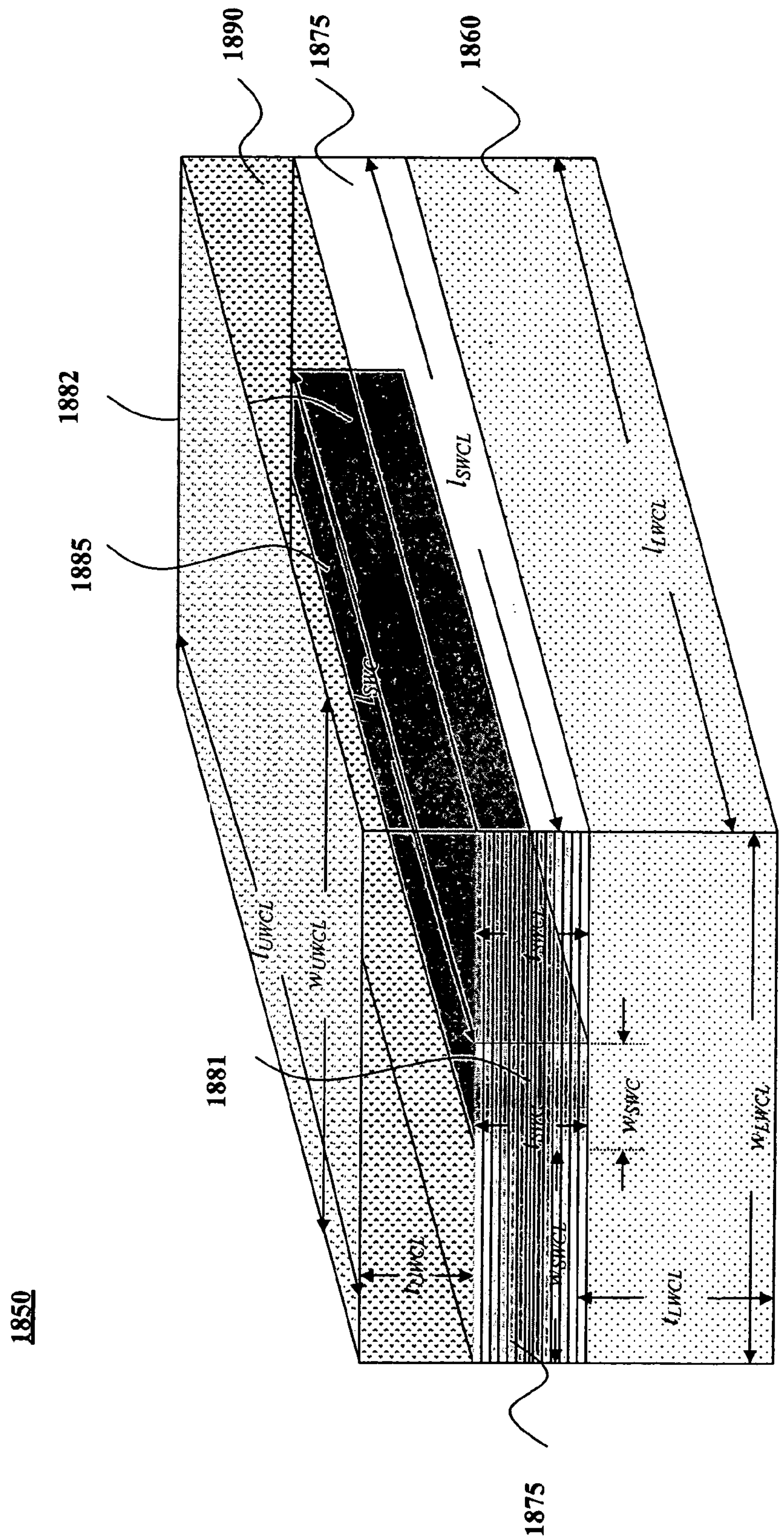
FIG. 31 is a perspective view of a glass/polymer waveguide module with a graded refractive index in both the horizontal/lateral direction and the vertical direction according to the present invention.
Figure 32A:
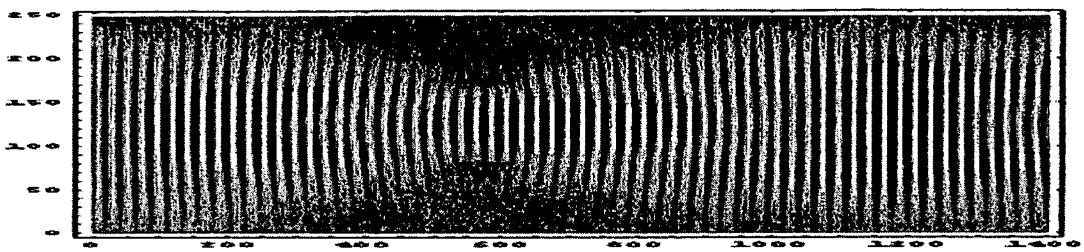
FIG. 32 is a result of a computer simulation of light propagation in the module of FIG. 31.
Figure 32B:
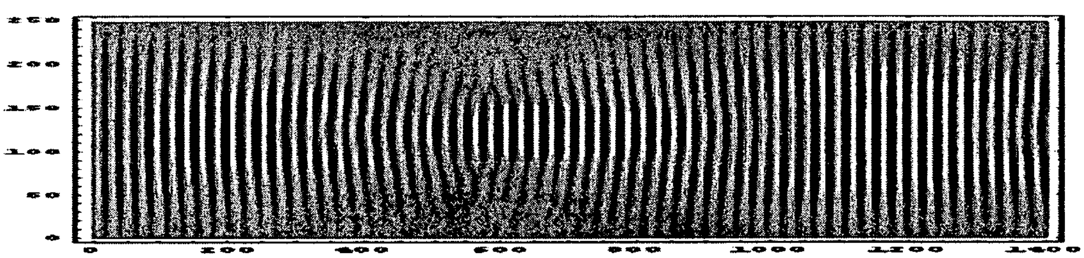

(7) A composite vertical graded refractive index (VGRIN) and lateral graded refractive index (LGRIN) structure forming a (VGRIN×LGRIN) module to enlarge the mode size vertically and laterally for an optical beam from a photonic chip to an optical fiber (e.g., FIGS. 31–33).

Figure 34A:
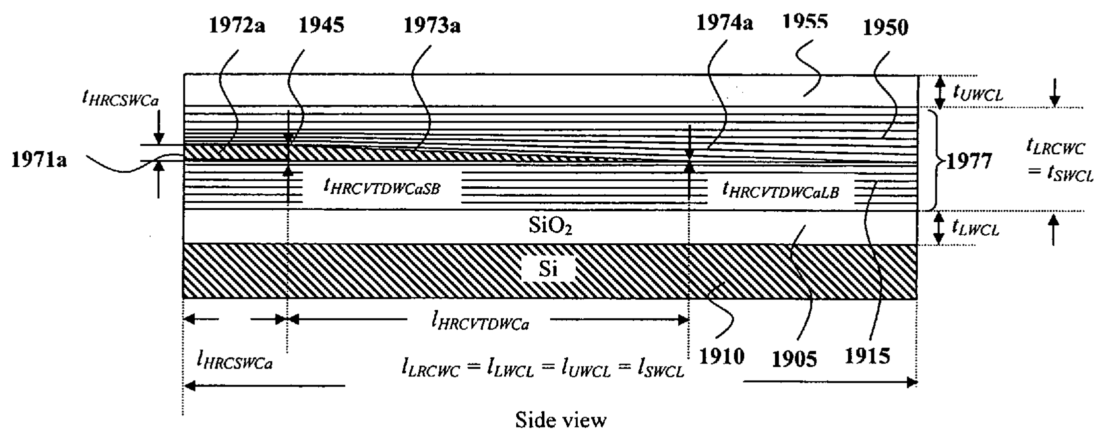
FIGS. 34A–B are, respectively, a side view and a top view of a super mode transformation coupler with a vertically down-tapered, horizontally/laterally up-tapered high-index waveguide core embedded in a glass/polymer waveguide with a graded refractive index in the vertical direction and a step refractive index in the horizontal/lateral direction according to the present invention.
Figure 34B:
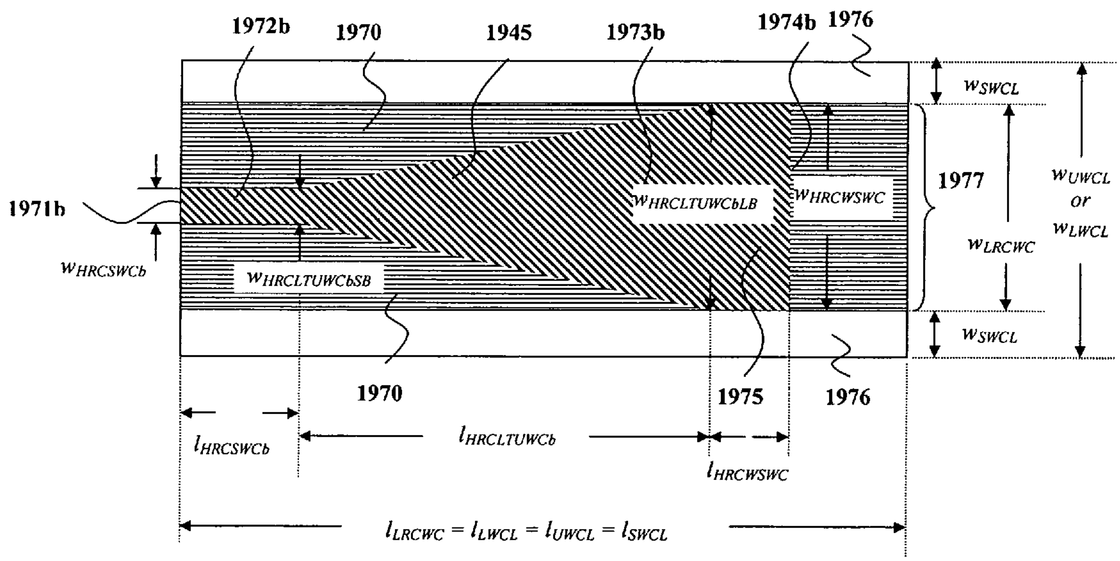
Figure 35A:
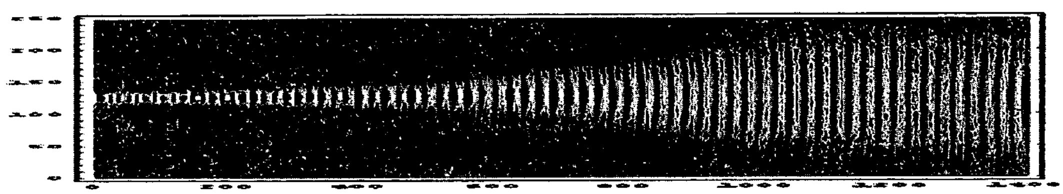
FIG. 35 is a result of a computer simulation of light propagation in the super mode transformation coupler of FIG. 34.
Figure 35B:
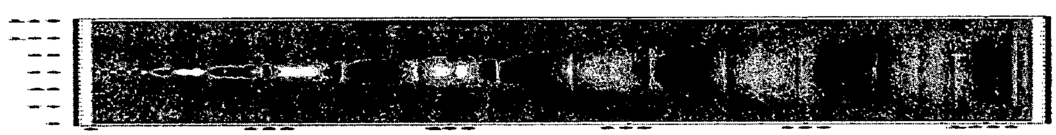

(8) A combined module including a cascaded (VSDT×LGUT) module and (VGRIN×LSRIN) module, namely a (VSDT×LGUT)+(VGRIN×LSRIN) combined module, to increase the enlargement of the mode size vertically and laterally for an optical beam from a photonic chip to an optical fiber (e.g., FIGS. 34–36).

Figure 37A:
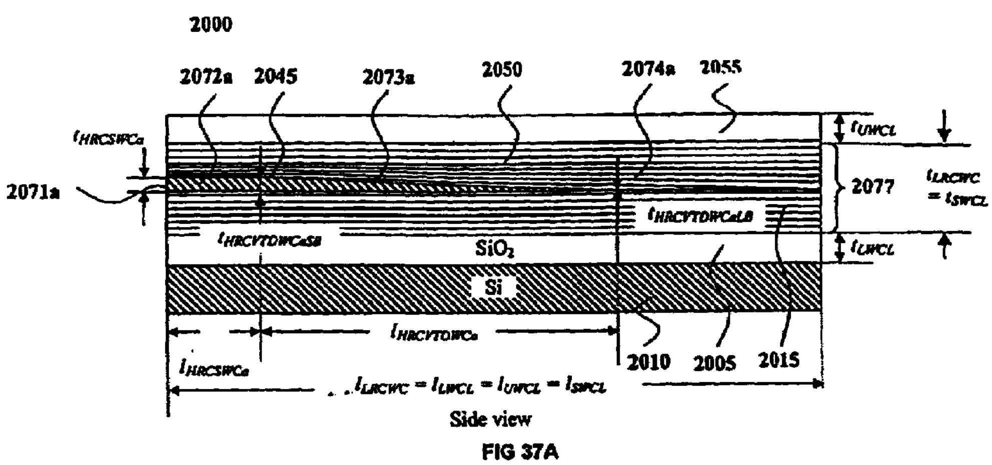
FIGS. 37A–B are, respectively, a side view and a top view of a super mode transformation coupler with a vertically down-tapered, horizontally/laterally down-tapered high-index waveguide core embedded in a glass/polymer waveguide with a graded refractive index in both the horizontal/lateral and the vertical direction according to the present invention.
Figure 37B:
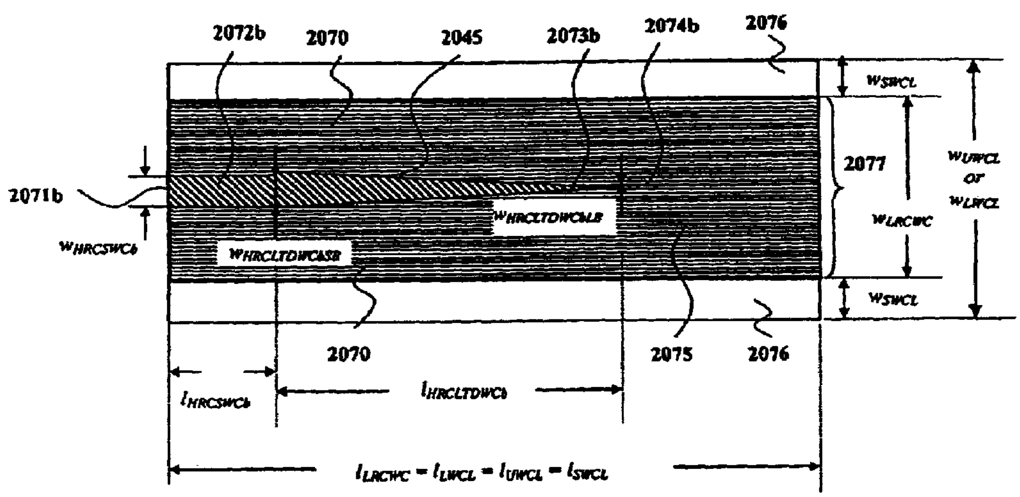
Figure 38:
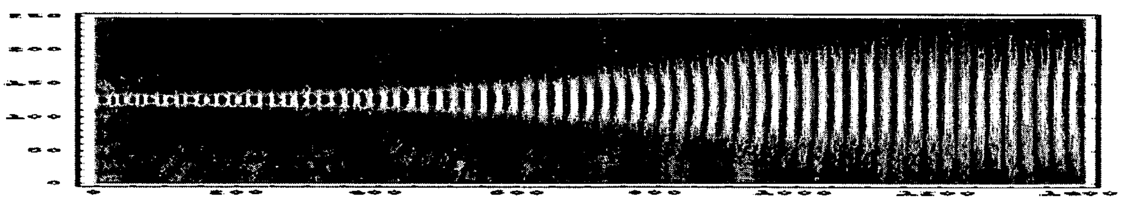
FIG. 38 is a result of a computer simulation of light propagation in the super mode transformation coupler of FIG. 37.

(9) A combined module made up of a cascade of (VSDT×LSDT) module and (VGRIN×LGRIN) module, namely a (VSDT×LSDT)+(VGRIN×LGRIN) combined module, to increase the enlargement of the mode size vertically and laterally for an optical beam from a photonic chip to an optical fiber (e.g., FIGS. 37–39).

(10) A combined module made up of either a cascade of (VSDT×LGUT) module and (VGRIN×LSRIN) module with asymmetric GRIN structure, namely a (VSDT×LGUT)+(VGRIN×LSRIN) combined asymmetric GRIN module, or a cascade of (VSDT×LSDT) module and a (VGRIN×LGRFN) module with asymmetric GRIN structure, namely a (VSDT×LSDT)+(VGRIN×LGRIN) combined asymmetric GRIN module, to increase the enlargement of the mode size vertically and laterally for an optical beam from a photonic chip to an optical fiber (e.g., FIGS. 40–43).

(11) A waveguide bonding process useful for the fabrication of the vertical sharp taper structures (e.g., FIG. 44)

(12) The integration of the ICMT structures with a V-groove structure for fiber on one side and an alignment platform for photonic chip on the other side. Such an integrated structure allows self-alignment of the ICMT with a photonic chip and an optical fiber (e.g., FIGS. 45–46).

While the exemplary devices (1)–(12) typically refer to transformation of an optical beam between a photonic chip and optical fibers, it is not meant to limit the applications, embodiments, or scopes of the exemplary devices. It should be clear to those skilled in the art that these exemplary devices can be more generally used to transform optical beams from any type of small core waveguide to any type of large core waveguide or vice versa.

III. Exemplary Devices and Embodiments

Beam transforming devices based on ICMT according to embodiments of the present invention are described in detail below.

The devices will be described with respect to transmission of a single light beam with wavelength λ. It should be understood that the terms light beam, optical beam, laser beam, etc., are used interchangeably. Moreover, while descriptions of the devices refer to a single light beam, there may be more than one light beam propagating in the device, the light beams may be made up of light with many wavelengths, the light beam may be continuous-wave light or pulsed light, and the light beam may have various beam sizes. Thus the nature of the light beam is used only for illustrative purposes and is not meant to limit the scope of the invention.

Unless otherwise stated, the exemplary dimensions below will be specified with respect to an exemplary optical wavelength of 1.5 μm. Those skilled in the art will know that the exemplary dimensions will scale proportionally to the wavelength used which can range from ultra-violet (e.g., on the order of 0.1 μm) to far infrared (e.g., on the order of 10 μm).

The various device embodiments described herein are useful for transforming the mode size of an input beam having a dimension on the order of from about 0.2 μm or even less to a beam dimension on the order of about 10 μm to 50 μm or more, and vice versa, with appropriate changes to the various device parameters disclosed. Thus one skilled in the art should understand that the various device embodiment parameters (e.g., length and width dimensions) disclosed herein are exemplary and may be varied according to the desired application.

(1) Exemplary Device 1: A High-Refractive-Index-Contrast Vertical Sharp-Down-Taper (HRC-VSDT) ICMT Device FIG. 13 illustrates a first general embodiment of an ICMT device 1300 employing a vertical down-tapering beam enlarger with high refractive-index contrast between the enlarger core region and its surrounding cladding region. The device performs as a one dimensional beam-size enlarging element in the vertical direction for a propagating optical beam and can, for example, enlarge an optical beam from a semiconductor waveguide with a beam size as small as λ/7.5 (or 0.2 μm for λ=1.5 μm) to a large optical beam such as one with a beam size more than five times larger. The device is not limited to use as a beam enlarger but can also function as a beam reducer when the optical beam propagates in the reverse direction. Furthermore, the device can be used in conjunction with another ICMT module such as a graded refractive index waveguide module (described below) to further enlarge and collimate the beam for direct coupling into an optical fiber and vice versa. It should be understood that these exemplary applications of device 1300 are intended to illustrate the uses for device 1300 and are not intended to limit the applications of other embodiments of device 1300. The device can be referred to as a "high-refractive-index-contrast-vertical-sharp-down-taper (HRC-VSDT) ICMT".

HRC-VSDT ICMT 1300 preferably includes a tapering-down waveguiding core region occupied by Waveguide Core WC 1345. Waveguide Core WC 1345 is surrounded by Upper Waveguide Cladding UWCL 1350 above and Lower Waveguide Cladding LWCL 1310 below. The Waveguide Core WC 1345 preferably includes a small-beam input/output port SB-PT 1346, a straight waveguiding core region SWC 1347, a tapering-down waveguiding core region TDWC 1348, a straight radiation core region SRC 1351, and a large-beam output/input port LB-PT 1349. The straight waveguiding core region SWC 1347 has a length $l_{SWC}$ and a thickness $t_{SWC}$. The tapering down waveguiding core region TDWC 1348 has a length $l_{TDWC}$, a thickness $t_{TDWCSB}$ at the small-beam input/output side and a thickness $t_{TDWCLB}$ at the large-beam input/output side. The straight radiation core region SRC 1351 has a length $l_{SRC}$ and a thickness $t_{SRC}$. The total length of the waveguide core is given by $l_{WC}=l_{SWC}+l_{TDWC}+l_{SRC}$. The thickness of the lower waveguide cladding LWCL 1310 is $t_{LWCL}$. The thickness of the upper waveguide cladding UWCL 1350 at the small-beam input/output side is $t_{UWCLSB}$ and at the large-beam input-output side is $t_{UWCLLB}$. The length of the upper cladding $l_{UWCL}$ and the length of the lower cladding $l_{LWCL}$ are about equal to the total length of the waveguide core $l_{WC}$. The refractive index of the Waveguide Core WC 1345 is $n_{WC}$. The refractive index of the Upper Waveguide Cladding LWCL 1350 is $n_{UWCL}$. The refractive index of the Lower Waveguide Cladding LWCL 1310 is $n_{LWCL}$. Lower waveguide cladding LWCL 1310 is formed on a substrate 1315 as will be described in more detail below. The length of the straight waveguide core $l_{SWC}$ and the straight radiation core $l_{SRC}$ are typically not very critical to the operation of the device and can be zero in some applications (i.e., with these sections absent).

For choice of refractive index, there are three options for operation for the ICMT device 1300, namely the small-refractive-index-contrast option, the medium-refractive-index-contrast option and the large-refractive-index-contrast option. For the small-refractive-index contrast option, the refractive index ratio between the refractive index of the Waveguide Core 1345 and that of the Waveguide Cladding 1350 or 1310, i.e. $n_{WC}/n_{UWCL}$ or $n_{WC}/n_{LWCL}$, is assumed to be larger than 1.0 but smaller than about 1.3. That is $1.3 \geqq n_{WC}/n_{UWCL}>1.0$ or $1.3 \geqq n_{WC}/n_{LWCL}>1.0$. For the medium-refractive-contrast option, the refractive index ratio between the refractive index of the Waveguide Core 1345 and that of the Waveguide Cladding 1350 or 1310, i.e. $n_{WC}/n_{UWCL}$ or $n_{WC}/n_{LWCL}$, is assumed to be larger than about 1.3 but smaller than about 1.5. That is $1.5 \geqq n_{WC}/nU_{WCL} \geqq 1.3$ or $1.5 \geqq n_{WC}/n_{LWCL} \geqq 1.3$. For the large-refractive-index-contrast option, the refractive index ratio between the refractive index of the Waveguide Core 1345 and that of the Waveguide Cladding 1350 or 1310, i.e. $n_{WC}/n_{UWCL}$ or $n_{WC}/n_{LWCL}$, is assumed to be larger than about 1.5. That is $n_{WC}/n_{UWCL} \geqq 1.5$ or $n_{WC}/n_{LWCL} \geqq 1.5$. A short tapering length can be achieved if the relative refractive index contrast is high—in the region of either the medium-refractive-index contrast or the large-refractive-index contrast. The medium and large refractive index contrast will be referred to as the high-refractive index case.

In an exemplary device, the input/output port SB-PT 1346 is configured to receive/transmit a light beam 1341 typically having wavelength $\lambda$ with a beam diameter $d_{SB}$, and the output/input port LB-PT 1349 is configured to transmit/receive a light beam 1342 typically having wavelength $\lambda$ with a beam diameter $d_{LB}$.

(i) An Exemplary Device for High-Refractive-Index-Contrast Case

In an exemplary embodiment of device 1300 with high refractive-index contrast, the Waveguide Core WC 1345 is made up of silicon (Si) with a refractive index of $n_{WC}=3.5$, the Upper Waveguide Cladding 1350 is made up of silica-titania ($SiO_2$—$TiO_2$) material mixture with a mixture composition to achieve a refractive index of $n_{UWCL}=1.7$ or alternatively $Si_3N_4$ with a refractive index of about 1.7 can be used. The Lower Waveguide Cladding 1310 is made up of silicon dioxide ($SiO_2$) with a refractive index of $n_{LWCL}=1.5$. The thicknesses of the waveguide core are $t_{SWC}=0.3$ μm, $t_{TDWCSB}=0.3$ μm, and $t_{TDWCLB}=t_{SRC}=0$, by "0" it is meant that $t_{TDWCLB}=t_{SRC}<<\lambda$. The thicknesses of the waveguide claddings are $t_{UWCLSB}=5.0$ μm, $t_{UWCLLB}=5.3$ μm, and $t_{LWCL}=0.6$ μm. The lengths of the waveguide core are $l_{SWC}=10$ μm, $l_{TDWC}=30$ μm, $l_{SRC}=10$ μm, and $l_{WC}=50$ μm. The lengths of the waveguide claddings are $l_{UWCL}=l_{LWCL}=l_{WC}=50$ μm. It should be appreciated by one skilled in the art that all parameter values used in this and other exemplary embodiments are approximate and that the actual values can vary significantly. It should also be appreciated by one skilled in the art that other materials for the core and cladding of the various exemplary embodiments may be used.

(ii) General Operation of the Device.

FIG. 14 shows the results of a computer simulation of the spatial distribution of the electric field strength for light input at $\lambda=1.5$ μm after propagating into waveguide 1347, using the above exemplary parameters. The mode size at the input end was approximately 0.3 μm. After propagating for about 35 μm, it begins to expand at the point where the waveguide thickness (at 5 μm distance from the tip) is tapered down to about 0.05 microns, which is near the tip of the tapering down region. The mode then radiates at an angle from that point to a larger mode size. The mode size reaches a size of about 5 μm at 10 μm away from the tip of the taper. The compact mode transfer device thus expands the mode from about 0.3 to about 5 μm over a distance of about 50 μm. This is a much smaller distance compared with mode expansion distances provided by other prior art devices. Thus such ICMT devices according to the present invention provide a clear advantage for coupling fibers to a photonic chip relative to prior art devices.

(iii) Device Fabrication Procedures

An exemplary procedure for fabricating a HRC-VSDT-ICMT such as device 1300 will now be described with reference to FIGS. 15A–C. This procedure is given for the purpose of illustration and not limitation as other similar procedures can be used to achieve the same fabrication results, and other materials systems or device structures can be utilized to fabricate devices with the same functional capabilities.

The HRC-VSDT-ICMT type structure is fabricated according to an embodiment by starting with a Silicon-On-Insulator (SOI) wafer. For a SOI wafer, a high refractive index silicon (Si) layer 1305 having a thickness of $t_{SWC}$ is already made or bonded on top of a low refractive index layer of $SiO_2$ 1310 with a thickness of $t_{LWCL}$. The $SiO_2$ layer 1310 is typically either deposited on a Si substrate 1315 or thermally oxidized on the Si substrate or thermally oxidized in the Si substrate after an oxygen ion implantation process. A fabrication procedure according to one embodiment is now described below.

Figure 15A:
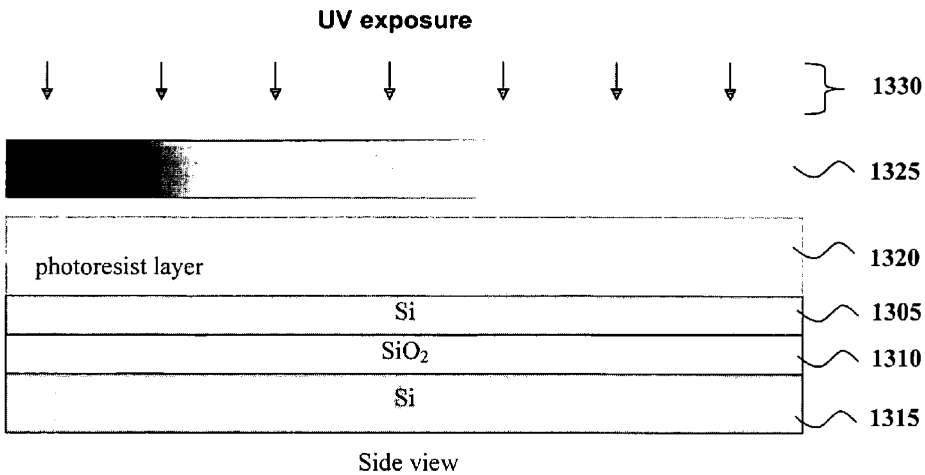
FIGS. 15A–C illustrates exemplary fabrication steps for the module of FIG. 13.
Figure 15B:
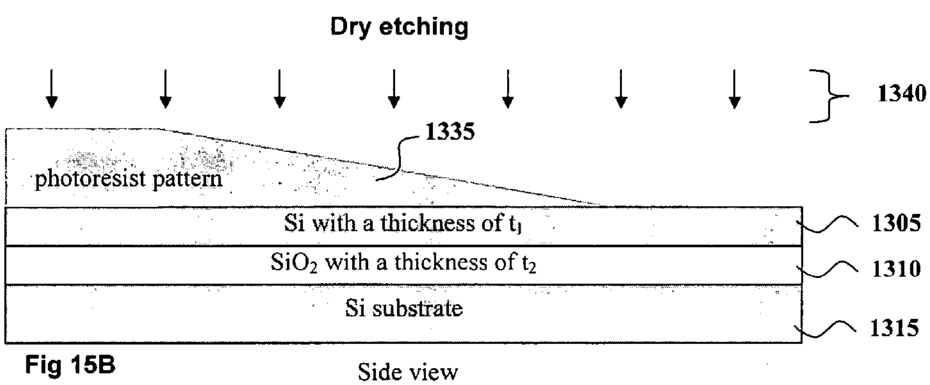

A photoresist layer 1320 s deposited (e.g. spin-coated) on the silicon layer 1305, as shown in FIG. 15A. A gray-scale mask 1325 is used as a mask to expose the photoresist 1320 under UV light 1330. The gray-scale mask pattern is designed so that it provides a graduated exposure level with an exposure dosage that varies from a small value to a large value that will somewhat result in a linear photoresist taper after exposure and development across a length of approximately 30 μm. The photoresist is then developed. The shape of the photoresist after exposure and development has a vertical down tapered shape that corresponds to the variation in the exposure dosage, as shown by photoresist pattern 1335 in FIG. 15B.

A dry plasma etching procedure 1340 with selectivity of 1:0.3:~0 between photoresist and Si and $SiO_2$ is used to etch down the Si layer vertically. Such a process is accomplished using a reactive ion etching system, or an inductively coupled plasma system, or another equivalent dry plasma system. The exemplary processing gases are $SF_6/O_2/Cl_2$, as F-reactants and/or their neutrals etch Si, whereas $O_2$ etch photoresist and S—Cl reactants and/or their neutrals inhibit the etching of $SiO_2$. Exemplary process parameters using a reactive ion etching system are: a mixture of 30 sccm:20 sccm:20 sccm of $SF_6$:$O_2$:$Cl_2$, with an RF power of 350 W, and a process pressure of 25 mTorr. This etching process transfers the down tapered pattern of the photoresist to the high-refractive-index Si layer and forms the vertically tapered down Si section 1345. It should be noted that the ease of this transfer process is dependent on the thickness tswc of the top waveguiding Si layer. Typically the starting thickness for a tapered down Si waveguide is in the range of 0.2 to 0.5 μm. Considering that the photoresist layer has a typical thickness of about 1.0 μm and that the etching process typically etches Si at a rate that is not drastically different from that for the photoresist, such a direct pattern transfer can be achieved. As the etching process can be made to etch $SiO_2$ at a lower rate, the interface between the top Si layer 1305 and the lower cladding $SiO_2$ 1310 can be used as a natural stop during the dry etching process. It should be understood that the above process parameters are presented for purposes of illustrating a useful embodiment of the fabrication method and are not intended as a limitation on the device. For example, a variety of dry etching parameters can be used depending on the photoresist type and the quality of the SOI wafer. As is known to those skilled in the art, the end result of a dry etched structure can be achieved via various combinations of the etching parameters.

Figure 15C:
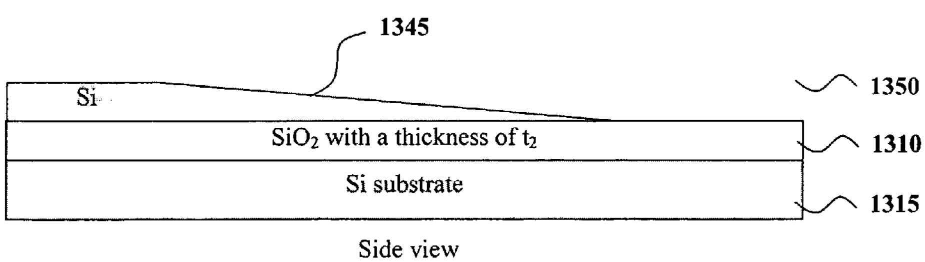

To make the glass upper cladding layer 1350, flame hydrolysis deposition, chemical vapor deposition, sputtering, Ion-Assisted-Deposition or sol-gel spin coating of dielectric material, can generally be employed to deposit the upper cladding layer 1350, shown in FIG. 15C. The $TiO_2$—$SiO_2$ material required can, in particular, be achieved using a sol-gel mixture of $TiO_2$ and $SiO_2$ precursors as is well known to those skilled in the art. The surrounding cladding, including the bottom, top and side cladding medium, can all have various refractive indices and also a spatial variation or distribution of the refractive index value (as will be discussed below), and the actual value that can be selected for this purpose can cover a wide range, for instance 1.4 to 2.5.

It should be understood that these dimensions and exemplary lengths are presented for the purposes of illustrating a useful embodiment of the device 1300 and are not intended to limit other embodiments of any exemplary device, or the device 1300. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the various embodiments of the present invention, including the side surfaces, the top and bottom surfaces, and the input/output surfaces.

In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the devices.

It should be understood to those skilled in the art that the device 1300 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

(2) Exemplary Device 2: A High-Refractive-Index-Contrast-Lateral Sharp-Down-Taper (HRC-LSDT) ICMT Device FIG. 16 illustrates a second general embodiment of an ICMT device 1400 employing a lateral down-tapering beam enlarger with high refractive-index contrast between the enlarger core region and its surrounding cladding region. The device performs as a one dimensional beam-size enlarging element in the lateral direction for a propagating optical beam and can, for example, enlarge an optical beam from a semiconductor waveguide with a beam size as small as λ/7.5 (or 0.2 μm for λ=1.5 μm) to a large optical beam such as one with a beam size close to that of an optical fiber. The device is not limited to use as a beam enlarger but can also function as a beam reducer when the optical beam propagates in the reverse direction. Furthermore, the device can be used in conjunction with another ICMT module such as a graded-refractive-index waveguide module to further enlarge and collimate the beam for direct coupling into an optical fiber. It should be understood that these exemplary applications of device 1400 are intended to illustrate the uses for device 1400 and are not intended to limit the application of other embodiments of device 1400 to these examples. The device can be referred to as a "high-refractive-index-contrast-lateral-sharp-down-taper (HRC-LSDT) ICMT".

The present HRC-LSDT ICMT preferably includes a tapering-down waveguiding core region occupied by Waveguide Core WC 1450, Waveguide Core WC 1450 is surrounded on both sides by Waveguide Cladding WCL 1460. Waveguide Core 1450 preferably includes a small-beam input/output port SB-PT 1451, a straight waveguiding core region SWC 1452, a tapering-down waveguiding core region TDWC 1453, a straight radiation core region SRC 1454, and a large-beam input/output port LB-PT 1455. The straight waveguiding core region SWC 1452 has a length $l_{SWC}$ and a width of $w_{SWC}$. The tapering down waveguiding core region TDWC 1453 has a length of $l_{TDWC}$, a width of $w_{TDWCSB}$ at the small-beam input/output side, and a width $w_{TDWCLB}$ at the large-beam input/output side. The straight radiation core region SRC 1454 has a length of $l_{SRC}$ and a width of $w_{SRC}$. The total length of the waveguide core is given by $l_{WC}=l_{SWC}+l_{TDWC}+l_{SRC}$. The width of the waveguide cladding WCL 1460 on both sides of the waveguide core WC 1450 is $w_{WCLSB}$ at the small beam input/output side, and is $w_{WCLLB}$ at the large beam side. The length of the waveguide cladding WCL 1460 $l_{WCL}$ is about equal to the total length of the waveguide core $l_{WC}$. The refractive index of the Waveguide Core WC 1450 is $n_{WC}$. The refractive index of the Waveguide Cladding WCL 1460 is $w_{WCL}$. The length of the straight waveguide core $l_{SWC}$ and the straight radiation core $l_{SRC}$ are typically not very critical to the operation of the device and can be zero in some applications (i.e. with these sections absent).

For choice of refractive index, there are three options for the operation of the ICMT device 1400, namely the smallrefractive-index-contrast option, the medium-refractive-index-contrast option and the large-refractive-index-contrast option. For the small-refractive-index-contrast option, the refractive index ratio between the refractive index of the Waveguide Core 1450 and that of the Waveguide Cladding 1460 i.e. $n_{WC}/n_{WCL}$, is assumed to be larger than 1.0 but smaller than 1.3. That is, $1.3 \geqq n_{WC}/n_{WCL} \geqq 1.0$. For the medium-refractive-index-contrast option, the refractive index ratio between the refractive index of the Waveguide Core 1450 and that of the Waveguide Cladding 1460 i.e. $n_{WC}/n_{WCL}$, is assumed to be larger than 1.3 but smaller than 1.5. That is, $1.5 \geqq n_{WC}/n_{WCL} \geqq 1.3$. For the large-refractive-index-contrast option, the refractive index ratio between the refractive index of the Waveguide Core 1450 and that of the Waveguide Cladding 1460 i.e. $n_{WC}/n_{WC}$, is assumed to be larger than 1.5. That is, $n_{WC}/n_{WCL} \geqq 1.5$. A short tapering length can be achieved if the relative refractive index contrast is HIGH—in the region of either the medium-refractive-index contrast or the large-refractive-index contrast. The medium and large refractive index contrast will be referred to as the high-refractive index case.

In an exemplary device, the input/output port SB-PT 1451 is configured to receive/transmit a light beam 1461 typically having wavelength λ with a beam width $W_{SB}$, and the input/output port LB-PT 1455 is configured to receive/transmit a light beam 1465 typically having wavelength λ with a beam width $w_{LB}$.

(i) An Exemplary Device for High-Refractive-Index-Contrast Case

In an exemplary embodiment of device 1400 in the high-refractive-index-contrast operation region, the Waveguide Core WC 1450 is made up of silicon (Si) with a refractive index of $n_{WC}$=3.5, the Waveguide Cladding WCL 1460 is made up of silica-titania ($SiO_2$—$TiO_2$) material mixture with a mixture composition to achieve a refractive index of $n_{UWCL}$=1.7 or alternatively $Si_3N_4$ with a refractive index of about 1.7 can be used. The widths of the waveguide core are $w_{SWC}$=0.3 μm, $w_{TDWCSB}$=0.3 μm, and $w_{TDWCLB}$=$w_{SRC}$=0 μm. The widths of the waveguide claddings are $w_{WCLSB}$=4.85 μm and $w_{WCLLB}$=5.0 μm. The lengths of the waveguide core regions are $l_{SWC}$=0 μm, $l_{TDWC}$=30 μm, $l_{SRC}$=26 μm, and $l_{WC}$=56 μm. The length of the waveguide cladding is $l_{WCL}$=56 μm. It should be appreciated by one skilled in the art that all parameter values used in this and other exemplary embodiments are approximate and that the actual values can vary significantly.

(ii) General Operation of the Device

FIG. 17 shows the results of a computer simulation of the spatial distribution of the electric field strength for the light input at λ=1.5 μm after propagating into waveguide 1452. The mode size at the input end was 0.3 μm. After propagating for 25 μm, it begins to expand at the point where the waveguide thickness (at 5 μm from the tip) is tapered down to 0.05 microns, which is near the tip of the tapering down region. The mode then radiates at an angle from that point to a larger mode size. The mode size reaches a size of about 10 μm at 10 μm away from the tip of the taper.

(iii) Device Fabrication Procedures

An exemplary procedure for fabricating HRC-LSDT-ICMT device 1400 will now be described with reference to FIGS. 18A–D. This procedure is given for the purpose of illustration and not limitation, as there are other procedures that can be used to achieve the same fabrication results and other materials systems or device structures that can be utilized to fabricate devices with the same functional capabilities.

Figure 18A:
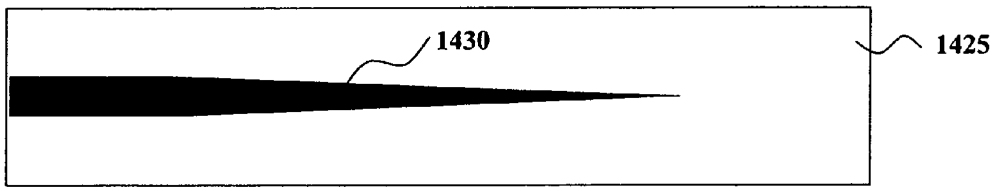
FIGS. 18A–D illustrates exemplary fabrication steps for the module of FIG. 16.
Figure 18B:
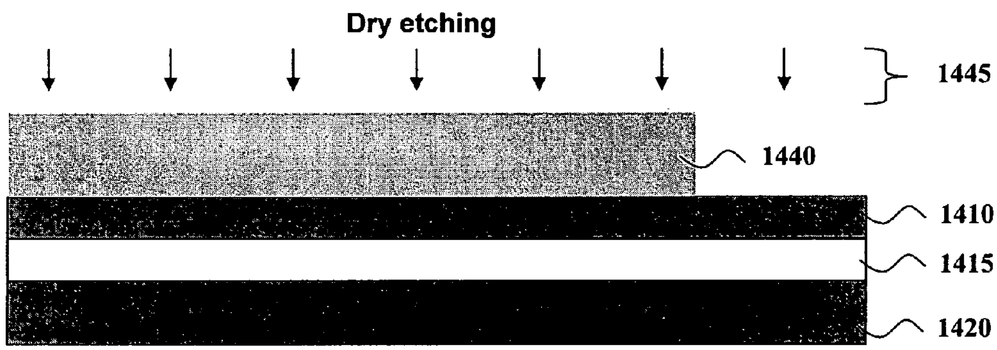
Figure 18C:
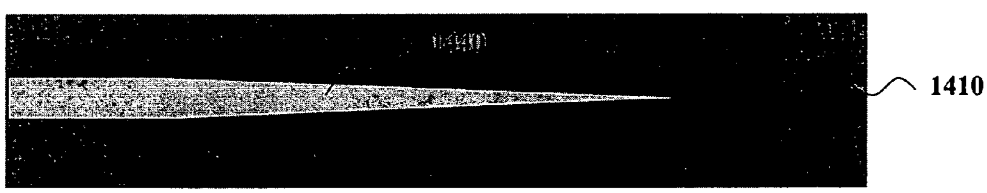

The HRC-LSDT ICMT can be fabricated by starting with a Silicon-On-Insulator (SOI) wafer. For a SOI wafer, a high refractive index silicon (Si) layer 1410 having a thickness of $t_1$ is already made or bonded on top of a low refractive index layer of $SiO_2$ 1415 with a thickness of $t_2$. The $SiO_2$ layer 1415 is typically either deposited on a Si substrate 1420 or thermally oxidized on the Si substrate or thermally oxidized in the Si substrate after an oxygen ion implantation process. A fabrication procedure according to one embodiment is described below:

A UV or e-beam resist layer 1405 is first spin-coated on the Si layer 1410, as shown in FIG. 18B. A mask 1425 with a laterally tapered down/narrow mask pattern 1430 as shown in FIG. 18A is used as a mask to expose the photoresist 1405 under UV light or e-beam 1435. The photoresist is then developed. The shape of the photoresist after exposure and development has a lateral down-tapered shape as shown by photoresist pattern 1440 in FIG. 18B and FIG. 18C.

Figure 18D:
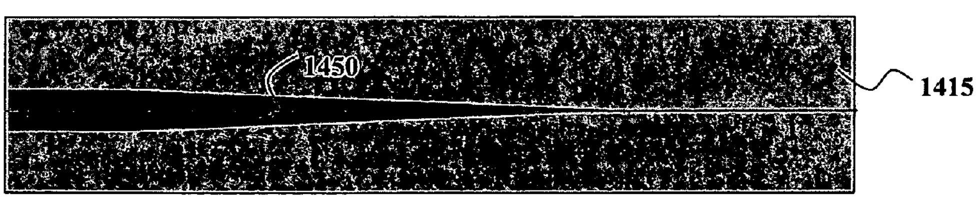

A dry plasma etching procedure 1445 that selectively etches Si but not the photoresist 1440 or the $SiO_2$ 1415 is used. Such a process can be accomplished using a reactive ion etching system, or an inductively coupled plasma system, or any dry plasma system. The exemplary processing gases are $SF_6/Cl_2$, as F-reactants and/or their neutrals etch Si, and S—Cl reactants and/or their neutrals inhibit the etching of $SiO_2$. Exemplary process parameters using a reactive ion etching system are: a mixture of approximately 30 sccm:20 sccm of $SF_6$:$Cl_2$, with an RF power of 200 W, and a process pressure of about 25 mTorr. This etching process transfers the laterally down tapered pattern of the photoresist 1440 to the high-refractive-index Si layer and forms the laterally tapered down Si section 1450. It should be noted that this transfer process is performed with the starting thickness for the Si waveguide layer in the range of 0.2 to 0.5 μm, and the photoresist layer has a typical thickness of about 1.0 μm. As the etching process can be made to etch $SiO_2$ at a lower rate, the interface between the top Si layer 1410 and the lower cladding $SiO_2$ 1415 can be used as a natural stop during the dry etching process. A top view of the result of the process is shown in FIG. 18D. It should be understood that the above process parameters are presented for purposes of illustrating a useful embodiment of the fabrication method and are not intended to limit other embodiments of the method. For example, a variety of dry etching parameters can be used depending on the photoresist type and the quality of the SOI wafer. As is known to those skilled in the art, the end result of a dry etched structure can be achieved via various combinations of the etching parameters. It should, also be noted that due to the limitation in the smallest feature size of UV based photolithography, e-beam lithography might be necessary or at least it might be required to form the tip part of the taper.

To make the glass cladding 1460, flame hydrolysis deposition, chemical vapor deposition, sputtering, Ion-Assisted-Deposition, or sol-gel spin coating of dielectric material, is employed to deposit the cladding regions 1460 shown in FIG. 16. The $TiO_2$—$SiO_2$ material required can, in particular, be achieved using a sol-gel mixture of $TiO_2$ and $SiO_2$ precursors as is well known to those skilled in the art. Note that the surrounding cladding, including the bottom, top and side cladding medium, can all have various fixed or spatially varying or distributed refractive indices and also a spatial variation or distribution of the refractive index value (as described below), and the actual value that can be selected for this purpose can cover a wide range of 1.4 to 2.5.

It should be understood that these dimensions and exemplary lengths are presented for the purposes of illustrating a useful embodiment of the device 1400 and are not intended to limit other embodiments of any exemplary device, or the device 1400. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the present invention, including the side surfaces, the top and bottom surfaces, and the input/output surfaces In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the devices.

It should be understood to those skilled in the art that the device 1400 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

(3) Exemplary Device 3: A High-Refractive-Index-Contrast-Lateral Gradual-Up-Taper (HRC-LGUT) ICMT Device FIG. 19 illustrates a third general embodiment of an ICMT device 1500 employing lateral tapering up beam enlarger with high refractive index contrast between the enlarger core region and its surrounding cladding region. The device performs as a one dimensional beam-size enlarging element in the lateral direction for a propagating optical beam and can for example enlarge an optical beam from a semiconductor waveguide with a beam size as small as $\lambda/7.5$ (or 0.2 μm for $\lambda$=1.5 μm) to a large optical beam such as one with a beam size close to that of an optical fiber. The device is not limited to use as a beam enlarger but can also function as a beam reducer when the optical beam propagates in the reverse direction. Furthermore, the device can be used in conjunction with another ICMT module such as a step-index waveguide module as will be described below to further collimate the beam for direct coupling into an optical fiber. It should be understood that these exemplary applications of device 1500 are intended to illustrate the uses for device 1500 and are not intended to limit the application of other embodiments of device 1500. The device can be referred to as a “high-refractive-index-contrast-lateral-gradual-up-taper (HRC-LGUT) ICMT”, and the tapering up is in the lateral direction.

The present HRC-LGUT ICMT preferably includes a tapering-up waveguiding core region occupied by Waveguide Core WC 1550. Waveguide Core WC 1550 is surrounded on both sides by Waveguide Cladding WCL 1560. Waveguide Core 1550 preferably includes a small-beam input/output port SB-PT 1551, a straight waveguiding core region SWC 1552, a tapering-up waveguiding core region TUWC 1553, a straight radiation core region SRC 1554, and a large-beam input/output port LB-PT 1555. The straight waveguiding core region SWC 1552 has a length $l_{SWC}$ and a width of $w_{SWC}$. The tapering up waveguiding core region TUWC 1553 has a length of $l_{TUWC}$, a width of $w_{TUWCSB}$ at the small-beam input/output side, and a width $w_{TUWCLB}$ at the large-beam input/output side. The straight radiation core region SRC 1554 has a length of $l_{SRC}$ and a width of $w_{SRC}$. The total length of the waveguide core is given by $l_{WC}=l_{SWC}+l_{TUWC}+l_{SRC}$. The width of the waveguide cladding WCL 1560 on both sides of the waveguide core WC 1550 is $w_{WCLSB}$ at the small beam input/output side, and is $w_{WCLLB}$ at the large beam side. The length of the waveguide cladding WCL 1560 $l_{WCL}$ is about equal to the total length of the waveguide core $l_{WC}$. The refractive index of the Waveguide Core WC 1550 is $n_{WC}$. The refractive index of the Waveguide Cladding WCL 1560 is $n_{WCL}$. The length of the straight waveguide core $l_{SWC}$ and the straight radiation core $l_{SRC}$ are typically not very critical to the operation of the device and can be zero in some applications (i.e. with these sections absent).

There are three options for the refractive index contrast of the ICMT device 1500, namely the small-refractive-index-contrast option, the medium-refractive-index-contrast option and the large-refractive-index-contrast option. For the small-refractive-index-contrast option, the refractive index ratio between the refractive index of the Waveguide Core 1550 and that of the Waveguide Cladding 1560 i.e. $n_{WC}/n_{WCL}$, is assumed to be larger than 1.0 but smaller than about 1.3. That is $1.3 \geqq n_{WC}/n_{WCL} \geqq 1.0$. For the medium-refractive-index-contrast option, the refractive index ratio between the refractive index of the Waveguide Core 1550 and that of the Waveguide Cladding 1560 i.e. $n_{WC}/n_{WCL}$, is assumed to be larger than about 1.3 but smaller than about 1.5. That is $1.5 \geqq n_{WC}/n_{WCL} \geqq 1.3$. For the large-refractive-index-contrast option, the refractive index ratio between the refractive index of the Waveguide Core 1550 and that of the Waveguide Cladding 1560 i.e. $n_{WC}/n_{WCL}$, is assumed to be larger than about 1.5. That is $n_{WC}/n_{WCL} \geqq 1.5$. A short tapering length can be achieved if the relative refractive index contrast is HIGH—in the region of either the medium-refractive-index contrast or the large-refractive-index contrast. In an exemplary device, the input/output port SB-PT 1551 is configured to receive/transmit a light beam 1561 typically having wavelength $\lambda$ with a beam width $w_{SB}$, and the input/output port LB-PT 1555 is configured to receive/transmit a light beam 1565 typically having wavelength $\lambda$ with a beam width $w_{LB}$. The medium and large refractive index contrast will be referred to as the high-refractive index case.

(i) An Exemplary Device for High-Refractive-Index-Contrast Case

In an exemplary embodiment of device 1500 with high-refractive-index-contrast, the Waveguide Core WC 1550 is made up of silicon (Si) with a refractive index of $n_{WC}$=3.5, the Waveguide Cladding WCL 1560 is made up of silica-titania ($SiO_2$—$TiO_2$) material mixture with a mixture composition to achieve a refractive index of $n_{UWCL}$=1.7 or alternatively $Si_3N_4$ with a refractive index of about 1.7 can be used. T with a refractive index of $n_{WCL}$=1.7. The widths of the waveguide core are $w_{SWC}$=0.3 μm, $w_{TUWCSB}$=0.3 μm, and $w_{TUWCLB}=w_{SRC}$=10 μm. The widths of the waveguide claddings are $w_{WCLSB}$=6.85 μm and $w_{WCLLB}$=2 μm. The lengths of the waveguide core regions are $l_{SWC}$=10 μm, $l_{TUWC}$=100 μm, $l_{SRC}$=10 μm, and $l_{WC}$=120 μm. The length of the waveguide cladding is $l_{WCL}$=120 μm. It should be appreciated by one skilled in the art that all parameter values used in this and other exemplary embodiments are approximate and that the actual values can vary significantly.

(ii) General Operation of the Device

FIG. 20 shows the results of a computer simulation of the spatial distribution of the electric field strength for the light input at $\lambda$=1.5 µm after propagating into waveguide 1552. The mode size at the input end was 0.3 µm. After propagating for 10 µm, it begins to expand at the point where the waveguide core tapers up. The mode then enlarges following the up-tapering waveguide core section to a larger mode size. The mode size reaches a size of about 10 µm at the end of the up-taper.

(iii) Device Fabrication Procedures

An exemplary procedure for fabricating an LGUT-ICMT device 1500 will now be described with reference to FIGS. 21A–E. This procedure is given for the purpose of illustration and not limitation, as there are other procedures that can be used to achieve the same fabrication results and other materials systems or device structures that can be utilized to fabricate devices with the same functional capabilities.

Figure 21A:
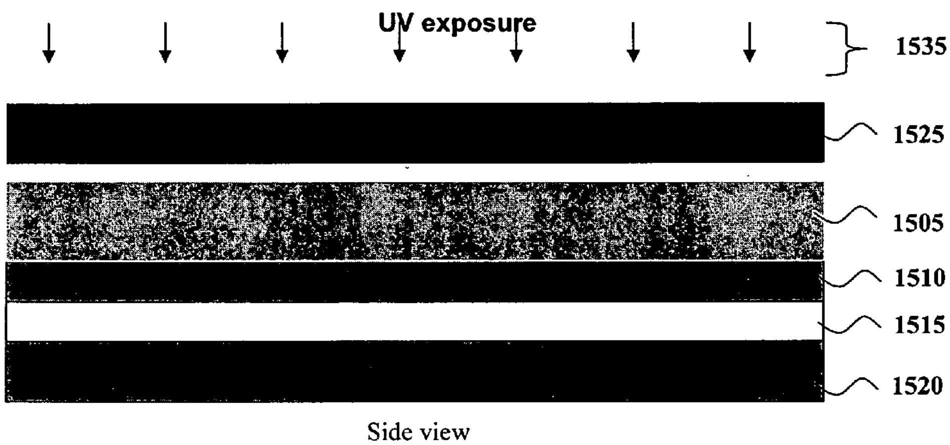
FIGS. 21A–E illustrates exemplary fabrication steps for the module of FIG. 19.

It should be noted that the fabrication steps here are very similar to those described for the laterally tapered down case. In fact, the present structure is even easier to fabricate because e-beam lithography is not required and hence the cost is even lower. The HRC-LGUT ICMT type structure can be fabricated by starting with a Silicon-On-Insulator (SOI) wafer that can be fabricated via a commercial process known to those skilled in the art. For a SOI wafer, a high refractive index silicon (Si) layer 1510 having a thickness of $t_1$ is already made or bonded on top of a low refractive index layer of $SiO_2$ 1515 with a thickness of $t_2$, as shown in FIG. 21A. The $SiO_2$ layer 1515 is typically either deposited on a Si substrate 1520 or thermally oxidized on the Si substrate or thermally oxidized in the Si substrate after an oxygen ion implantation process. The fabrication procedure according to one embodiment is now described below.

Figure 21B:
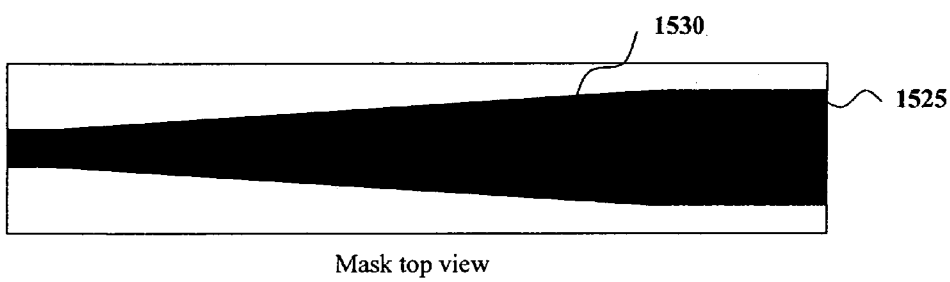

A photoresist layer 1505 is first spin-coated on the Si layer 1510, as shown in FIG. 21A. A mask 1525 with a laterally tapered up mask pattern 1530, shown in FIG. 21B, is used as a mask to expose the photoresist 1505 under UV light 1535. The photoresist is then developed. The shape of the photoresist after exposure and development has a lateral up tapered shape as shown by photoresist pattern 1540 in FIG. 21D.

Figure 21C:
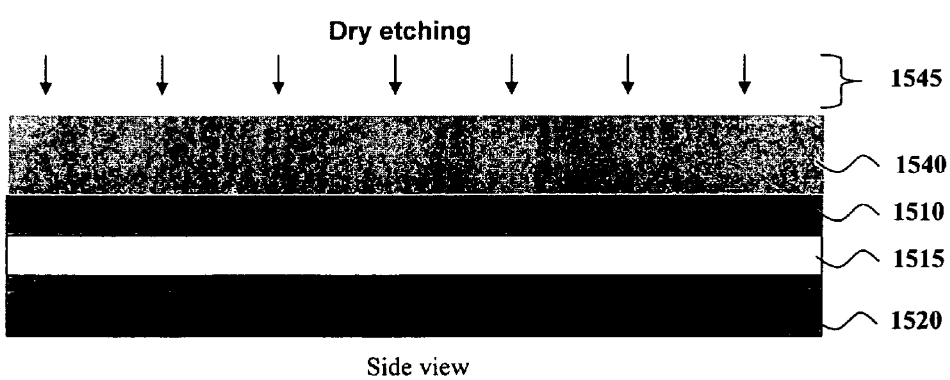
Figure 21D:
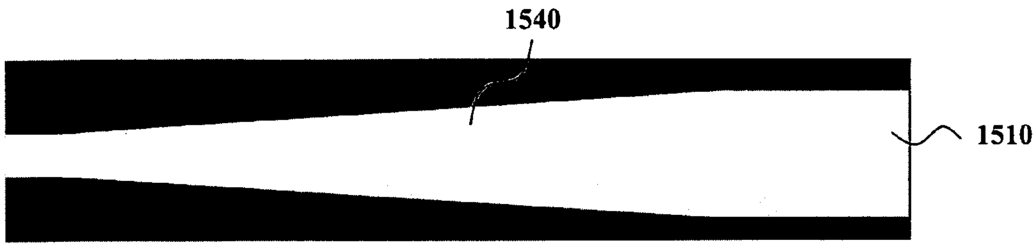
Figure 21E:
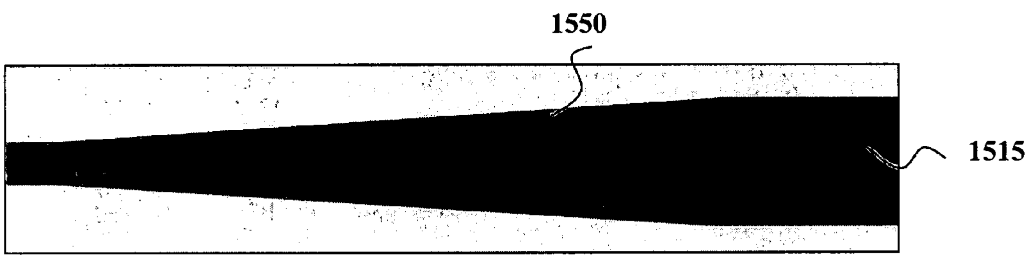

A dry plasma etching procedure 1545 that selectively etches Si but not the photoresist 1540 or the $SiO_2$ 1515 can be used, as shown in FIG. 21C. Such an etch process is accomplished using a reactive ion etching system, or an inductively coupled plasma system, or any dry plasma system. The exemplary processing gases are $SF6/Cl_2$, as F-reactants and/or their neutrals etch Si, and S—Cl reactants and/or their neutrals inhibit the etching of $SiO_2$. Exemplary process parameters using a reactive ion etching system are: a mixture of 30 sccm:20 sccm of $SF_6$:$Cl_2$, with an RF power of 200 W, and a process pressure of 25 mTorr. This etching process transfers the laterally up tapered pattern of the photoresist 1540 to the high-refractive-index Si layer and forms the laterally up-tapered Si section 1550. It should be noted that this transfer process is possible because the starting thickness of the Si waveguide layer is in the range of 0.2 to 0.5 µm, and the photoresist layer has a typical thickness of about 1.0 µm. As the etching process can be made to etch $SiO_2$ at a lower rate, the interface between the top Si layer 1510 and the lower cladding $SiO_2$ 1515 can be used as a natural stop during the dry etching process. It should be understood that the above process parameters are presented for purposes of illustrating a useful embodiment of the fabrication method and are not intended to limit other embodiments of the method. For example, a variety of dry etching parameters can be used depending on the photoresist type and the quality of the SOI wafer. As is known to those skilled in the art, the end result of a dry etched structure can be achieved via various combinations of the etching parameters.

To make the glass cladding 1560, flame hydrolysis deposition, chemical vapor deposition, sputtering, Ion-Assisted-Deposition, or sol-gel spin coating of dielectric material, can generally be employed to deposit the cladding regions 1560 shown in FIG. 19. The $TiO_2$—$SiO_2$ material required can, in particular, be achieved using a sol-gel mixture of $TiO_2$ and $SiO_2$ precursors as is well known to those skilled in the art. Note that the surrounding cladding, including the bottom, top and side cladding medium, can all have various refractive indices and also a spatial variation or distribution of the refractive index value (as described below), and the actual value that can be selected for this purpose can cover a wide range, for instance 1.4 to 2.5.

It should be understood that these dimensions and exemplary lengths are presented for the purposes of illustrating a useful embodiment of the device 1500 and are not intended to limit other embodiments of any exemplary device, or the device 1500. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the present invention, including the side surfaces, the top and bottom surfaces, and the input/output surfaces.

In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the devices.

It should be understood to those skilled in the art that the device 1500 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

(4) Exemplary Device 4: A Vertical Sharp-Down-Taper and Lateral Gradual-Up-Taper (HRC-VSDT×LGUT) ICMT Device FIGS. 22A–B illustrates a fourth general embodiment of an ICMT device 1600 including a lateral gradual up-tapered and vertical sharp down-tapered beam transformer with high refractive index contrast between the enlarger core region and its surrounding cladding region. The device can perform as a two dimensional beam-size enlarging element in both the lateral and the vertical directions for a propagating optical beam and can, for example, enlarge an optical beam from a semiconductor waveguide with a beam size as small as λ/7.5 (or 0.2 μm for λ=1.5 μm) to a large optical beam such as one with a beam size more than five times larger. The device is not limited to use as a beam enlarger but can also function as a beam reducer when the optical beam propagates in the reverse direction. Furthermore, the device can be used other ICMT modules such as a lateral step-index waveguide module and a vertical graded index waveguide module as will be discussed below to further collimate the beam for direct coupling into an optical fiber. It should be understood that these exemplary applications of device 1600 are intended to illustrate the uses for device 1600 and are not intended to limit the applications of other embodiments of device 1600. The device can be referred to as a "high-refractive-index-contrast-vertical sharp-down-taper and lateral gradual-up-taper ICMT" (HRC-VSDT×LGUT ICMT).

The present HRC-VSDT×LGUT ICMT preferably includes a laterally up-tapered and vertically down-tapered waveguiding core region occupied by Waveguide Core WC 1650. When viewed from the top, Waveguide Core WC 1650 is surrounded on both sides by Side Waveguide Cladding SWCL 1670. Waveguide Core 1650 preferably includes a lateral small-beam input/output port LSB-PT 1671, a laterally straight waveguiding core region LSWC 1672, a laterally tapering-up waveguiding core region LTUWC 1673, a laterally straight radiation core region LSRC 1674, and a lateral large-beam input/output port LLB-PT 1675. The laterally straight waveguiding core region LSWC 1672 has a length $l_{LSWC}$ and a width of $w_{LSWC}$. The laterally tapering up waveguiding core region LTUWC 1673 has a length of $l_{LTUWC}$, a lateral width of $w_{LTUWCSB}$ at the small-beam input/output side, and a width $w_{LTUWCLB}$ at the large-beam input/output side. The laterally straight radiation core region LSRC 1674 has a length of $l_{LSRC}$ and a width of $w_{LSRC}$. The total length of the waveguide core when viewed from the top is given by $l_{WC}=l_{LSWC}+l_{LTUWC}+_{LSRC}$. The width of the side waveguide cladding SWCL 1670 on both sides of the waveguide core WC 1650 is $w_{SWCLSB}$ at the small beam input/output side, and is $w_{SWCLLB}$ at the large beam side. The length of the side waveguide cladding SWCL 1670 $l_{SWCL}$ is about equal to the total length of the waveguide core $l_{WC}$. The length of the straight waveguide core $l_{SWC}$ and the straight radiation core $l_{LSRC}$ are typically not very critical to the operation of the device and can be zero in some applications (i.e., with these sections absent).

When viewed from the side, Waveguide Core WC 1650 is surrounded at the bottom by Lower Waveguide Cladding LWCL 1615, and at the top by Upper Waveguide Cladding UWCL 1690. Waveguide Core 1650 preferably includes a vertical small-beam input/output port VSB-PT 1691, a vertically straight waveguiding core region VSWC 1692, a vertically tapering-down waveguiding core region VTDWC 1693, a vertically straight radiation core region VSRC 1694, and a vertical large-beam input/output port VLB-PT 1695. The vertically straight waveguiding core region VSWC 1692 has a length $l_{VSWC}$ and a thickness of $t_{VSWC}$. The vertically tapering down waveguiding core region VTDWC 1693 has a length of $l_{VTDWC}$, a vertical thickness of $t_{VTDWCSB}$ at the small-beam input/output side, and a vertical thickness of $t_{VTDWCLB}$ at the large-beam input/output side. The vertically straight radiation core region VSRC 1694 has a length of $l_{VSRC}$ and a thickness of $t_{VSRC}$. The total length of the waveguide core when viewed from the side is given by $l_{WC}=l_{VSWC}+l_{VTDWC}+l_{VSRC}$. The thickness of the lower waveguide cladding LWCL 1615 is $t_{LWCL}$. The thickness of the upper waveguide cladding UWCL 1690 at the small-beam input/output side is $t_{UWCLSB}$ and at the large-beam input-output side is $t_{UWCLLB}$. The length of the upper cladding $l_{UWCL}$ and the length of the lower cladding $l_{LWCL}$ are about equal to the total length of the waveguide core $l_{WC}$. The length of the straight waveguide core $l_{LSWC}$ and the straight radiation core $l_{LSRC}$ are typically not very critical to the operation of the device and can be zero in some applications (i.e., with these sections absent).

The refractive index of the Waveguide Core WC 1650 is $n_{WC}$. The refractive index of the Side Waveguide Cladding SWCL 1670 is $n_{SWCL}$. The refractive index of the Lower Waveguide Cladding LWCL 1615 is $n_{LWCL}$. The refractive index of the Upper Waveguide Cladding UWCL 1690 is $n_{UWCL}$.

There are three options for the refractive index of the ICMT device 1600, namely the small-refractive-index-contrast option, the medium-refractive-index-contrast option and the large-refractive-index-contrast option. For the small-refractive-index-contrast option, the refractive index ratio between the refractive index of the Waveguide Core 1650 and that of the Waveguide Claddings 1615/1690/1670 i.e. $n_{WC}/n_{LWCL}$, $n_{WC}/n_{UWCL}$, $n_{WC}/n_{SWCL}$, is assumed to be larger than 1.0 but smaller than about 1.3. That is $1.3 \geqq n_{WC}/n_{LWCL}$, $n_{WC}/n_{UWCL}$, $n_{WC}/n_{SWCL}$, $\geqq 1.0$. For the medium-refractive-index-contrast option, the refractive index ratio between the refractive index of the Waveguide Core 1650 and that of the Claddings 1615/1690/1670 i.e. $n_{WC}/n_{LWCL}$, $n_{WC}/n_{UWCL}$, $n_{WC}/n_{SWCL}$, is assumed to be larger than 1.3 but smaller than about 1.5. That is $1.5 \geqq n_{WC}/n_{LWCL}$, $n_{WC}/n_{UWCL}$, $n_{WC}/n_{SWCL}$, $\geqq .1.3$. For the large-refractive-index-contrast option, the refractive index ratio between the refractive index of the Waveguide Core 1650 and that of the Claddings 1615/1690/1670 i.e. $n_{WC}/n_{LWCL}$, $n_{WC}/n_{UWCL}$, $n_{WC}/n_{SWCL}$, is assumed to be larger than about 1.5. That is $n_{WC}/n_{LWCL}$, $n_{WC}/n_{UWCL}$, $n_{WC}/n_{SWCL}$, $\geqq 1.5$. A short tapering length can be achieved if the relative refractive index contrast is high—in the region of either the medium-refractive-index contrast or the large-refractive-index contrast. The medium and large refractive index contrast will be referred to as the high-refractive index case.

In an exemplary device, the input/output port LSB-PT/VSB-PT 1671/1691 is configured to receive/transmit a light beam 1678/1698 typically having wavelength λ with a lateral beam width $w_{LSB}$, and a vertical beam width $w_{VSB}$. The input/output port LLB-PTJVLB-PT 1675/1695 is configured to receive/transmit a light beam 1679/1699 typically having wavelength λ with a lateral beam width of $w_{LLB}$, and a vertical beam width of $w_{VLB}$.

(i) An Exemplary Device

In an exemplary embodiment of device 1600, the Waveguide Core WC 1650 is made up of silicon (Si) with a refractive index of $n_{WC}=3.5$, the Lower Waveguide Cladding LWCL 1615 is made up of silica ($SiO_2$) with a refractive index of $n_{LWCL}=1.5$, and the Upper and Side Waveguide Claddings UWCL/SWCL are made of silica-titania ($SiO_2$—$TiO_2$) material mixture with a mixture composition to achieve a refractive index of $n_{UWCL}=1.7$ or alternatively $Si_3N_4$ with a refractive index of about 1.7 can be used.

When viewed from the top, the lateral widths of the waveguide core are $w_{LSWC}=0.3$ μm, $w_{LTUWCSB}=0.3$ μm, and $w_{LTUWCLB}=w_{LSRC}=10$ μm. The widths of the side waveguide claddings are $w_{SWCLSB}=4.85$ μm and $w_{SWCLLB}=0$ μm. The lengths of the waveguide core regions are $l_{LSWC}=10$ μm, $l_{LTUWC}=100$ μm, $l_{LSRC}=10$ μm, and $l_{WC}=120$ μm. The length of the side waveguide cladding is $l_{SWCL}=120$ μm.

When viewed from the side, the vertical thicknesses of the waveguide core are $t_{VSWC}$=0.3 μm, $t_{VTDWCSB}$=0.3 μm, and $t_{VTDWCLB}$=$t_{VSRC}$=0. The thicknesses of the upper and lower waveguide claddings are $t_{UWCLSB}$=9.7 μm, $t_{UWCLLB}$=10 μm, and $t_{LWCL}$=0.6 μm. The lengths of the waveguide core regions are $l_{VSWC}$=80 μm, $l_{VTDWC}$=30 μm, $l_{VSRC}$=0 μm, and $l_{WC}$=110 μm. The lengths of the upper and lower waveguide claddings are $l_{UWCL}$=$l_{LWCL}$=$l_{WC}$=120 μm. It should be appreciated by one skilled in the art that all parameter values used in this and other exemplary embodiments are approximate and that the actual values can vary significantly.

(ii) General Operation of the Device

FIG. 23 shows the result of a computer simulation of the spatial distribution of the electric field strength in the vertical and lateral directions for the light input at λ=1.5 μm after propagating into waveguide 1672/1692. The mode size at the input end was 0.3 μm in both the vertical and lateral directions.

When viewed from the side, the light beam begins to expand at the point where the waveguide thickness (at 5 μm distance from the tip) is tapered down to 0.05 microns, which is near the tip of the tapering down region. The mode then radiate at an angle from that point to a larger mode size. The mode size reaches a size of about 5 μm at 10 μm away from the tip of the taper.

When viewed from the top, the light beam begins to expand at the point where the waveguide core tapers up laterally. The mode then enlarges following the lateral up-tapering waveguide core section 1673 to a larger mode size. The mode size reaches a size of about 10 μm at the end of the up-taper.

(iii) Device Fabrication Procedures

An exemplary procedure for fabricating the HRC-VSDT×LGUT ICMT device 1600 will now be described with reference to FIGS. 24A–F. This procedure is given for the purpose of illustration and not limitation, as there are other procedures that can be used to achieve the same fabrication results and other materials systems or device structures that can be utilized to fabricate devices with the same functional capabilities.

The HRC-VSDT×LGUT ICMT is fabricated by starting with a Silicon-On-Insulator (SOI) wafer. For a SOI wafer, a high refractive index silicon (Si) layer 1610 having a thickness of $t_1$ is already made or bonded on top of a low refractive index layer of $SiO_2$ 1615 with a thickness of $t_2$, as illustrated in FIG. 24A. The $SiO_2$ layer 1615 is typically either deposited on a Si substrate 1620 before wafer bonding or thermally oxidized on the Si substrate before wafer bonding or thermally oxidized in the Si substrate after an oxygen ion implantation process. The fabrication procedure according to one embodiment is now described below:

A photoresist layer 1605 is first spin-coated on the Si layer 1610, as shown in FIG. 24A. A mask 1625 with a pattern 1630 as shown in FIG. 24B is used to expose the photoresist 1605 under UV light 1635. The mask pattern 1630 is gray scaled in the longitudinal direction and laterally tapered up in the lateral direction. The gray-scale mask pattern is designed so that it gives a graduated exposure level with exposure dosage that varies from a small value to a large value across a length of 30 μm. The photoresist is then developed. The shape of the photoresist after exposure and development is a vertical down tapered shape that corresponds to the variation in the exposure dosage and a laterally tapered up shape as shown by photoresist pattern 1640 in FIG. 24C and FIG. 24D.

A dry plasma etching procedure 1645 with selectivity of 1:0.3:~0 between photoresist and Si and $SiO_2$ is used to etch down the Si layer vertically. Such a process is accomplished using a reactive ion etching system, or an inductively coupled plasma system, or any dry plasma system. The exemplary processing gases are $SF_6/O_2/Cl_2$, as F-reactants and/or their neutrals etch Si, whereas $O_2$ etches photoresist and S—Cl reactants and/or their neutrals inhibit the etching of $SiO_2$. Exemplary process parameters using a reactive ion etching system are: a mixture of 30 sccm:20 sccm:20 sccm of $SF_6$:$O_2$:$Cl_2$, with an RF power of 350 W, and a process pressure of 25 mTorr. This etching process transfers the laterally up tapered and vertically down tapered pattern of the photoresist 1640 to the high-refractive-index Si layer and forms the laterally tapered up and vertically tapered down Si section 1650. The resulting structure is shown in FIGS. 24E and 24F. It should be noted that the easiness of this transfer process is dependent on the thickness $t_1$ of the top waveguiding Si layer. Typically the starting thickness for such a Si waveguide should be in the range of 0.2 to 0.5 μm. Considering that the photoresist layer has a typical thickness of about 1.0 μm and that the etching process typically etches Si at a rate that is not drastically different from that for the photoresist, such a direct pattern transfer can be achieved. As the etching process can be made to etch $SiO_2$ at a much slower rate, the interface between the top Si layer 1610 and the lower cladding $SiO_2$ 1615 can be used as a natural stop during the dry etching process. It should be understood that the above process parameters are presented for purposes of illustrating a useful embodiment of the fabrication method and are not intended to limit other embodiments of the method. For example, a variety of dry etching parameters can be used depending on the photoresist type and the quality of the SOI wafer. As is known to those skilled in the art, the end result of a dry etched structure can be achieved via various combinations of the etching parameters.

To make the glass cladding, flame hydrolysis deposition, chemical vapor deposition, sputtering, Ion-Assisted-Deposition, or sol-gel spin coating of dielectric material, can generally be employed to deposit the top and side cladding regions 1690/1670 shown in FIGS. 22A–B. The $TiO_2$—$SiO_2$ material required can, in particular, be achieved using a sol-gel mixture of $TiO_2$ and $SiO_2$ precursors as is well known to those skilled in the art. Note that the surrounding cladding, including the bottom, top and side cladding medium, can all have various refractive indices and also a spatial variation or distribution of the refractive index value (described below), and the actual value that can be selected for this purpose can cover a wide range, e.g., 1.4 to 2.5.

It should be understood that these dimensions and exemplary lengths are presented for the purposes of illustrating a useful embodiment of the device 1600 and are not intended to limit other embodiments of any exemplary device, or the device 1600. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the present invention, including the side surfaces, the top and bottom surfaces, and the input/output surfaces.

In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the devices.

It should be understood to those skilled in the art that the device 1600 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

Figure 25:
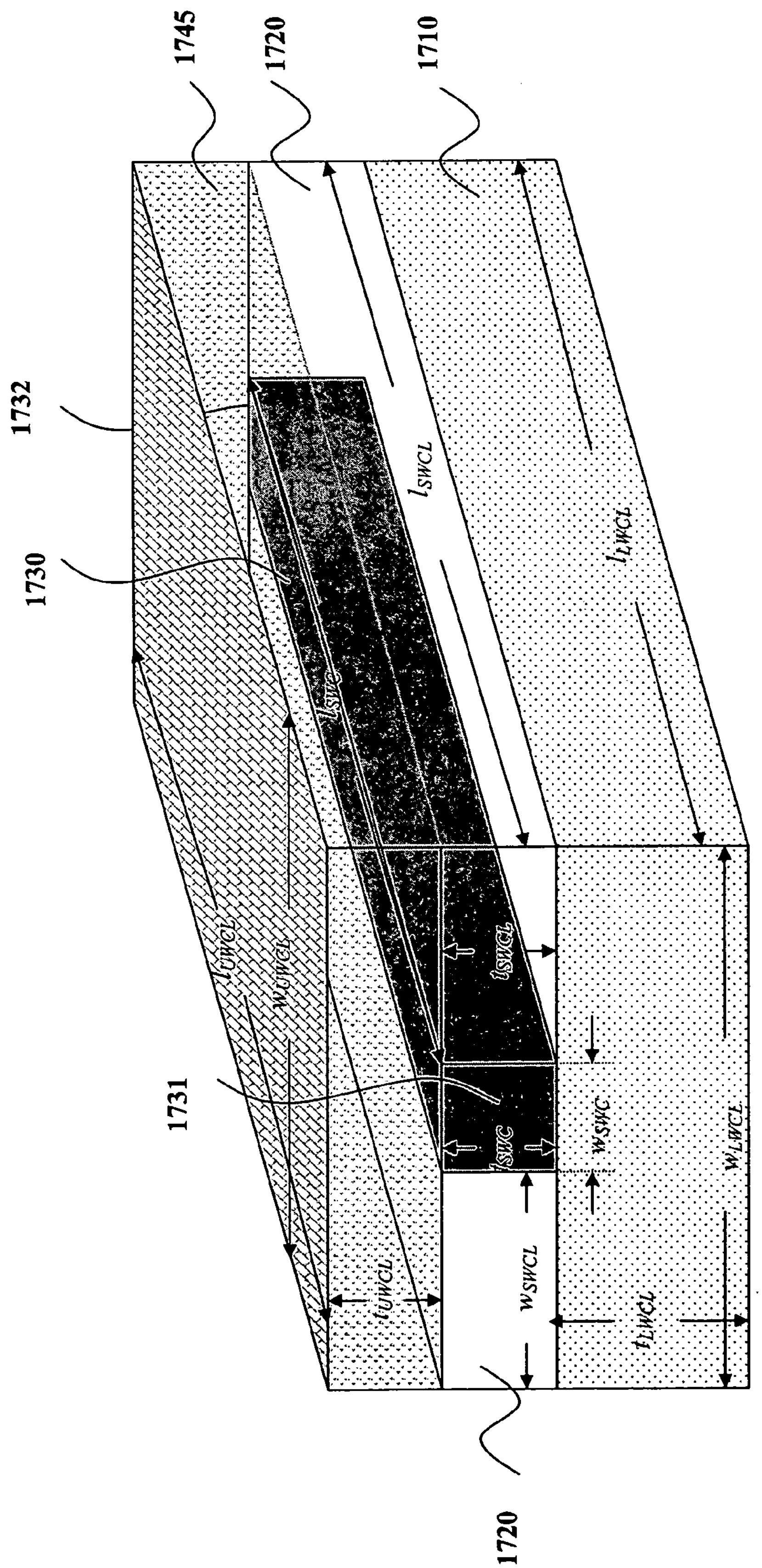
FIG. 25 is a perspective view of a glass/polymer waveguide module with a step refractive index in the vertical and horizontal/lateral direction according to the present invention.

(5) Exemplary Device 5: A Lateral-Step-Refractive-Index and Vertical-Step-Refractive-Index (LSRIN×VSRIN) ICMT Device FIG. 25 illustrates a fifth general embodiment of an ICMT device 1700 including a vertical and lateral step refractive index distribution to form a step index channel waveguide with refractive index difference between the core region and its surrounding cladding region. The device can perform as a two dimensional beam-size collimating element in both the lateral and the vertical directions for a propagating optical beam and can, for example, confine an optical beam that has already been expanded or enlarged from a small semiconductor waveguide using devices such as any of exemplary devices 1–4. The device is not limited to use as a beam collimator but can also function as a waveguide to direct a light beam to a beam reducer when the optical beam propagates in the reverse direction. Furthermore, the device can be used for direct light beam coupling into an optical fiber. It should be understood that these exemplary applications of device 1700 are intended to illustrate the uses for device 1700 and are not intended to limit the applications of other embodiments of device 1700. The device can be referred to as a "low-refractive-index-contrast-vertical-step-refractive-index and lateral-step-refractive-index (LRC-LSRIN×VSRIN) ICMT".

The present LRC-LSRIN×VSRIN ICMT preferably includes a waveguiding core region occupied by Waveguide Core WC 1730. Waveguide Core WC 1730 is surrounded at the bottom by Lower Waveguide Cladding LWCL 1710, on the top by Upper Waveguide Cladding UWCL 1745 and on both sides by Side Waveguide Cladding SWCL 1720. Waveguide Core 1730 preferably includes a front beam input/output port FB-PT 1731, a straight waveguiding core region SWC 1730, and a back beam input/output port BB-PT 1732. The straight waveguiding core region SWC 1730 has a length $l_{SWC}$, a width of $w_{SWC}$ and a thickness of $t_{SWC}$. Lower Waveguide Cladding LWCL 1710 has a length of $l_{LWCL}$, a width of $w_{LWCL}$ and a thickness of $t_{LWCL}$. Upper Waveguide Cladding UWCL 1745 has a length of $l_{UWCL}$, a width of $w_{UWCL}$ and a thickness of $t_{UWCL}$. The two side waveguide claddings SWCL 1720 have a length of $l_{SWCL}$, a width of $w_{SWCL}$ and a thickness of $t_{SWCL}$. The lengths of the waveguide claddings LWCL/UWCL/SWCL 1710/1745/1720, $l_{LWCL}$, $l_{UWCL}$, and $l_{SWCL}$ are about equal to the length of the waveguide core $l_{WC}$. The refractive index of the Waveguide Core WC 1730 is $n_{WC}$. The refractive index of the Lower Waveguide Cladding LWCL 1710 is $n_{LWCL}$. The refractive index of the Upper Waveguide Cladding UWCL 1710 is $n_{UWCL}$. The refractive index of the Side Waveguide Cladding SWCL 1710 is $n_{SWCL}$.

In an exemplary device, the front beam input/output port FB-PT 1731 is configured to receive/transmit a light beam typically having wavelength λ with a beam size that roughly equals the size of an optical fiber, and the back beam input/output port LB-PT 1732 is also configured to receive/transmit a light beam typically having wavelength λ with a beam size that roughly equals the size of an optical fiber.

(i) An Exemplary Device

In an exemplary embodiment, the Waveguide Core WC 1730 is made up of lead-titania-silica with a refractive index of $n_{WC}$=1.71, or $Si_3N_4$ with a refractive index of about 1.7. The Lower Waveguide Cladding LWCL 1710 is made up of silica with a refractive index of $n_{LWCL}$=1.5. The Upper Waveguide Cladding UWCL is made up of silica-titania with a refractive index of $n_{UWCL}$=1.7, or $Si_3N_4$ with a refractive index of about 1.7. The Side Waveguide Cladding SWCL is made up of lead silica-titania with a refractive index of $n_{SWCL}$=1.7, or $Si_3N_4$ with a refractive index of about 1.7. The size of the waveguide core is $l_{WC}$=50 μm, $w_{WC}$=10 μm and $t_{WC}$=10 μm. The size of the lower waveguide cladding is $l_{LWCL}$=50 μm, $w_{LWCL}$=20 μm and $t_{LWCL}$=1 μm. The size of the upper waveguide cladding is $l_{UWCL}$=50 μm, $w_{UWCL}$=20 μm and $t_{UWCL}$=1 μm. The size of the two side waveguide claddings is $l_{SWCL}$=50 μm, $w_{SWCL}$=5 μm and $t_{SWCL}$=10 μm. It should be appreciated by one skilled in the art that all parameter values used in this and other exemplary embodiments are approximate and that the actual values can vary significantly.

(ii) General Operation of the Device

Figure 26A:
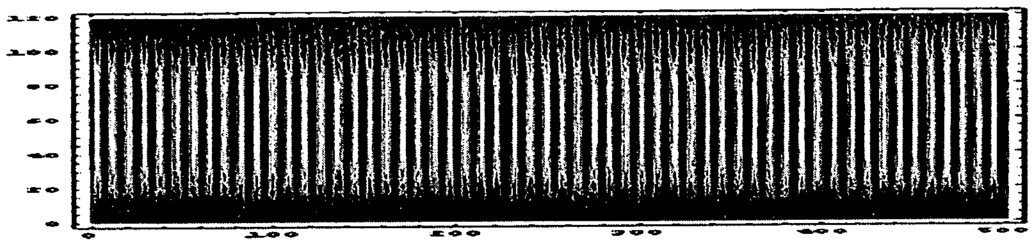
FIG. 26 is a result of a computer simulation of light propagation in the module of FIG. 25.
Figure 26B:
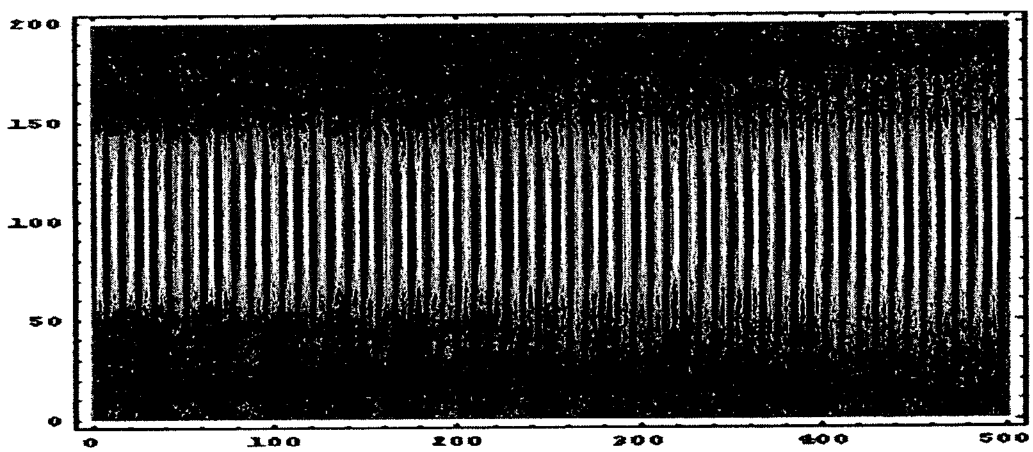

FIG. 26 shows the result of a computer simulation of the spatial distribution of the electric field strength for the light input at λ=1.5 μm after propagating into waveguide 1730. The mode size at the input end is 10 μm. The waveguide confines the mode and guides its propagation to the other port. The mode size remains at about 10 μm at the other end of the waveguide.

(iii) Device Fabrication Procedures

An exemplary procedure for fabricating the LRC-LSRIN×VSRIN ICMT device 1700 will be described with reference to FIGS. 27A–E. This procedure is given for the purpose of illustration and not limitation, as there are other procedures that can be used to achieve the same fabrication results and other materials systems or device structures that can be utilized to fabricate devices with the same functional capabilities.

Figure 27A:
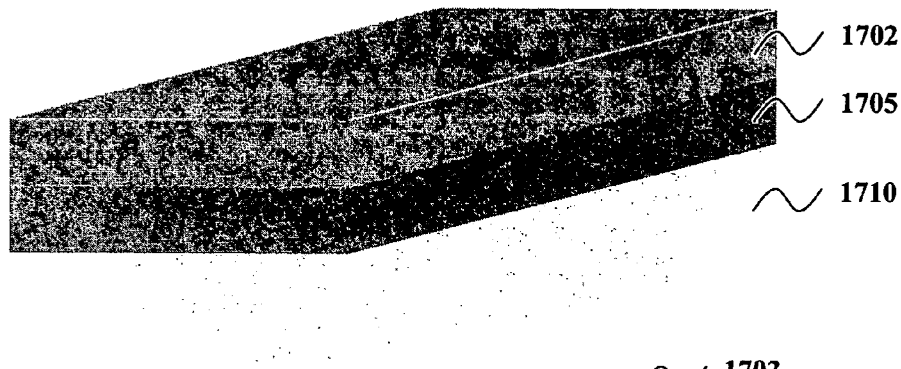
FIGS. 27A–E illustrates exemplary fabrication steps for the module of FIG. 25.

The LRC-LSRIN×VSRIN ICMT can be fabricated by starting with a Silica-On-Silicon (SOS) wafer that can be fabricated via a commercial process known to those skilled in the art, as shown in FIG. 27A. For a SOS wafer, a low refractive index layer of $SiO_2$ 1710 with a thickness of $t_{LWCL}$ is already made on the Si substrate (not shown). The $SiO_2$ layer 1710 is typically either deposited on a Si substrate or thermally oxidized on the Si substrate. There are at least two possible ways to fabricate the LRC-LSRIN×VSRIN ICMT.

Figure 27B:
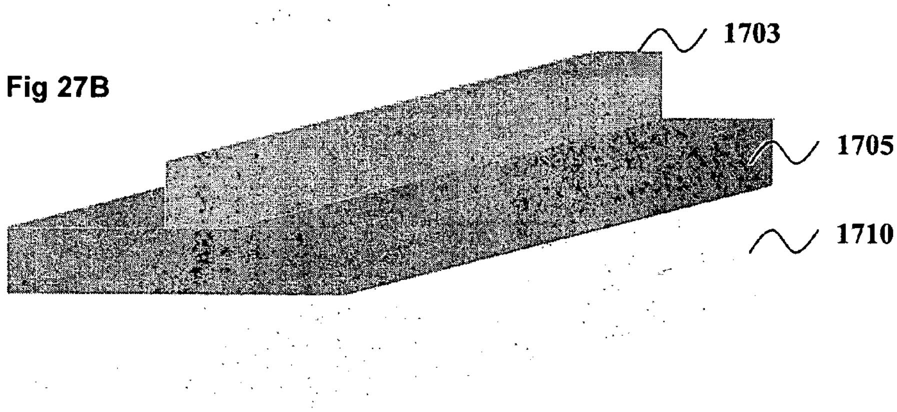
Figure 27C:
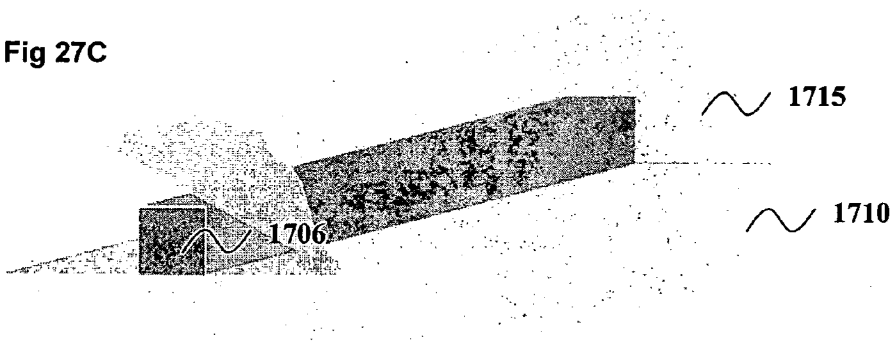

Method 1: As shown in FIG. 27A, a dielectric or glass waveguiding film 1705 is deposited on the $SiO_2$ layer 1710, which acts as a lower waveguide cladding. Depending on the dielectric material, an appropriate film deposition method can be used including evaporation, sputtering, Ion-Assisted-Deposition, chemical vapor deposition, flame hydrolysis, and spin or dip coating. As is well known to those skilled in the art, a common way to make a lateral step refractive index distribution is to dry etch a stripe 1706 in the deposited film. This can be easily achieved by photolithography. A photoresist layer 1702 can be deposited and UV-exposed through a conventional stripe mask. After photoresist development, a photoresist stripe pattern 1703 is generated, as shown in FIG. 27B. Dry etching can then be used to transfer the photoresist stripe pattern to the dielectric or glass waveguide film 1705 to form a stripe pattern 1706, shown in FIG. 27C. While air can be used as the top and side cladding, generally speaking, a surrounding cladding material is preferred and such a cladding 1715, which acts both as the upper waveguide cladding and the side waveguide cladding, can always be deposited, as shown in FIG. 27C.

Figure 27D:
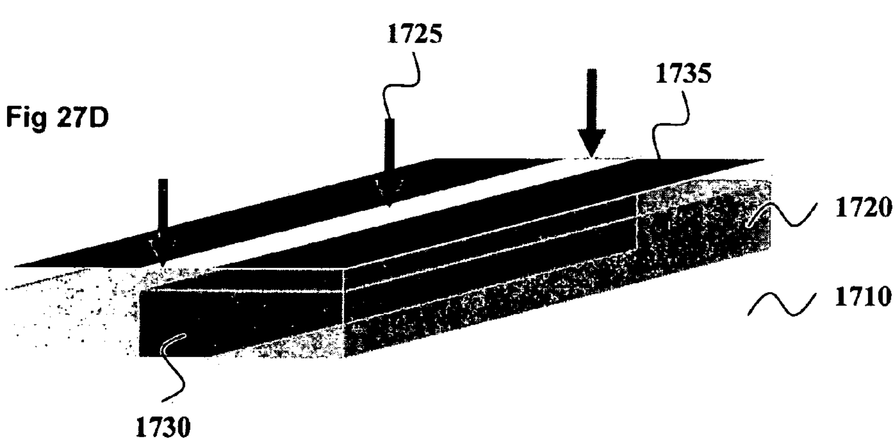
Figure 27E:
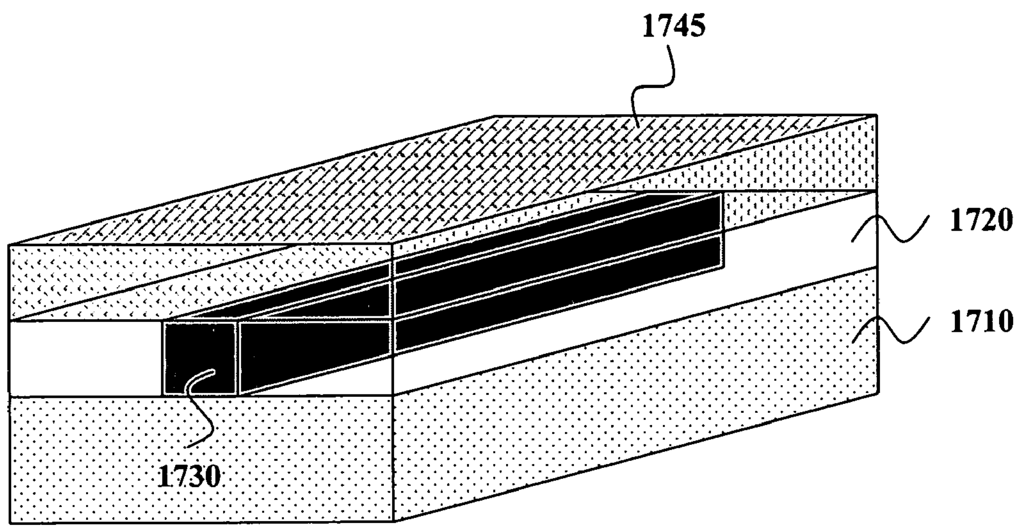

Method 2: Another approach to make a step refractive index distribution in the lateral direction is to first deposit a photosensitive waveguide film 1720 on the $SiO_2$ 1710, as shown in FIG. 27D. In the case of silica-based glass, typically, Ge or Pb can be incorporated to make the glass film photosensitive. The incorporation of Ge or Pb for making a glass film photosensitive are described in a copending U.S. patent application Ser. No. 09/884,691 having the same inventors herein, entitled: "Method for Forming a Refractive-Index-Patterned Film for Use in Optical Device Manufacturing," the disclosure of which is hereby incorporated by reference herein in its entirety. After the deposition of such a film 1720, UV photo-imprinting 1725 through a conventional photomask 1735 can be used to define a refractive index increased stripe 1730. If an upper cladding is preferred, a film 1745 with a refractive index lower than that of the photoimprinted stripe can then be deposited, as shown in FIG. 27E. Alternatively, such a film can even be deposited before the UV photoimprinting as long as this upper cladding film does not substantially absorb the UV light. An obvious advantage of the photoimprinting approach is that the fabrication of a buried channel waveguide is significantly simplified as it does not involve etching, and hence the fabrication cost is also significantly lowered.

Either of the two methods produces a buried channel waveguide that has a step refractive index distribution in both the vertical and the horizontal/lateral direction.

It should be understood that these dimensions and exemplary lengths are presented for the purposes of illustrating a useful embodiment of the device 1700 and are not intended to limit other embodiments of any exemplary device, or the device 1700. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the present invention, including the side surfaces, the top and bottom surfaces, and the input/output surfaces.

In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the devices.

It should be understood to those skilled in the art that the device 1700 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

(6) Exemplary Device 6 (A) A Composite-Lateral-Step-Refractive-Index and Vertical-Graded-Refractive Index (LSRIN×VGRIN) ICMT Device FIG. 28 illustrates a sixth general embodiment of an ICMT device 1800 including a vertically graded and laterally step refractive index distribution to form a channel waveguide. The device 1800 can perform as a two dimensional beam-size collimating element in both the lateral and the vertical directions for a propagating optical beam and can, for example, confine and collimate an optical beam that has already been expanded or enlarged from a small semiconductor waveguide using a device such as any of exemplary devices 1–4. The device is not limited to use as a beam collimator but can also function as a waveguide to direct a light beam to a beam reducer when the optical beam propagates in the reverse direction. Furthermore, the device can be used for direct light beam coupling into an optical fiber. It should be understood that these exemplary applications of device 1800 are intended to illustrate the uses for device 1800 and are not intended to limit the applications of other embodiments of device 1800. The device can be referred to as a "composite-lateral-step-refractive-index and vertical-graded-refractive index (LSRIN×VGRIN) ICMT".

LSRIN×VGRIN ICMT 1800 preferably includes a waveguiding core region occupied by Waveguide Core WC 1835. Waveguide Core WC 1835 is surrounded at the bottom by Lower Waveguide Cladding LWCL 1810, on the top by Upper Waveguide Cladding UWCL 1840 and on both sides by Side Waveguide Cladding SWCL 1825. Waveguide Core 1835 preferably includes a front beam input/output port FB-PT 1831, a straight waveguiding core region SWC 1835, and a back beam input/output port BB-PT 1832. The straight waveguiding core region SWC 1835 has a length $l_{SWC}$, a width of $w_{SWC}$ and a thickness of $t_{SWC}$. The Lower Waveguide Cladding LWCL 1810 has a length of $l_{LWCL}$, a width of $w_{LWCL}$ and a thickness of $t_{LWCL}$. The Upper Waveguide Cladding UWCL 1840 has a length of $l_{UWCL}$, a width of $w_{UWCL}$ and a thickness of $t_{UWCL}$. The two side waveguide claddings SWCL 1825 have a length of $l_{SWCL}$, a width of $w_{SWCL}$ and a thickness of $t_{SWCL}$. The lengths of the waveguide claddings LWCL/UWCL/SWCL 1810/1840/1825, $l_{LWCL}$, $l_{UWCL}$, and $l_{SWCL}$ are about equal to the length of the waveguide core $l_{WC}$. The refractive index of the Waveguide Core WC 1835 is not a constant. It is graded in the vertical direction and varies from the center of the core to the outer border of the core; the variation is represented by $n_{WC}(y)$ with y being the vertical coordinate. In the horizontal or lateral direction, the refractive index has a step profile. In other words, for a particular vertical coordinate $y_0$, the refractive index is a constant $n_{WC}(y_0)$ within the core region and drops to the refractive index value of the side cladding $n_{SWCL}(y_0)$ at the two side borders. The refractive index of the Lower Waveguide Cladding LWCL 1810 is $n_{LWCL}$. The refractive index of the Upper Waveguide Cladding UWCL 1840 is $n_{UWCL}$. The refractive index of the Side Waveguide Cladding SWCL 1825 is $n_{SWCL}(y)$, which means it is y-coordinate dependent.

In an exemplary device, the front beam input/output port FB-PT 1831 is configured to receive/transmit a light beam typically having wavelength λ with a beam size that is already fully enlarged in the lateral direction and partially enlarged to an intermediate size in the vertical direction by a high-refractive-contrast tapered waveguide, and the back beam input/output port LB-PT 1832 is configured to receive/transmit a light beam typically having wavelength λ with a beam size that roughly equals the size of an optical fiber.

(i) An Exemplary Device

In an exemplary embodiment, the Waveguide Core WC 1835 is made up of lead-titania-silica with a refractive index distribution that approximates a parabolic distribution as given in Table I below.

TABLE I

Refractive Index distribution

| y coordinate (μm) | Refractive index of WC | Refractive index of SWCL |
|---|---|---|
| −5.0 to −4.6 | 1.610 | 1.600 |
| −4.6 to −4.2 | 1.624 | 1.614 |
| −4.2 to −3.8 | 1.636 | 1.626 |
| −3.8 to −3.4 | 1.648 | 1.638 |
| −3.4 to −3.0 | 1.658 | 1.648 |
| −3.0 to −2.6 | 1.668 | 1.658 |
| −2.6 to −2.2 | 1.676 | 1.666 |
| −2.2 to −1.8 | 1.683 | 1.673 |
| −1.8 to −1.4 | 1.688 | 1.678 |
| −1.4 to −1.0 | 1.693 | 1.683 |
| −1.0 to −0.6 | 1.696 | 1.686 |
| −0.6 to −0.2 | 1.699 | 1.689 |
| −0.2 to 0.2 | 1.700 | 1.690 |
| 0.2 to 0.6 | 1.699 | 1.689 |
| 0.6 to 1.0 | 1.696 | 1.686 |
| 1.0 to 1.4 | 1.693 | 1.683 |
| 1.4 to 1.8 | 1.688 | 1.678 |
| 1.8 to 2.2 | 1.683 | 1.673 |
| 2.2 to 2.6 | 1.676 | 1.666 |
| 2.6 to 3.0 | 1.668 | 1.658 |
| 3.0 to 3.4 | 1.658 | 1.648 |
| 3.4 to 3.8 | 1.648 | 1.638 |
| 3.8 to 4.2 | 1.636 | 1.626 |
| 4.2 to 4.6 | 1.624 | 1.614 |
| 4.6 to 5.0 | 1.610 | 1.600 |

The Lower Waveguide Cladding LWCL 1810 is made up of silica with a refractive index of $n_{LWCL}$=1.5. The Upper Waveguide Cladding UWCL is made up of silica-titania with a refractive index of $n_{UWCL}$=1.6. The Side Waveguide Cladding SWCL is made up of lead silica-titania with a refractive index of distribution given by Table I. The size of the waveguide core is $l_{WC}$=50 μm, $w_{WC}$=10 μm and $t_{WC}$=10 μm. The size of the lower waveguide cladding is $l_{LWCL}$=50 μm, $w_{LWCL}$=30 μm and $t_{LWCL}$=10 μm. The size of the upper waveguide cladding is $l_{UWCL}$=50 μm, $w_{UWCL}$=30 μm and $t_{UWCL}$=10 μm. The size of the two side waveguide claddings is $l_{SWCL}$=50 μm, $w_{SWCL}$=10 μm and $t_{SWCL}$=10 μm. It should be appreciated by one skilled in the art that all parameter values used in this and other exemplary embodiments are approximate and that the actual values can vary significantly.

(ii) General Operation of the Device

FIG. 29 shows the results of a computer simulation of the spatial distribution of the electric field strength for the light input at λ=1.5 μm after propagating into waveguide 1835. The mode size at the input end is 10 μm in both the lateral and vertical directions. In the lateral direction, the waveguide confines the mode and guides its propagation to the other port. In the vertical direction, in addition to the guiding of the light beam, the waveguide also functions as a lens in the sense that the beam size is changed periodically.

(iii) Device Fabrication Procedures

An exemplary procedure for fabricating LSRIN×VGRIN ICMT device 1800 will now be described with reference to FIGS. 30A–D. This procedure is given for the purpose of illustration and not limitation, as there are other procedures that can be used to achieve the same fabrication results and other materials systems or device structures that can be utilized to fabricate devices with the same functional capabilities.

Figure 30A:
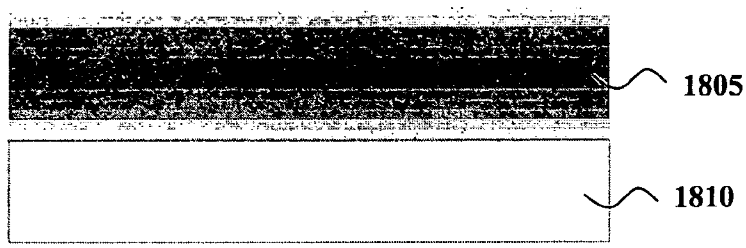
FIGS. 30A–D illustrates exemplary fabrication steps for the module of FIG. 28.
Figure 30B:
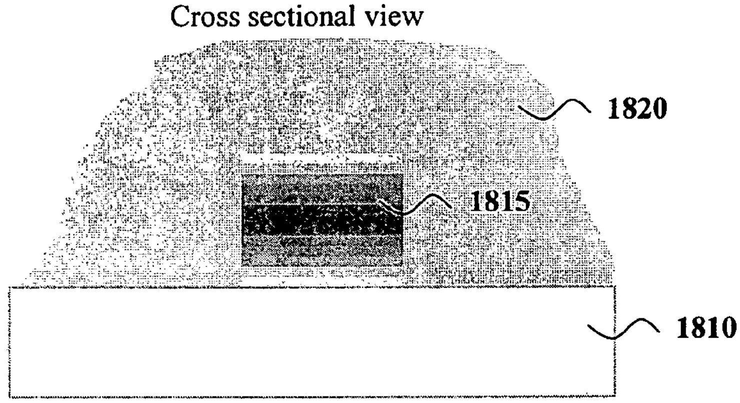

The LSRIN×VGRIN ICMT can be fabricated by starting with a Silica-On-Silicon (SOS) wafer that can be fabricated via a commercial process known to those skilled in the art. For a SOS wafer, as shown in FIG. 30A, a low refractive index layer of $SiO_2$ 1810 with a thickness of $t_{LWCL}$ is already made on the Si substrate (not shown). There are at least two ways to fabricate the LSRIN×VGRIN ICMT structure and these are now described by fabrication methods 1–2 below:

Method 1: As shown in FIG. 30A, a graded index distribution in the vertical direction can be achieved by depositing multiple sufficiently thin layers of different material compositions 1805 on a lower cladding layer 1810. In such a case, a continuous distribution of the refractive index can be approximated by a series of small effective refractive index steps with each thin layer having a different refractive index value. Depending on the property of the dielectric material, an appropriate film deposition method can be used. These methods include evaporation, flame hydrolysis, sputtering, Ion-Assisted-Deposition, chemical vapor deposition, and others. An exemplary method is sol-gel spin or dip coating which offers a possibility to vary the material composition of each thin layer easily. As a natural extension, a channel waveguide with a graded refractive index distribution in the vertical direction and a step refractive index distribution in the horizontal/lateral direction can be fabricated by etching a stripe 1815 in the film 1805; the result of etching is shown in FIG. 30B. If a surrounding cladding is preferred, a subsequent deposition of a cladding material 1820 can always be performed.

Figure 30C:
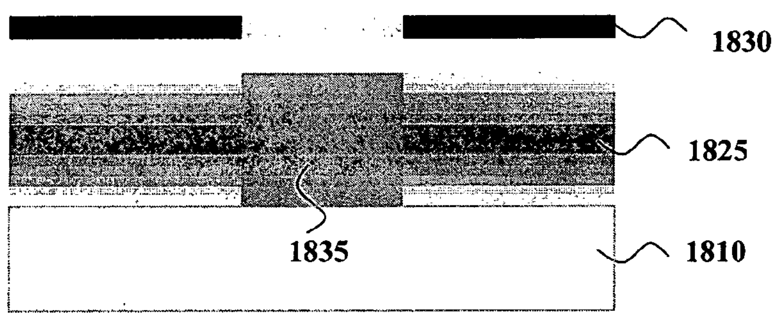

Method 2: Another approach to make a step refractive index distribution in the lateral direction is to first deposit a photosensitive vertically graded refractive index film 1825 on the $SiO_2$ 1810, as shown in FIG. 30C. In the case of silica-based glass, typically, Ge or Pb can be incorporated to make the glass film photosensitive. After the deposition of such a film 1825, UV photo-imprinting through a conventional channel photomask 1830 can be used to induce a nearly step refractive index distribution in the lateral direction to form the channel waveguide 1835.

Figure 30D:
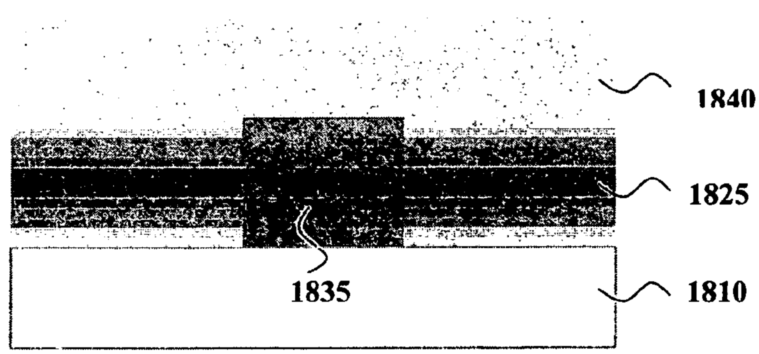

If an upper cladding is preferred, a film 1840 with a refractive index lower than that of the photoimprinted stripe can then be deposited as shown in FIG. 30D. Alternatively, such a film can even be deposited before the UV photoimprinting as long as this upper cladding film does not substantially absorb the UV light. An obvious advantage of the photoimprinting approach is that the fabrication of a buried channel waveguide is significantly simplified as it does not involve etching and hence the fabrication cost is also significantly lowered.

Either method produces a buried channel waveguide that has a step refractive index distribution in the horizontal/lateral direction and a graded refractive index distribution in the vertical direction.

It should be understood that these dimensions and exemplary lengths are presented for the purposes of illustrating a useful embodiment of the device 1800 and are not intended to limit other embodiments of any exemplary device, or the device 1800. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the present invention, including the side surfaces, the top and bottom surfaces, and the input/output surfaces of the present invention In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bidirectional nature of the said devices.

It should be understood to those skilled in the art that the device 1800 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

(B) A Composite-Lateral-Graded-Refractive-Index and Vertical-Graded-Refractive Index (LGRIN×VGRIN) ICMT Device FIG. 31 illustrates an alternative embodiment of an ICMT device 1850 including a vertical as well as a lateral graded refractive index distribution to form a channel waveguide. The device 1850 can perform as a two dimensional beam-size collimating element in both the lateral and the vertical directions for a propagating optical beam and can, for example, confine and collimate an optical beam that has already been partially expanded or enlarged from a small semiconductor waveguide via a tapered structure such as any of exemplary devices 1–4. The device is not limited to use as a beam collimator but can also function as a waveguide to direct a light beam to a beam reducer when the optical beam propagates in the reverse direction. Furthermore, the device can be used for direct light beam coupling into an optical fiber. It should be understood that these exemplary applications of device 1850 are intended to illustrate the uses for device 1850 and are not intended to limit the applications of other embodiments of device 1850. The device can be referred to as a "(composite-lateral-graded-refractive-index and vertical-graded-refractive index" (LGRIN×VGRIN) ICMT.

LGRIN×VGRIN ICMT 1850 preferably includes a waveguiding core region occupied by Waveguide Core WC 1885. Waveguide Core WC 1885 is surrounded at the bottom by Lower Waveguide Cladding LWCL 1860, on the top by Upper Waveguide Cladding UWCL 1890 and on both sides by Side Waveguide Cladding SWCL 1875. Waveguide Core 1885 preferably includes a front beam input/output port FB-PT 1881, a straight waveguiding core region SWC 1885, and a back beam input/output port BB-PT 1882. The straight waveguiding core region SWC 1885 has a length $l_{SWC}$, a width of $w_{SWC}$ and a thickness of $t_{SWC}$. The Lower Waveguide Cladding LWCL 1860 has a length of $l_{LWCL}$, a width of $w_{LWCL}$ and a thickness of $t_{LWCL}$. The Upper Waveguide Cladding UWCL 1890 has a length of $l_{UWCL}$, a width of $w_{UWCL}$ and a thickness of $t_{UWCL}$. The two side waveguide claddings SWCL 1875 have a length of $l_{SWCL}$, a width of $w_{SWCL}$ and a thickness of $t_{SWCL}$. The lengths of the waveguide claddings LWCL/UWCL/SWCL 1860/1890/1875, $l_{LWCL}$, $l_{UWCL}$, and $l_{SWCL}$ are about equal to the length of the waveguide core $l_{WC}$. The refractive index of the Waveguide Core WC 1885 is not a constant. In both the vertical and the lateral directions, it is graded and varies from the center of the core to the outer borders of the core. The variation can be represented in the vertical direction by $n_{WC}(y)$ with y being the vertical coordinate and in the lateral direction by $n_{WC}(x)$ with x being the lateral coordinate. The refractive index of the Lower Waveguide Cladding LWCL 1860 is $n_{LWCL}$. The refractive index of the Upper Waveguide Cladding UWCL 1890 is $n_{UWCL}$. The refractive index of the Side Waveguide Cladding SWCL 1875 is $n_{SWCL}(y)$, which means it can be y coordinate dependent.

In an exemplary device, the front beam input/output port FB-PT 1881 is configured to receive/transmit a light beam typically having wavelength λ with a beam size that is already enlarged to an intermediate size by a high-refractive-contrast tapered waveguide, and the back beam input/output port LB-PT 1882 is configured to receive/transmit a light beam typically having wavelength λ with a beam size that roughly equals the size of an optical fiber.

(i) An Exemplary Device

In an exemplary embodiment, the Waveguide Core WC 1885 is made up of lead-titania-silica with a refractive index distribution that approximates a parabolic distribution in both the vertical and the lateral directions as given by the equation $$n_{WC}(x, y) = 1.61 + 0.09\left[1 - \left(\frac{x^2 + y^2}{5\mu m)^2}\right)\right].$$

The Lower Waveguide Cladding LWCL 1860 is made up of silica with a refractive index of $n_{LWCL}$=1.5. The Upper Waveguide Cladding UWCL is made up of silica-titania with a refractive index of $n_{UWCL}$=1.6. The Side Waveguide Cladding SWCL is made up of lead silica-titania with a refractive index distribution given by Table I (above). The size of the waveguide core is $l_{WC}$=50 μm, $w_{WC}$=10 μm and $t_{WC}$=10 μm. The size of the lower waveguide cladding is $l_{LWCL}$=50 μm, $w_{LWCL}$=30 μm and $t_{LWCL}$=10 μm. The size of the upper waveguide cladding is $l_{UWCL}$=50 μm, $w_{UWCL}$=30 μm and $t_{UWCL}$=10 μm. The size of the two side waveguide claddings is $l_{SWCL}$=50 μm, $w_{SWCL}$=10 μm and $t_{SWCL}$=10 μm. It should be appreciated by one skilled in the art that all parameter values used in this and other exemplary embodiments are approximate and that the actual values can vary significantly.

(ii) General Operation of the Device

FIG. 32 shows the results of a computer simulation of the spatial distribution of the electric field strength for the light input at λ=1.5 μm after propagating into waveguide 1885. The mode size at the input end is 10 μm in both the lateral and vertical directions. In both the vertical and the lateral directions, in addition to the guiding of the light beam, the waveguide also functions as a lens in the sense that the beam size get focused and collimated periodically.

(iii) Device Fabrication Procedures

An exemplary procedure for fabricating LGRIN×VGRIN ICMT device 1850 will now be described with reference to FIGS. 33A–B. This procedure is given for the purpose of illustration and not limitation, as there are other procedures that can be used to achieve the same fabrication results and other materials systems or device structures that can be utilized to fabricate devices with the same functional capabilities.

The LGRIN×VGRIN ICMT can be fabricated by starting with a Silica-On-Silicon (SOS) wafer that can be fabricated via a commercial process known to those skilled in the art. For a SOS wafer, as illustrated in FIG. 33A, a low refractive index layer of $SiO_2$ 1860 with a thickness of $t_{LWCL}$ is already made on the Si substrate (not shown). The fabrication of the LGRIN×VGRIN ICMT according to one embodiment below.

Figure 33A:
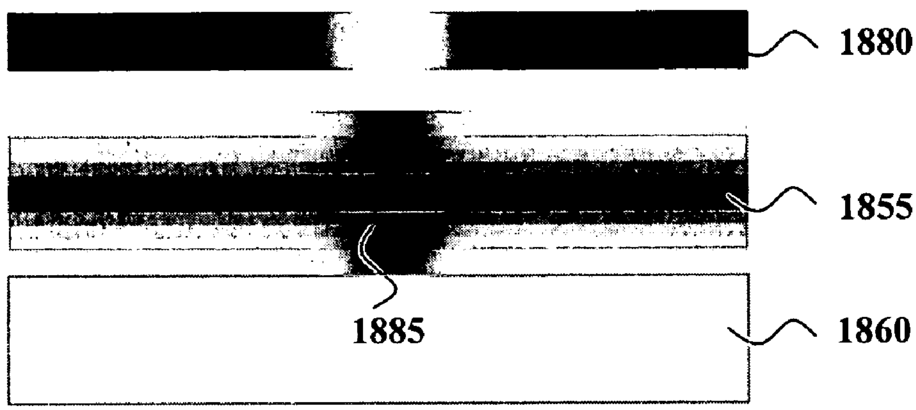
FIGS. 33A–B illustrates exemplary fabrication steps for the module of FIG. 31.
Figure 33B:
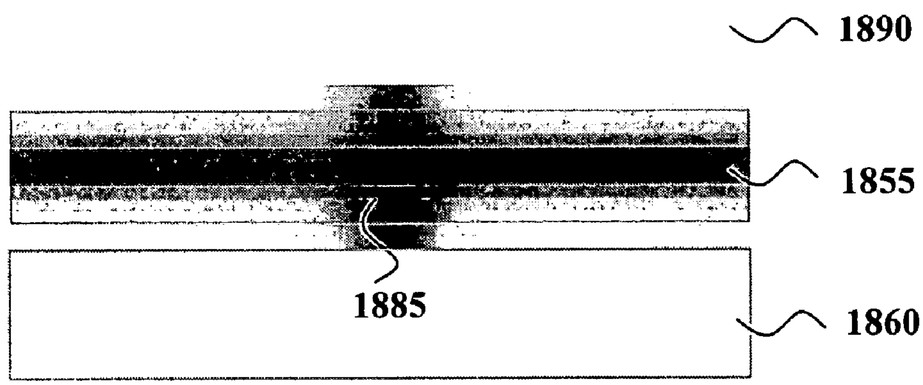

As shown in FIG. 33A, a graded refractive index distribution in the vertical direction can be achieved by depositing a multiple sufficiently thin layers of photosensitive materials with different compositions 1855 on a lower cladding layer 1860. In such a case, a continuous distribution of the refractive index can be approximated by a series of small effective refractive index steps with each thin layer having a different refractive index value. Depending on the property of the dielectric material, an appropriate film deposition method can be used. These methods include evaporation, flame hydrolysis, sputtering, Ion-Assisted-Deposition, chemical vapor deposition, and others. An exemplary method is sol-gel spin or dip coating which offers a possibility to vary the material composition of each thin layer easily. In the case of silica-based glass, the photosensitivity of the glass material can be enabled by incorporating Ge or Pb into the glass film as set forth above.

As for the graded refractive index distribution in the lateral direction, it can be created by using a gray scale mask 1880 to optically imprint a graded refractive index change in the film because the refractive index change can be made to depend on the dosage of the photoimprinting which can be controlled by the gray scale of the gray mask. If an upper cladding 1890 is preferred, such a film can then be deposited on top of the photosensitive film, as shown in FIG. 33B. Alternatively, such an upper cladding film 1890 can be deposited before the UV photoimprinting as long as it does not substantially absorb the photoimprinting light. The approaches described here are obviously advantageous because of their simplicity in terms of fabrication as set forth above. Alternatively, a vertical refractive index variation can be achieved by varying the amount of photosensitive materials such as the Ge or Pb content in the vertical direction. In this case, the UV photoimprinting described above will result in vertical refractive index variation in addition to the lateral refractive index variation.

The resulting device is a buried channel waveguide that has a graded index distribution in the both the vertical and the lateral directions.

It should be understood that these dimensions and exemplary lengths are presented for the purposes of illustrating a useful embodiment of the device 1850 and are not intended to limit other embodiments of any exemplary device, or the device 1850. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the present invention, including the side surfaces, the top and bottom surfaces, and the input/output surfaces of the present invention In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the said devices.

It should be understood to those skilled in the art that the device 1850 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

(7) Exemplary Device 7: A Vertical-Sharp-Down-Taper-and-Lateral-Gradual-Up- Taper-Cascaded-with-a-Vertical-Graded-Refractive-Index-and-Lateral-Step-Refractive-Index (VSDT×LGUT+VGRIN×LSRIN) ICMT Device FIGS. 34A–B illustrates a seventh general embodiment of a combined module ICMT device 1900 including a vertical-sharp-down-taper and lateral-gradual-up-taper waveguide core embedded in and connected to a large channel waveguide with a nearly symmetric vertical graded refractive index and lateral step refractive index distribution. It is in fact one possible combination of a taper waveguide integrated with a lower refractive-index-contrast large-size channel waveguide. The device 1900 performs as a two dimensional beam-size enlargement and collimating element in both the lateral and the vertical directions for a propagating optical beam, and can, for example, enlarge and collimate an optical beam from a small semiconductor waveguide to a large beam size such as one with a beam size close to that of an optical fiber. The device is not limited to use as a beam enlarger/collimator but can also function as a beam reducer when the optical beam propagates in the reverse direction. Furthermore, the device is used for direct light beam coupling into an optical fiber. It should be understood that these exemplary applications of device 1900 are intended to illustrate the uses for device 1900 and are not intended to limit the applications of other embodiments of device 1900 to these examples. The device can be referred to as a "vertical-sharp-down-taper-and-lateral-gradual-up-taper-cascaded-with-a-vertical-graded-refractive-index-and-lateral-step-refractive-index (VSDT×LGUT+VGRIN×LSRIN) ICMT.

The present VSDT×LGUT+VGRIN×LSRIN ICMT 1900 preferably includes a Waveguiding Core region occupied by Waveguide Core WC 1945. This Waveguide Core WC 1945 is embedded in an optical medium 1915/1950 that acts as the cladding for the Waveguide Core WC 1945 wherever the Waveguide Core WC 1945 exists, but at the same time the same optical medium 1915/1950 acts as a Lower Refractive index Contrast Waveguiding Core region. This Lower Refractive index Contrast Waveguiding Core region 1915/1950 is occupied by Waveguide Core LRCWC 1915/1950, and is further surrounded by an even lower refractive index cladding region 1905/1955/1976.

Waveguide Core WC 1945 is surrounded at the bottom by Lower Graded Waveguide Cladding LGWCL 1915, on the top by Upper Graded Waveguide Cladding UGWCL 1950 and on both sides by Side Stratified Waveguide Cladding SSWCL 1970, which is basically a combination of the Lower Graded Waveguide Cladding LGWCL 1915 and the Upper Graded Waveguide Cladding UGWCL 1950.

When viewed from the side, the Waveguide Core WC 1945 preferably includes a small beam input/output port SB-PT 1971*a*, a straight waveguiding core region SWC 1972*a*, a vertically tapered down region VTD 1973*a*, and an intermediate beam output/input port region 1974*a*. The straight waveguiding core region SWCa 1972*a* has a length $l_{HRCSWCa}$, and a thickness of $t_{HRCSWCa}$. The vertically tapered down waveguiding core region VTDWC 1973*a* has a length of $l_{HRCVTDWCa}$, a vertical thickness of $t_{HRCVTDWCaSB}$ at the small-beam input/output side, and a vertical thickness of $t_{HRCVTDCaLB}$ at the large-beam input/output side.

When viewed from the top, Waveguide Core 1945 preferably includes a small beam input/output port SB-PT 1971*b*, a straight waveguiding core region SWC 1972*b*, a laterally tapered up region LTU 1973*b*, a wider straight waveguiding core region WSWC 1975 and a large beam output/input port region 1974*b*. The straight high refractive index contrast waveguiding core region SWCb 1972*b* has a length $l_{HRCSWCb}$, and a width of $w_{HRCSWCb}$. The laterally tapered up waveguiding core region LTUWC 1973*b* has a length of $l_{HRCLTUWCb}$, a width of $w_{HRCLTUWCbSB}$ at the small-beam input/output side, and a width of $w_{HRCLTUCbLB}$ at the large-beam input/output side. The wider straight waveguide core region WSWC 1975 has a length of $l_{HRCWSWCb}$ and a width of $w_{HRCWSWCb}=w_{HRCLTUCbLB}$.

It should be understood that the straight waveguiding core regions 1972*a* and 1972*b* (based on whether the structure is viewed from the side or from the top), may have the same or a different length. Similarly, the vertically tapered down region 1973*a* (when viewed from the top) and the laterally tapered up region 1973*b* (when viewed from the side) may have the same or a different length. In other words, the vertical and lateral beam size transformation may be achieved independently or at the same time or with one slightly earlier than the other. Furthermore, the taper regions do not need to be symmetric with respect to the central axis and also the tapering up or down slope do not need to be straight and may be of any curve shape.

Lower-Refractive-index-Contrast-Waveguide Core LRCWC 1915/1950 preferably surrounds and embeds the Waveguide Core WC 1945. When viewed from the side, the Lower Refractive index Contrast Waveguide Core LRCWC 1915/1950 is sandwiched at the bottom by a Lower Waveguide Cladding LWCL 1905, and on the top by an Upper Waveguide Cladding UWCL 1955. As the Lower-Refractive-index-Contrast-Waveguide Core LRCWC 1915/1950 has a graded refractive index distribution along the vertical direction, it can take the intermediate size beam launched at the tip region 1974*a* from the Waveguide Core WC 1945 and further expand the beam; after the beam has traveled a certain distance equivalent to the focal length of the graded refractive index lens structure, the beam will be collimated and reach the back large beam output/input port LB-PT 1977, from where another single mode waveguide such as a single mode optical fiber will continue to guide the light beam. When viewed from the top, the LRCWC 1970 (i.e. 1915/1950) is surrounded on both sides by Side Waveguide Cladding SWCL 1976, (with lower refractive index when compared to the Waveguide Core LRCWC 1970). The Lower Refractive index Contrast Waveguide Core LRCWC 1970 has a length of $l_{LRCWC}$, a width of $w_{LRCWC}$ and a thickness of $t_{LRCWC}$. The Lower Waveguide Cladding LWCL 1905 has a length of $l_{LWCL}$, a width of $w_{LWCL}$ and a thickness of $t_{LWCL}$. The Upper Waveguide Cladding UWCL 1955 has a length of $l_{UWCL}$, a width of $w_{UWCL}$ and a thickness of $t_{UWCL}$. The two side waveguide claddings SWCL 1976 have a length of $l_{SWCL}$, a width of $w_{SWCL}$ and a thickness of $t_{SWCL}$. The lengths of the waveguide claddings LWCL/UWCL/SWCL 1905/1955/1976, $l_{LWCL}$, $l_{UWCL}$, and $l_{SWCL}$ are about equal to the length of the lower refractive index contrast waveguide core $l_{LRCWC}$.

The refractive index of the Waveguide Core WC 1945 is $n_{HRCWC}$. The refractive index of the Lower Refractive index Contrast Waveguide Core LRCWC 1915/1950 is $n_{LRCWC}(y)$, which means it is y coordinate dependent, with y being the vertical coordinate. The refractive index of the Lower Waveguide Cladding LWCL 1905 is $n_{LWCL}$. The refractive index of the Upper Waveguide Cladding UWCL 1955 is $n_{UWCL}$. The refractive index of the Side Waveguide Cladding SWCL 1976 is $n_{SWCL}(y)$, which means it can also be y coordinate dependent. It should be understood that the Side Waveguide Cladding SWCL 1976 can have either a uniform or non-uniform refractive index distribution. In other words, the refractive index of the Side Waveguide Cladding may or may not be a constant. In the latter case, it can be graded in the vertical direction. In device 1900, as in exemplary device 6, the refractive index of the Waveguide Core LRCWC 1915/1950 is not a constant. It is graded in the vertical direction and varies from the center plane of the core to the top and bottom border of the core. The variation can be represented by $n_{LRCWC}(y)$ with y being the vertical coordinate. In the horizontal or lateral direction, the refractive index may have a step profile. In other words, for a given vertical coordinate $y_0$, the refractive index is a constant, $n_{LRCWC}(y_0)$, within the core region and drops at the two side borders to the refractive index value of the side cladding, $n_{SWCL}(y_0)$.

In an exemplary device, the front beam input/output port FB-PT 1971*a*/1971*b* is configured to receive/transmit a light beam typically having wavelength λ with a very small beam size. The mode size of the straight section of the Waveguide Core WC 1945 can be designed to match the mode size of a preceding very small size waveguide. The laterally tapering up section of the WC 1945 will enlarge the beam fully in the lateral direction and the vertical tapering down section will partially enlarge the beam in the vertical direction to an intermediate size. The vertically graded Lower Refractive index Contrast Waveguide Core LRCWC is configured to take the vertically intermediate size beam launched at region 1974*a* and further expand and collimate it. The back beam input/output port LB-PT 1977 is configured to receive/transmit a light beam typically having wavelength λ with a beam size that roughly equals the size of an optical fiber.

(i) An Exemplary Device

In an exemplary embodiment, the High Refractive index Contrast Waveguide Core WC 1945 is made up of silicon with a refractive index of $n_{HRCWC}3.5$, the Low Refractive index Contrast Waveguide Core LRCWC 1915/1950 is made up of lead-titania-silica material mixture with a mixture composition to achieve a refractive index of a refractive index distribution that approximates a parabolic distribution as given in Table II below.

TABLE II

| Refractive Index distribution | | |
|---|---|---|
| y coordinate (μm) | Refractive index of LRCWC | Refractive index of SWCL |
| −5.0 to −4.6 | 1.610 | 1.600 |
| −4.6 to −4.2 | 1.624 | 1.614 |
| −4.2 to −3.8 | 1.636 | 1.626 |
| −3.8 to −3.4 | 1.648 | 1.638 |
| −3.4 to −3.0 | 1.658 | 1.648 |
| −3.0 to −2.6 | 1.668 | 1.658 |
| −2.6 to −2.2 | 1.676 | 1.666 |
| −2.2 to −1.8 | 1.683 | 1.673 |
| −1.8 to −1.4 | 1.688 | 1.678 |
| −1.4 to −1.0 | 1.693 | 1.683 |
| −1.0 to −0.6 | 1.696 | 1.686 |
| −0.6 to −0.2 | 1.699 | 1.689 |
| −0.2 to 0.2 | 1.700 | 1.690 |
| 0.2 to 0.6 | 1.699 | 1.689 |
| 0.6 to 1.0 | 1.696 | 1.686 |
| 1.0 to 1.4 | 1.693 | 1.683 |
| 1.4 to 1.8 | 1.688 | 1.678 |
| 1.8 to 2.2 | 1.683 | 1.673 |
| 2.2 to 2.6 | 1.676 | 1.666 |
| 2.6 to 3.0 | 1.668 | 1.658 |
| 3.0 to 3.4 | 1.658 | 1.648 |
| 3.4 to 3.8 | 1.648 | 1.638 |
| 3.8 to 4.2 | 1.636 | 1.626 |
| 4.2 to 4.6 | 1.624 | 1.614 |
| 4.6 to 5.0 | 1.610 | 1.600 |

The Lower Waveguide Cladding LWCL 1905 is made up of silica-titania with a refractive index of $n_{LWCL}$=1.5. The Upper Waveguide Cladding UWCL is made up of silica-titania with a refractive index of $n_{UWCL}$=1.5. The Side Waveguide Cladding SWCL is made up of lead silica-titania with a refractive index distribution also given in Table II.

The dimensions of the Waveguide Core WC 1945 are as follows: $l_{HRCSWCa}$=110 μm, $t_{HRCSWCa}$=0.3 μm, $l_{HRCVTDWCa}$=30 μm, $t_{HRCVTDWCaSB}$=0.3 μm, $t_{HRCVTDCaLB}$=0 μm, $l_{HRCSWCb}$=10 μm, $w_{HRCSWCb.}$=0.3 μm, $l_{HRCLTUWCb}$=100 μm, $w_{HRCLTUWCbSB}$=0.3 μm, $w_{HRCLTUCbLB}$=10 μm, $l_{HRCWSWCb}$=30 μm and $w_{HRCWSWCb}$=10 μm. The dimensions of the Lower Refractive index Contrast Waveguide Core LRCWC 1915/1950 are as follows: $l_{LRCWC}$=170 μm, $w_{LRCWC}$=10 μm, $t_{LRCWC}$=10 μm. The Lower Waveguide Cladding LWCL 1905 has a length of $l_{LWCL}$=170 μm, a width of $w_{LWCL}$=30 μm and a thickness of $t_{LWCL}$=2 μm. The Upper Waveguide Cladding UWCL 1955 has a length of $l_{UWCL}$=170 μm, a width of $w_{UWCL}$=30 μm and a thickness of $t_{UWCL}$=2 μm. The two side waveguide claddings SWCL 1976 have a length of $l_{SWCL}$=170 μm, a width of $w_{SWCL}$=10 μm and a thickness of $t_{SWCL}$=10 μm. It should be appreciated by one skilled in the art that all parameter values used in this and other exemplary embodiments are approximate and that the actual values can vary significantly.

(ii) General Operation of the Device

FIG. 35 shows the results of a computer simulation of the spatial distribution of the electric field strength for the light input at λ=1.5 μm after being launched from the left into the small light beam input/output port 1971*a*/1971*b*. The mode size at the input end is 0.3 μm in both the lateral and vertical directions. In the vertical direction, as the tapering down section only lies towards the right for the last 30 μm and the cascading beam expansion action occurs on both the left and the right part of the WC taper tip, the computer simulation is thus zoomed into the last 60 μm of the coupler structure. In the lateral direction, the beam expansion is entirely enabled by the tapering up section 1973*b*, which has a length of 100 μm, hence the computer simulation is zoomed mainly in this section. As can be seen from FIG. 35, the combined module coupler structure can transform a very small beam of about 0.3 μm in size to a large size beam of about 10 μm in both the vertical and the horizontal directions.

(iii) Device Fabrication Procedures

An exemplary procedure for fabricating a HRC-VSDT×LGUT+VGRIN×LSRIN ICMT device 1900 will now be described with reference to FIGS. 36A–N. This procedure is given for the purpose of illustration and not limitation, as there are other procedures that can be used to achieve the same fabrication results and other materials systems or device structures that can be utilized to fabricate devices with the same functional capabilities.

Figure 36A:
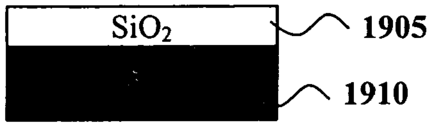
FIGS. 36A–N illustrate exemplary fabrication steps for the super mode transformation coupler of FIG. 34.

The HRC-VSDT×LGUT+VGRIN×LSRIN ICMT 1900 may be fabricated by starting with a Silica-On-Silicon (SOS) wafer shown in FIG. 36A, which may be fabricated via a commercial process known to those skilled in the art. For a SOS wafer, a low refractive index layer of $SiO_2$ 1905 with a thickness of $t_{LWCL}$ is already made on a Si substrate 1910. The fabrication of the HRC-VSDT×LGUT+VGRIN×LS-RIN ICMT structure according to one embodiment now described below.

Figure 36B:
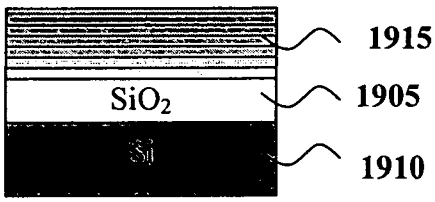
Figure 36C:
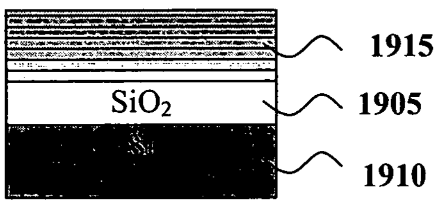

As shown in FIGS. 36B–C, a graded index distribution in the vertical direction can be achieved by depositing multiple sufficiently thin layers of photosensitive materials with different compositions 1915 on a lower cladding layer 1905. In such a case, a continuous distribution of the refractive index can be approximated by a series of small refractive index steps with each thin layer having a different refractive index value. Depending on the property of the dielectric material, an appropriate film deposition method can be used. These methods include evaporation, flame hydrolysis, sputtering, Ion-Assisted-Deposition, chemical vapor deposition, and others. An exemplary method is sol-gel spin or dip coating which offers a possibility to vary the material composition of each thin layer easily. In the case of silica-based glass, the photosensitivity of the glass material can be enabled by incorporating Ge or Pb into the glass film. It should be understood that any optically transparent dielectric material in the spectrum region of interest to optical communication can be used for the deposition; examples include lead silica, germania-silica, titania-silica, silicon oxynitride, silicon nitride, polysilicon, silicon-rich-silica, silicon carbide, polymer and a combination of different materials. The parameter details of one exemplary embodiment of the design for the GRIN layers has already been shown in Table II. Note that the refractive index distribution does not have to follow the parabolic profile and may be of any profile. It should also be understood that other film deposition techniques such as flame hydrolysis, sputtering, Ion-Assisted-Deposition and chemical vapor deposition may also be used to deposit the bottom half of the GRIN dielectric waveguide.

Figure 36D:
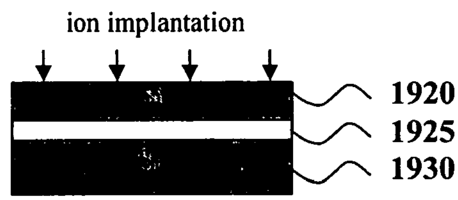
Figure 36E:
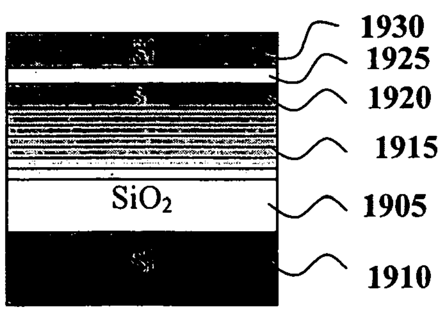
Figure 36F:
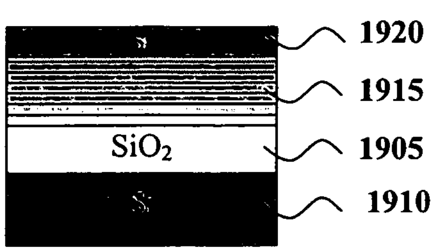

As shown in FIG. 36D, a thin silicon layer 1920, which is to be made into the high refractive index contrast waveguide core WC 1945, may be defined in another piece of bare Si wafer using, for example, ion implantation. A thin silicon layer 1920 is formed on an ion implanted layer 1925 that is sitting on top of a Si substrate 1930. This ion-implanted wafer may then be flipped over and wafer-bonded to the GRIN dielectric-coated $SiO_2$—Si wafer, as shown in FIG. 36E. The top thick Si part 1930 and the ion-implanted layer 1925 may then be removed using a lift-off technique such as rapid thermal annealing and/or wafer thinning. The result after removing the ion-implanted layer is shown in FIG. 36F. This technique may be modified if, for instance, a non-symmetric vertical-GRIN waveguide is desired, as will be described below.

Figure 36K:
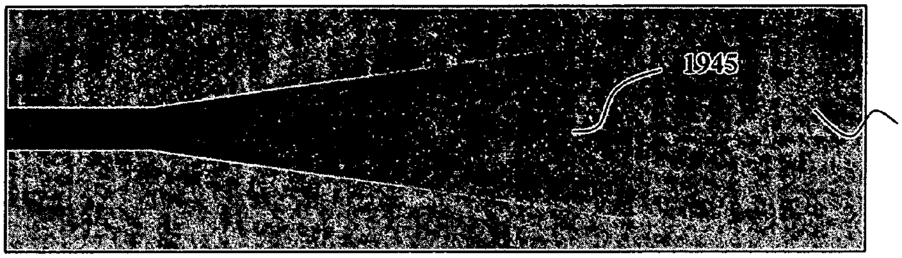

To form a vertically down-tapered and horizontally/laterally up-tapered high-index core, the fabrication steps described with regard to Exemplary device 4 may be used. In short, a photoresist layer is first spin-coated on the Si waveguide layer 1920. A mask pattern 1935 with a gray-scaled transparency along the longitudinal direction, and a horizontal/lateral up taper, shown in FIG. 36G, can be used together with UV exposure and photoresist development to make a vertically tapered down and horizontally/laterally tapered up photoresist pattern 1940, shown in FIG. 36H. The lateral and vertical tapers may be made independent from each other, although in FIG. 36H, they have been put together to save space and also to illustrate the principle. Followed by dry etching, as indicated in FIG. 36I, the vertically down tapered and horizontally/laterally up tapered photoresist pattern 1940 is transferred to the high refractive index Si layer to form the vertically down-tapered and horizontally/laterally up-tapered Si section 1945, as shown in FIGS. 36J–K. As was previously noted, the interface between the top Si layer and the $SiO_2$ based layer may be used as a natural stop during the dry etching process. It should also be noted that a shadow mask based dry etching process or a diffusion-limited wet etching process could also be used to form the Si taper as well.

Figure 36L:
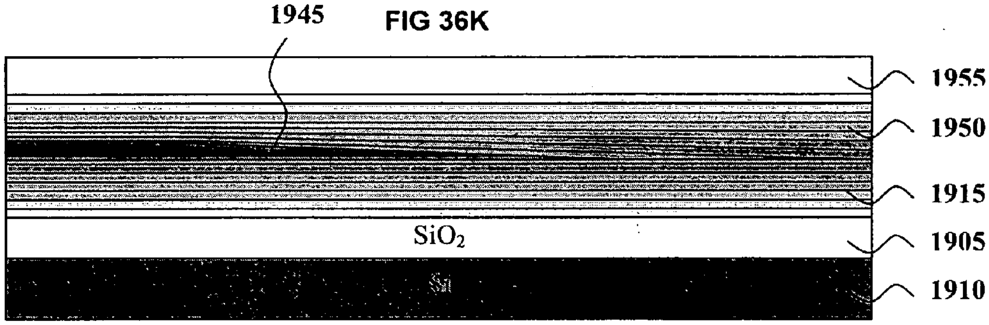

To form the top half of the vertically GRIN dielectric waveguide part, an effective refractive-index-decreasing dielectric region 1950 is deposited, as shown in FIG. 36L. Preferably photosensitive sol-gel silica is spin-coated in almost the same way as for the bottom half of the dielectric waveguide except that the order of the layers is now reversed. It should again be understood that the parabolic refractive index distribution cited here is only one example and, as is well known to those skilled in the art, various other refractive index distributions may be used. On the very top, a relatively thick (say 2 μm) silica layer 1955 can be deposited to act as an upper cladding.

Note that the sol-gel technique has an advantage in that the spin-coated film will change shape from conformal coating to planarized coating. The initial layer thickness may not be so even and uniform. However, due to the fact that the Si taper 1945 is generally only about 0.2~0.5 μm high, after a few spin-on layers, the following layers should be flat and uniform as suggested in FIG. 36L. With a top cladding 1955, a buried GRIN planar waveguide 1915/1950 is thus formed with the Si taper 1945 in the center of the GRIN waveguide core.

Figure 36M:
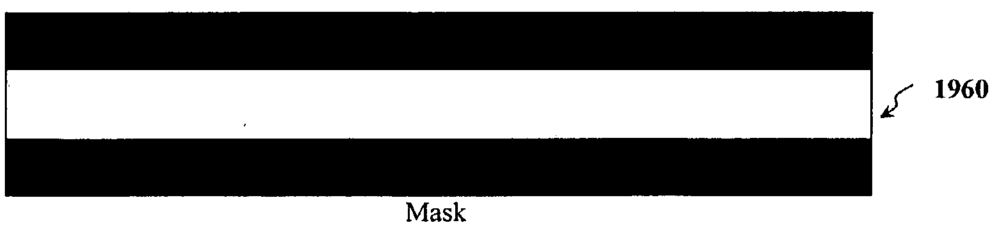
Figure 36N:
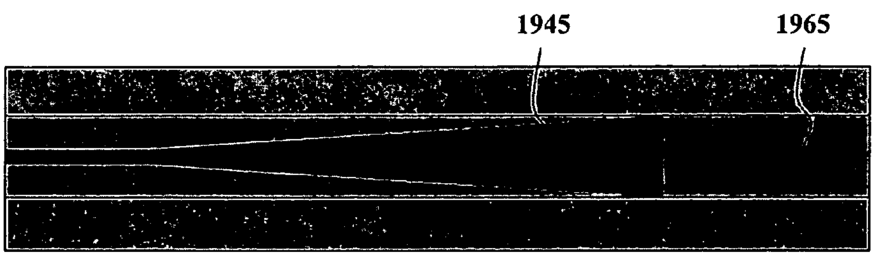

To form a dielectric channel waveguide with a step refractive index distribution in the lateral direction to confine light propagation, dry etching can be used. However, UV imprinting is preferred since the deposited GRIN dielectric film can be made photosensitive. A step channel mask 1960, as shown in FIG. 36M, can be used to form a single mode step refractive index channel waveguide 1965 to confine light in the horizontal/lateral direction. When viewed from the top, as shown in FIG. 36N, the result is a tapered up Si taper 1945 integrated with a step index channel waveguide 1965.

It should be understood that these dimensions and exemplary lengths are presented for the purposes of illustrating a useful embodiment of the device 1900 and are not intended to limit other embodiments of any exemplary device, or the device 1900. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the various embodiments of the present invention, including the side surfaces, the top and bottom surfaces, and the input/output surfaces, of the present invention In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the said devices.

It should be understood to those skilled in the art that the device 1900 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

(8) Exemplary Device 8: A Vertical-Sharp-Down-Taper-and-Lateral-Sharp-Down-Taper-Cascaded-with-a-Symmetric-Vertical-Graded-Refractive-Index-and-Lateral-Graded-Refractive Index (VSDT×LSDT+VGRIN×LGRIN) ICMT Device FIGS. 37A–B illustrates an eighth general embodiment of a combined module ICMT device 2000 including a vertically and laterally down-tapered waveguide core embedded in and connected to a large channel waveguide with a nearly symmetric vertically and laterally graded refractive index distribution. It is in fact a second possible combination of a taper integrated with a lower-refractive-index-contrast large-size channel waveguide. The device 2000 can perform as a two dimensional beam-size enlargement and collimating element in both the lateral and the vertical directions for a propagating optical beam, and can in particular enlarge and collimate an optical beam from a small semiconductor waveguide to enable the beam to match with a single mode optical fiber. The device is not limited to use as a beam enlarger/collimator but can also function as a beam reducer when the optical beam propagates in the reverse direction. Furthermore, the device can be used for direct light beam coupling into an optical fiber. It should be understood that these exemplary applications of device 2000 are intended to illustrate the uses for device 2000 and are not intended to limit the applications of other embodiments of device 2000. The device can be referred to as a "vertical-sharp-down-taper and lateral-sharp-down-taper-cascaded-with-asymmetric-vertical-graded-refractive-index-and-lateral-graded-refractive-index (VSDT×LSDT+VGRIN×LGRIN) ICMT".

VSDT×LSDT+VGRIN×LGRIN ICMT 2000 preferably includes a Waveguiding Core region occupied by Waveguide Core WC 2045. This Waveguide Core WC 2045 is embedded in an optical medium 2015/2050 that acts as the cladding for the Waveguide Core WC 2045 wherever the Waveguide Core WC 2045 exists, but at the same time, the same optical medium 2015/2050 acts as a Lower Refractive index Contrast Waveguiding Core region. This Lower Refractive index Contrast Waveguiding Core region is occupied by Waveguide Core LRCWC 2015/2050, and is further surrounded by an even lower refractive index cladding region Waveguide Core WC 2045 is surrounded at the bottom by Lower Graded Waveguide Cladding LGWCL 2015, on the top by Upper Graded Waveguide Cladding UGWCL 2050 and on both sides by Side Stratified Waveguide Cladding SSWCL 2070, which is basically a combination of the Lower Graded Waveguide Cladding LGWCL 2015 and the Upper Graded Waveguide Cladding UGWCL 2050.

When viewed from the side, the Waveguide Core WC 2045 preferably includes a small beam input/output port SB-PT 2071*a*, a high refractive index contrast straight waveguiding core region SWC 2072*a*, a high refractive index contrast vertically tapered down region VTD 2073*a*, and an intermediate beam output/input port region 2074*a*. The straight high refractive index contrast waveguiding core region SWCa 2072*a* has a length $l_{HRCSWCa}$, and a thickness of $t_{HRCSWCa}$. The high refractive index contrast vertically tapered down waveguiding core region VTDWC 2073*a* has a length of $l_{HRCVTDWCa}$, a vertical thickness of $t_{HRCVTDWCaSB}$ at the small-beam input/output side, and a vertical thickness of $t_{HRCVTDCaLB}$ at the large-beam input/output side.

When viewed from the top, the Waveguide Core 2045 preferably includes a small beam input/output port SB-PT 2071*b*, a straight waveguiding core region SWC 2072*b*, a laterally tapered down region LTD 2073*b*, and an intermediate beam output/input port region 2074*b*. The straight waveguiding core region SWCb 1972*b* has a length $l_{HRCSWCb}$, and a width of $w_{HRCSWCb}$. The laterally tapered down waveguiding core region LTDWC 1973*b* has a length of $l_{HRCLTDWCb}$, a width of $w_{HRCLTDWCbSB}$ at the small-beam input/output side, and a width of $w_{HRCLTDCbLB}$ at the large-beam input/output side.

It should be understood that the straight waveguiding core regions 2072*a* and 2072*b* (based on whether the structure is viewed from the side or from the top), may have the same or a different length. Similarly, the vertically tapered down region 2073*a* (when viewed from the side) and the laterally tapered down region 2073*b* (when viewed from the side) may have the same or a different length, provided that the tip for both tapering down geometries ends at the same point in space. Furthermore, the taper regions do not need to be symmetric with respect to the central axis and also the tapering down slopes do not need to be straight and may be of any curve shape.

Lower-Refractive-index-Contrast-Waveguide Core LRCWC 2015/2050 preferably surrounds and embeds the Waveguide Core WC 2045. When viewed from the side, the Lower Refractive index Contrast Waveguide Core LRCWC 2015/2050 is sandwiched at the bottom by a Lower Waveguide Cladding LWCL 2005, and on the top by an Upper Waveguide Cladding UWCL 2055. As the Lower-Refractive-index-Contrast-Waveguide Core LRCWC 2015/2050 has a graded refractive index distribution along both the vertical and lateral directions, it can take the intermediate size beam launched at the tip region 2074*a*/2074*b* from the Waveguide Core WC 2045 and further expand the beam. After the beam has traveled a certain distance equivalent to the focal length of the graded refractive index lens structure, the beam will be collimated and reach the back large beam output/input port LB-PT 2077, from where another single-mode waveguide such as a single-mode optical fiber will continue to guide the light beam. The Lower Refractive index Contrast Waveguide Core LRCWC 2070 has a length of $l_{LRCWC}$, a width of $w_{LRCWC}$ and a thickness of $t_{LRCWC}$. The Lower Waveguide Cladding LWCL 2005 has a length of $l_{LWCL}$, a width of $w_{LWCL}$ and a thickness of $t_{LWCL}$. The Upper Waveguide Cladding UWCL 2055 has a length of $l_{UWCL}$, a width of $w_{UWCL}$ and a thickness of $t_{UWCL}$. The two side waveguide claddings SWCL 2076 have a length of $l_{SWCL}$, a width of $w_{SWCL}$ and a thickness of $t_{SWCL}$. The lengths of the waveguide claddings LWCL/UWCL/SWCL 2005/2055/2076, $l_{LWCL}$, $l_{UWCL}$, and $l_{SWCL}$ are about equal to the length of the low refractive index contrast waveguide core $l_{LRCWC}$.

The refractive index of the Waveguide Core WC 2045 is $n_{HRCWC}$. The refractive index of the Lower Refractive index Contrast Waveguide Core LRCWC 2015/2050 is $n_{LRCWC}(x, y)$, which means it is x and y coordinate dependent, with x being the lateral coordinate and y being the vertical coordinate. The refractive index of the Lower Waveguide Cladding LWCL 2005 is $n_{LWCL}$. The refractive index of the Upper Waveguide Cladding UWCL 2055 is $n_{UWCL}$. The refractive index of the Side Waveguide Cladding SWCL 2076 is $n_{SWCL}(y)$, which means it may also be y-coordinate dependent. It should be understood that the Side Waveguide Cladding SWCL 2076 may have either a uniform or non-uniform refractive index distribution. In other words, the refractive index of the Side Waveguide Cladding may or may not be a constant. In the latter case, it may be graded in the vertical direction. In a preferred embodiment, the refractive index of the Waveguide Core LRCWC 2015/2050 is not a constant. It is graded in the vertical direction and varies from the center plane of the core to the top and bottom border of the core. The variation can be represented by $n_{LRCWC}(y)$ with y being the vertical coordinate. In the lateral direction, the refractive index of the Lower Refractive index Contrast Waveguide Core LRCWC 2070 also have a graded profile. However, for a given vertical coordinate $y_0$, the refractive index $n_{LRCWC}(x, y_0)$ is graded within the core region and drops to $n_{SWCL}(y_0)$, the refractive index value of the side cladding at the two side borders.

In an exemplary device, the front beam input/output port FB-PT 2071*a*/2071*b* is configured to receive/transmit a light beam typically having wavelength λ with a very small beam size. The mode size of the straight section of the Waveguide Core WC 2045 can be designed to match the mode size of a preceding very-small-size waveguide. The laterally and vertically tapering down section 2073*a*/2073*b* will partially enlarge the beam in both the vertical and the lateral directions to an intermediate size. The laterally and vertically graded Lower Refractive index Contrast Waveguide Core LRCWC is configured to take the intermediate size beam launched at region 2074*a*/2074*b* and further expand and collimate it. The back beam input/output port LB-PT 2077 is configured to receive/transmit a light beam typically having wavelength λ with a beam size that roughly equals the size of an optical fiber.

(i) An Exemplary Device

In an exemplary embodiment, the Waveguide Core WC 2045 is made up of silicon with a refractive index of $n_{HRCWC}$=3.5, the Lower Refractive index Contrast Waveguide Core LRCWC 2015/2050 is made up of lead-titania-silica material mixture with mixture composite designed to give a refractive index distribution that approximates a parabolic distribution in both the vertical and the lateral directions as given by the equation:

$$n_{LRCWC}(x, y) = 1.61 + 0.09\left[1 - \left(\frac{x^2 + y^2}{5\mu m)^2}\right)\right].$$

The Lower Waveguide Cladding LWCL 2005 is made up of silica-titania with a refractive index of $n_{LWCL}$=1.5. The Upper Waveguide Cladding UWCL is made up of silica-titania with a refractive index of $n_{UWCL}$=1.5. The Side Waveguide Cladding SWCL is made up of lead silica-titania with a refractive index distribution given in Table II.

The dimensions of the Waveguide Core WC 2045 are as follows: lHRCSWCa=10 μm, $t_{HRCSWCa}$=0.3 μm, $l_{HRCVTDWCa}$=30 μm, $t_{HRCVTDDWCaSB}$=0.3 μm, $t_{HRCVTDCaLB}$=0 μm, $l_{HRCSWCb}$=10 μm, $w_{HRCSWCb}$=0.3 μm, $l_{HRCLTDWCb}$=30 μm, $w_{HRCLTDWCbSB}$=0.3 μm, $w_{HRCLTDCbLB}$=0 μm. The dimensions of the Lower Refractive index Contrast Waveguide Core LRCWC 2015/2050 are as follows: $l_{LRCWC}$=70 μm, $w_{LRCWC}$=10 μm, $t_{LRCWC}$=10 μm. The Lower Waveguide Cladding LWCL 2005 has a length of $l_{LWCL}$=70 μm, a width of $w_{LWCL}$=30 μm and a thickness of $t_{LWCL}$=2 μm. The Upper Waveguide Cladding UWCL 2055 has a length of $l_{LWCL}$=70 μm, a width of $w_{UWCL}$=30 μm and a thickness of $t_{UWCL}$=2 μm. The two side waveguide claddings SWCL 2076 have a length of $l_{SWCL}$=70 μm, a width of $w_{SWCL}$=10 μm and a thickness of $t_{SWCL}$=10 μm. It should be appreciated by one skilled in the art that all parameter values used in this and other exemplary embodiments are approximate and that the actual values can vary significantly.

(ii) General Operation of the Device

FIG. 38 shows the results of a computer simulation of the spatial distribution of the electric field strength for the light input at λ-1.5 μm after being launched from the left into the small light beam input/output port 2071*a*/2071*b*. The mode size at the input end is 0.3 μm in both the lateral and vertical directions. As the tapering down section only lies towards the right for the last 30 μm in both the vertical and the lateral directions and the cascading beam expansion action occurs on both the left and the right part of the WC taper tip, the computer simulation is thus zoomed into the last 60 μm of the coupler structure. Although the computer simulation is only 2 dimensional, it can be applied to both the vertical and the lateral directions because the structures are very similar in this case. As can be seen from FIG. 38, the whole combined module coupler structure can transform a very small beam of 0.3 μm in size to a large size beam of 10 μm in both the vertical and the horizontal directions.

(iii) Device Fabrication Procedures

An exemplary procedure for fabricating a VSDT×LSDT+VGRIN.time-s.LGRIN ICMT device 2000 will now be described with reference to FIGS. 39A–N. This procedure is given for the purpose of illustration and not limitation, as there are other procedures that can be used to achieve the same fabrication results and other materials systems or device structures that can be utilized to fabricate devices with the same functional capabilities.

Figure 39A:
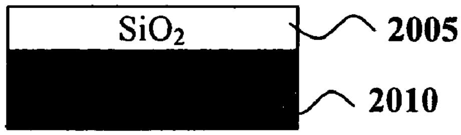
FIGS. 39A–N illustrate exemplary fabrication steps for the super mode transformation coupler of FIG. 37.

The VSDT×LSDT+VGRIN×LGRIN ICMT may be fabricated by starting with a Silica-On-Silicon (SOS) wafer, shown in FIG. 39A, which may be fabricated via a commercial process known to those skilled in the art. For an SOS wafer, a low refractive index layer of $SiO_2$ 2005 with a thickness of $t_{LWC}$ is already made on a Si substrate 2010. The fabrication of the VSDT×LSDT+VGRIN×LGRIN ICMT structure according to one embodiment is now described below.

Figure 39B:
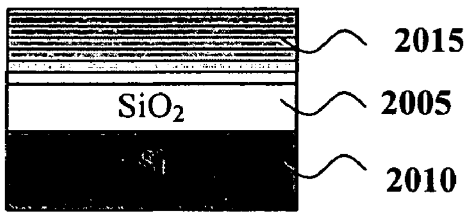
Figure 39C:
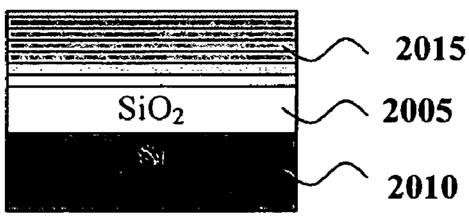

As shown in FIGS. 39B–C, a graded refractive index distribution in the vertical direction may be achieved by depositing multiple sufficiently thin layers of photosensitive materials with different compositions 2015 on a lower cladding layer 2005. In such a case, a continuous distribution of the refractive index can be approximated by a series of small effective refractive index steps with each thin layer having a different refractive index value. Depending on the property of the dielectric material, an appropriate film deposition method can be used. These methods include evaporation, flame hydrolysis, sputtering, Ion-Assisted-Deposition, chemical vapor deposition, and others. An exemplary method is sol-gel spin or dip coating which offers the ability to vary the material composition of each thin layer easily. In the case of silica-based glass, the photosensitivity of the glass material may be enabled by incorporating Ge or Pb into the glass film. It should be understood that any optically transparent dielectric material in the spectrum region of interest to optical communication may be used for the deposition; examples include lead silica, germania-silica, titania-silica, silicon oxynitride, silicon nitride, polysilicon, silicon-rich-silica, silicon carbide, polymer and a combination of different materials. The parameter details of one preferred embodiment of the design for the GRIN layers has already been shown in Table II. Note that the refractive index distribution does not have to follow the parabolic profile and may be of any profile. It should also be understood that other film deposition techniques such as flame hydrolysis, sputtering, Ion-Assisted-Deposition and chemical vapor deposition may also be used to deposit the bottom half of the GRIN dielectric waveguide.

Figure 39D:
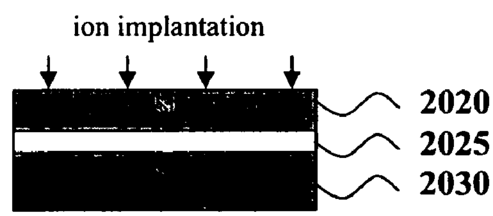
Figure 39E:
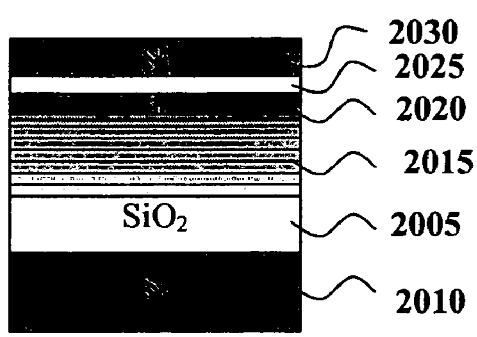
Figure 39F:
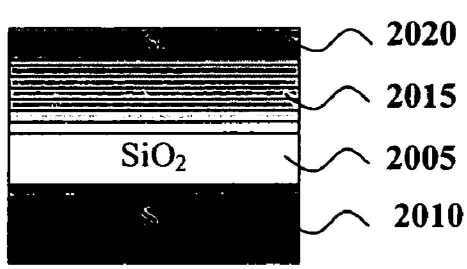
Figure 39G:
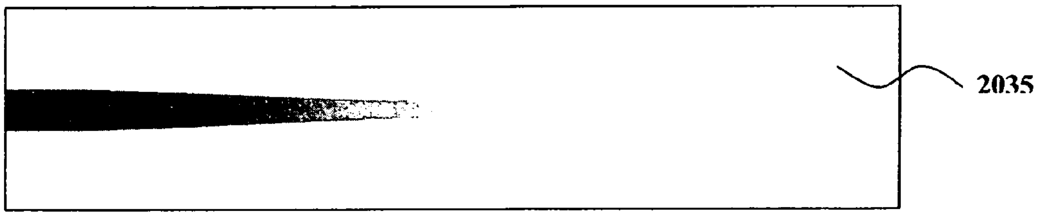

As shown in FIG. 39D, a thin silicon layer 2020, which is to be made into the high index contrast waveguide core, may be defined in another piece of bare Si wafer using, for example, ion implantation. This will form a thin silicon layer 2020 on an ion implanted layer 2025 that is sitting on top of a Si substrate 2030. This ion-implanted wafer may be flipped over and wafer-bonded to the GRIN dielectric-coated $SiO_2$—Si wafer, as shown in FIG. 39E. The top thick Si part 2030 and the ion-implanted layer 2025 may then be removed using a lift-off technique such as rapid thermal annealing and/or wafer thinning. The result is shown in FIG. 39F. This technique may be modified if, for instance, a non-symmetric vertical-GRIN waveguide is desired, as will be described below.

Figure 39H:
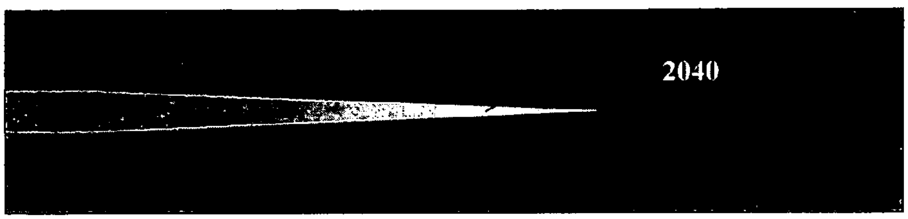
Figure 39I:
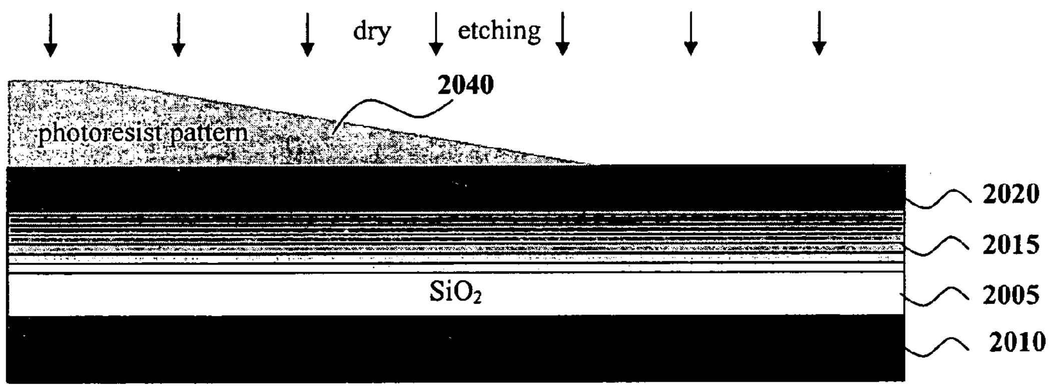
Figure 39J:
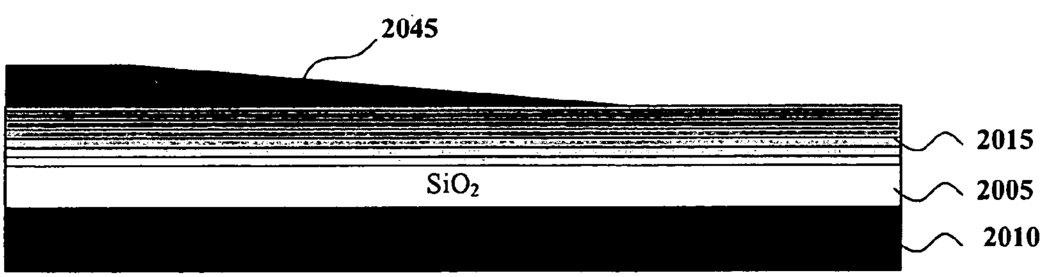
Figure 39K:
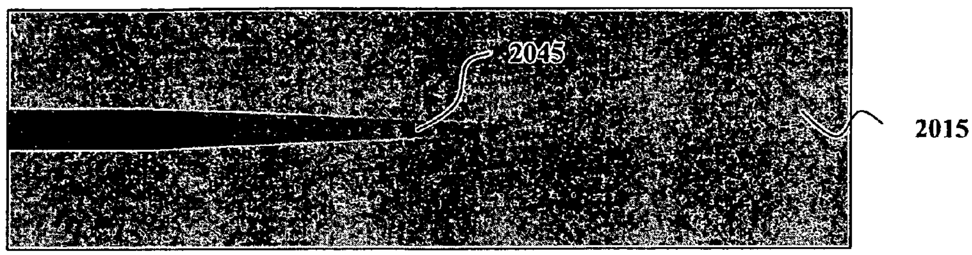

To form a vertically as well as horizontally/laterally tapered down section, the fabrication steps are similar to those described above for exemplary device 4. A photoresist layer is first spin-coated on the Si waveguide layer 2020. A mask pattern 2035, shown in FIG. 39G, with a gray scaled transparency along the longitudinal direction and meanwhile a horizontal/lateral down/narrow taper can be used together with UV exposure and photoresist development to make a vertically as well as horizontally/laterally down tapered photoresist pattern 2040, as shown in FIG. 39H. Followed by dry etching, as shown in FIG. 39I, the vertically as well as horizontally/laterally down tapered photoresist pattern 2040 can be transferred to the high refractive index Si layer and form the vertically and horizontally/laterally tapered down/narrow Si section 2045, as shown in FIGS. 39J–K. It should again be noted that the interface between the top Si layer and the glass-based cladding material can be used as a natural stop during the dry etching process.

Figure 39L:
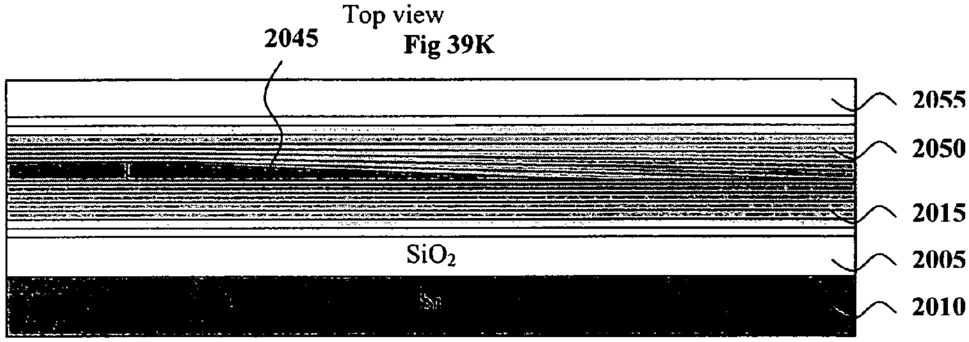

To form the top half of the vertically GRIN glass/polymer waveguide, a refractive-index-decreasing dielectric region 2050 is deposited as shown in FIG. 39L. Preferably photosensitive sol-gel silica is spin-coated in almost the same way as for the bottom half of the glass/polymer waveguide except that the order of the layers is now reversed. It should again be understood that the parabolic refractive index distribution cited here is only one example and, as is well known to those skilled in the art, other refractive index distributions may be used. On the very top, a relatively thick (say 3 μm) silica layer 2055 may be deposited to act as an upper cladding.

It should be noted that the sol-gel technique has an advantage in that the spin-coated film will change shape from conformal coating to planarized coating. The initial layer thickness may not be so even and uniform. However, due to the fact that the Si taper 2045 is generally only about 0.2.about.0.5 μm high, after a few spin-on layers, the following layers should be flat and uniform. With a top cladding 2055, a buried GRIN planar waveguide 2015/2050 can thus be formed with the Si taper 2045 in the center of the GRIN waveguide core.

Figure 39M:
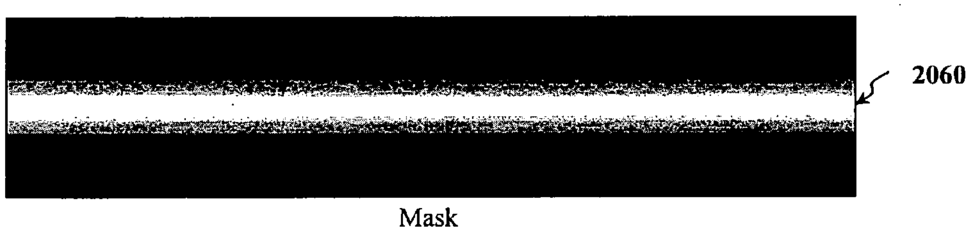
Figure 39N:
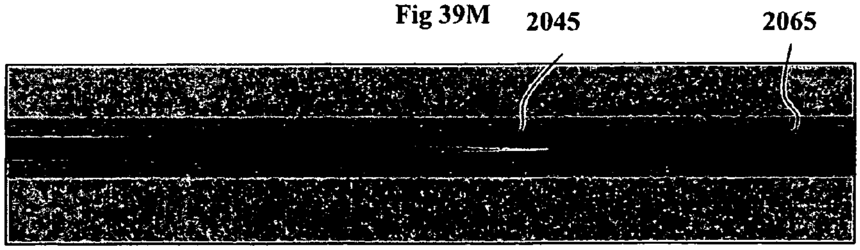

As has been described before, to form a dielectric channel waveguide with a GRIN distribution in the horizontal/lateral direction to confine light propagation, UV imprinting may be used since the deposited GRIN glass/polymer film may be made photosensitive. A GRIN channel mask 2060, as shown in FIG. 39M can be used to form a single mode GRIN channel waveguide 2065 to confine light in the horizontal/lateral direction, resulting in the structure shown in FIG. 39N.

It should be understood that the above dimensions and exemplary lengths are presented for the purposes of illustrating a useful embodiment of the device 2000 and are not intended to limit other embodiments of any exemplary device, or the device 2000. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the various embodiments of the present invention, including the side surfaces, the top and bottom surfaces, and the input/output surfaces.

In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the devices.

It should be understood to those skilled in the art that the device 2000 can be fabricated on a different substrate other than silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

Figure 40A:
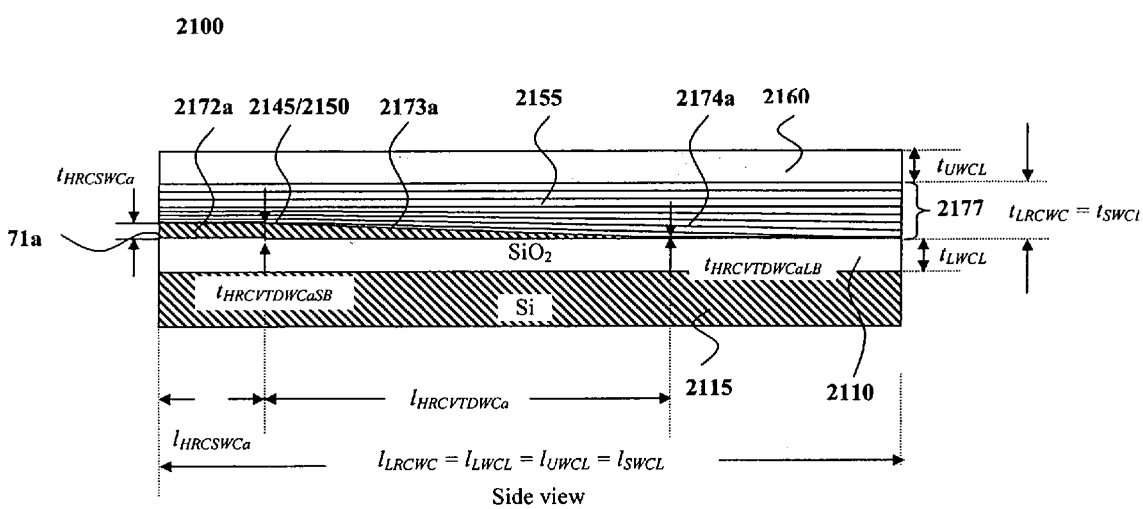
FIG. 40A is a side view of a super mode transformation coupler with a vertically down-tapered high-index waveguide core embedded in a glass/polymer waveguide with a non-symmetric graded refractive index in the vertical direction and a step refractive index in the horizontal/lateral direction according to the present invention.
Figure 40B:
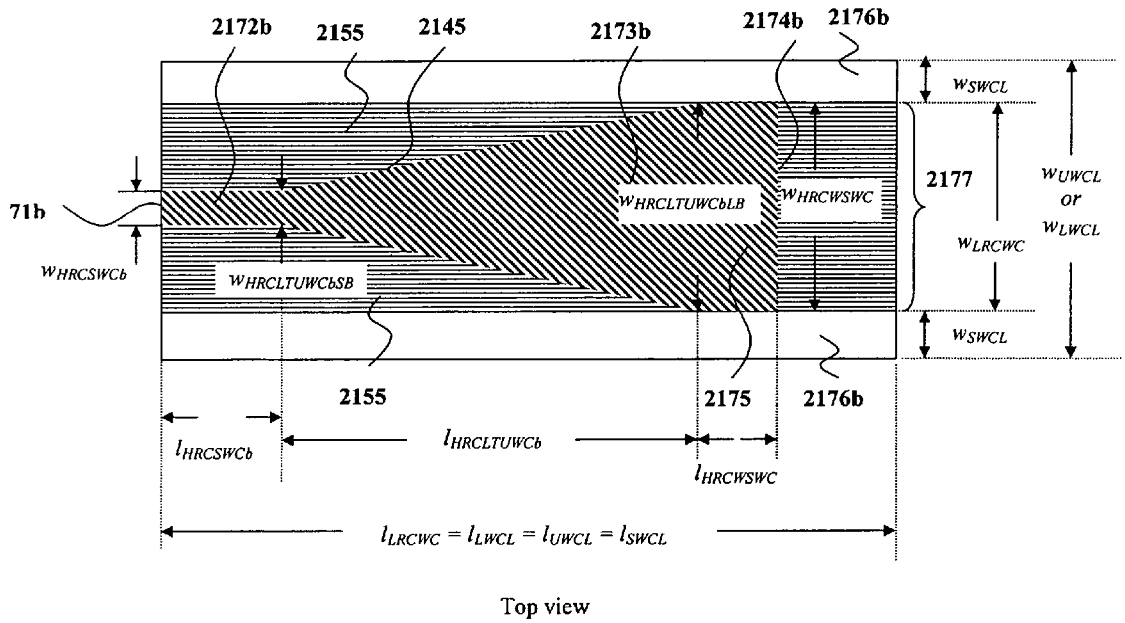
FIG. 40B is a top view of the super mode transformation coupler of FIG. 40A, in which the high-index waveguide core is horizontally up-tapered.
Figure 40C:
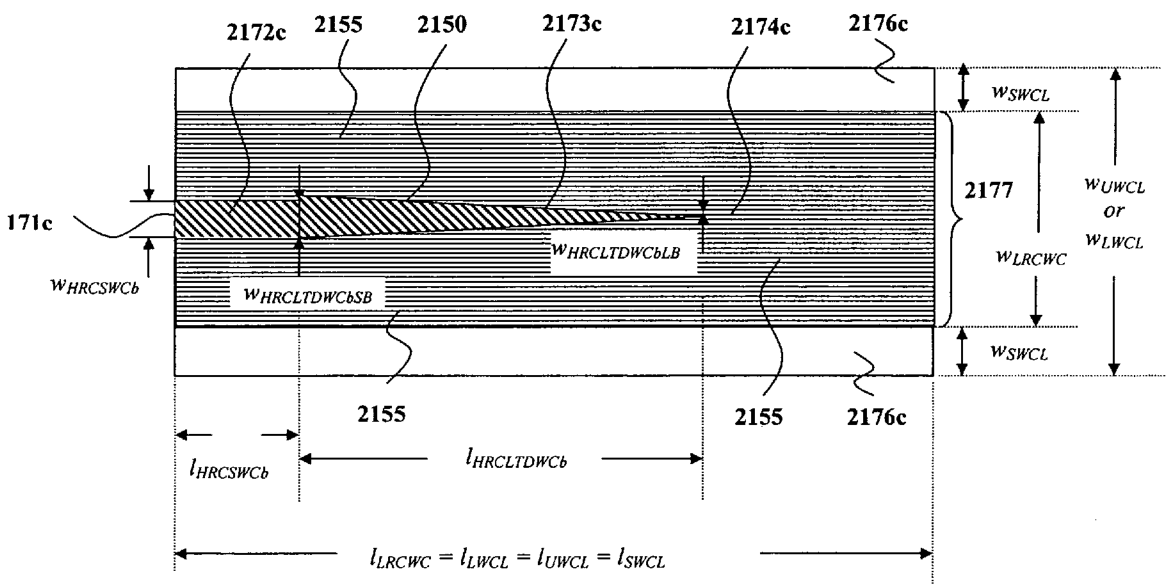
FIG. 40C is an alternative top view of the super mode transformation coupler of FIG. 40A, in which the high-index waveguide core is horizontally down-tapered.

(9) Exemplary Device 9: A Vertical-Sharp-Down-Taper-Cascaded-with-a-Nonsymmetric-Vertical-Graded-Refractive-Index-(VSDT+NSVGRIN) Device FIGS. 40A–C illustrates a ninth general embodiment of a combined module ICMT device 2100 involving a vertically down-tapered waveguide core cascaded with and connected to a large channel waveguide with a non-symmetric vertically graded refractive index distribution. In the lateral direction, the high refractive index contrast taper can be either gradually tapered up, as shown in FIG. 40B, or sharply tapered down, as shown in FIG. 40C. In the former case, the large channel waveguide has a step index profile in the lateral direction. In the latter case, the large channel waveguide has a graded index profile. Device 2100 differs from exemplary device 7 or 8 in that the vertical GRIN waveguide in device 2100 is non-symmetric.

The device 2100 can perform as a two-dimensional beam-size enlargement and collimating element in both the lateral and the vertical directions for a propagating optical beam, and can in particular enlarge and collimate an optical beam from a small semiconductor waveguide to enable the beam to match with a single mode optical fiber. The device is not limited to use as a beam enlarger/collimator but can also function as a beam reducer when the optical beam propagates in the reverse direction. Furthermore, the device can be used for direct light beam coupling into an optical fiber. It should be understood that these exemplary applications of device 2100 are intended to illustrate the uses for device 2100 and are not intended to limit the applications of other exemplary embodiments of device 2100 to these examples. The device can be referred to as a "vertical-sharp-down-taper-cascaded-with-a-nonsymmetric-vertical-graded-refractive-index (VSDT+NSVGRIN) ICMT".

The present VSDT+NSVGRIN ICMT preferably includes a Waveguiding Core region occupied by Waveguide Core WC 2145/2150. This Waveguide Core WC 21415/2150 is sandwiched at the bottom by a Lower Waveguide Cladding LWC 2110 and on the top as well as at both sides by a vertically graded refractive medium 2155 that acts as the top and side cladding for the Waveguide Core WC 2145/2150 wherever the Waveguide Core WC 2145/2150 exists. The same graded refractive index medium 2155 acts as a Lower Refractive Index Contrast Waveguiding Core region. This Lower Refractive index Contrast Waveguiding Core region is occupied by Waveguide Core LRCWC 2155, and is further surrounded at the top by an even lower refractive index Upper Waveguide Cladding 2160.

When viewed from the side, the Waveguide Core WC 2145/2150 preferably includes a small beam input/output port SB-PT 2171*a*, a high refractive index contrast straight waveguiding core region SWC 2172*a*, a high refractive index contrast vertically down-tapered region VTD 2173*a*, and an intermediate beam output/input port region 2174*a*. The straight high refractive index contrast waveguiding core region SWCa 2172*a* has a length $l_{HRCSWCa}$, and a thickness of $t_{HRCSWCa}$. The high refractive index contrast vertically tapered down waveguiding core region VTDWC 2173*a* has a length of $l_{HRCVTDWCa}$, a vertical thickness of $t_{HRCVTDWCaSB}$ at the small-beam input/output side, and a vertical thickness of $t_{HRCVTDCaLB}$ at the large-beam input/output side.

In the laterally up-tapering case, when viewed from the top, the Waveguide Core 2145 preferably includes a small beam input/output port SB-PT 2171*b*, a straight waveguiding core region SWC 2172*b*, a laterally up-tapered region LTU 2173*b*, a wider straight waveguiding core region WSWC 2175 and a large beam output/input port region 2174*b*. The straight waveguiding core region SWCb **2172*b* has a length $l_{HRCSWCb}$, and a width of $w_{HRCSWCb}$. The laterally up-tapered waveguiding core region LTUWC 2173*b* has a length of $l_{HRCLTUWCb}$, a width of $w_{HRCLTUWCbSB}$ at the small-beam input/output side, and a width of $w_{HRCLTUCbLB}$ at the large-beam input/output side. The wider straight waveguide core region WSWC 2175** has a length of $l_{HRCWSWCb}$ and a width of $w_{HRCWSWCb}=w_{HRCLTUCbLB}$.

In the laterally down-tapering case, when viewed from the top, the Waveguide Core 2150 preferably includes a small beam input/output port SB-PT **2171*c*, a straight waveguiding core region SWC 2172*c*, a laterally down-tapered region LTD 2173*c*, and an intermediate beam output/input port region 2174*c*. The straight waveguiding core region SWCc 2172*c* has a length $l_{HRCSWCc}$, and a width of $w_{HRCSWCc}$. The laterally tapered down waveguiding core region LTDWC 2173*c*** has a length of $l_{HRCLTDWCc}$, a width of $w_{HRCLTDWCcSB}$ at the small-beam input/output side, and a width of $w_{HRCLTDCcLB}$ at the large-beam input/output side.

It should be understood that the straight waveguiding core regions **2171*a* and 2171*b/c* (based on whether the structure is viewed from the side or from the top), may have the same or a different length. Similarly, the vertically down-tapered region 2172*a* (when viewed from the side) and the laterally up/down-tapered region 2172*b/c*** (when viewed from the side) may have the same or a different length, provided that in the case where the waveguide core is both laterally and vertically down-tapered, the tip for both down-tapering geometries ends at the same point in space. Furthermore, the taper regions do not need to be symmetric with respect to the central axis and also the down-tapering slope (or slopes) do(es) not need to be straight and may be of any curve shape.

Lower-Refractive-index-Contrast-Waveguide Core LRCWC 2155 surrounds and embeds the Waveguide Core WC 2145/2150 either partially or entirely. When viewed from the side, the Lower Refractive index Contrast Waveguide Core LRCWC 2155 is sandwiched at the bottom by a Lower Waveguide Cladding LWCL 2110, and on the top by an Upper Waveguide Cladding UWCL 2160. As the Lower-Refractive-index-Contrast-Waveguide Core LRCWC 2155 has a graded refractive index distribution in the vertical direction, it can take a vertically intermediate size beam launched at the tip region **2174*a* from the Waveguide Core WC 2145/2150 and further expand the beam. After the beam has traveled a certain distance equivalent to the focal length of the graded refractive index structure, the beam will be collimated and reach the back large beam output/input port LB-PT 2177, from where another single mode waveguide such as a single mode optical fiber will continue to guide the light beam. The Lower Refractive index Contrast Waveguide Core LRCWC 2155 has a length of $l_{LRCWC}$, a width of $W_{LRCWC}$ and a thickness of $t_{LRCWC}$. The Lower Waveguide Cladding LWCL 2110 has a length of $l_{LWCL}$, a width of $w_{LWCL}$ and a thickness of $t_{LWCL}$. The Upper Waveguide Cladding UWCL 2160 has a length of $l_{UWCL}$, a width of $w_{UWCL}$ and a thickness of $t_{UWCL}$. The side waveguide claddings SWCL 2176*b/c* have a length of $l_{SWCL}$, a width of $w_{SWCL}$ and a thickness of $t_{SWCL}$. The lengths of the waveguide claddings LWCL/UWCL/SWCL 2005/2055/2076**, $l_{LWCL}$, $l_{UWCL}$, and $l_{SWCL}$ are about equal to the length of the low refractive index contrast waveguide core $l_{LRCWC}$.

The refractive index of the Waveguide Core WC 2145/2150 is $n_{HRCWC}$. The refractive index of the Lower Refractive index Contrast Waveguide Core LRCWC 2155 is $n_{LRCWC}(x, y)$, which means that it may be x- and y-coordinate dependent, with x being the lateral coordinate and y being the vertical coordinate. The refractive index of the Lower Waveguide Cladding LWCL 2110 is $n_{LWCL}$. The refractive index of the Upper Waveguide Cladding UWCL 2160 is $n_{UWCL}$. The refractive index of the Side Waveguide Cladding SWCL **2176*b/c* is $n_{SWCL}(y)$, which means it may also be y coordinate dependent. It should be understood that the Side Waveguide Cladding SWCL 2176*b/c* may have either a uniform or non-uniform refractive index distribution. In other words, the refractive index of the Side Waveguide Cladding may or may not be a constant. In the latter case, it may be graded in the vertical direction. Similar to exemplary device 6, the refractive index of the Lower Refractive index Contrast Waveguide Core LRCWC 2155 is preferably not a constant. It is graded in the vertical direction and varies from the bottom to the top. The variation can be represented by $n_{LRCWC}(y)$, with y being the vertical coordinate. In the lateral direction, the refractive index of the Lower Refractive index Contrast Waveguide Core LRCWC 2155** may have either a step or a graded profile. In the step profile case, for a fixed y value, the refractive index $n_{LRCWC}(x, y)$ has a fixed higher value within the core region and a lower value outside the core region. For the graded profile case, for a given y coordinate $y_0$, the refractive index $n_{LRCWC}(x, y_0)$ is graded within the core region and drops to $n_{SWCL}(y_0)$, the refractive index value of the side cladding, at the two side borders.

In an exemplary device, the front beam input/output port FB-PT **2171*a/b/c* is configured to receive/transmit a light beam typically having wavelength λ with a very small beam size. The mode size of the straight section 2172*a/b/c* of the Waveguide Core WC 2145/2150 is preferably designed to match the mode size of a preceding very small size waveguide. The vertically down-tapering section 2173*a* will partially enlarge the beam in the vertical direction to an intermediate size. The vertically graded Lower Refractive index Contrast Waveguide Core LRCWC 2155 is configured to take the intermediate size beam launched at region 2174*a* and further expand and collimate it. Note that in device 2100, only the top half of a symmetric GRIN waveguide is fabricated on top of the Waveguide Core taper. The consequence is that the refractive index distribution is no longer symmetric in the vertical direction (Note that in the lateral direction across a channel waveguide, the refractive index distribution can still be made symmetric using, e.g., UV imprinting as has been explained). The coupler is functional because the situation is equivalent to using half of a lens with the Si taper located on the central axis of the lens. The lateral beam enlargement for both the laterally up tapering and down tapering cases is substantially the same as has been described for exemplary devices 7 and 8 and will thus not be repeated. The back beam input/output port LB-PT 2177** is configured to receive/transmit a light beam typically having wavelength λ with a beam size that roughly equals the size of an optical fiber.

(i) An Exemplary Device

In an exemplary embodiment, the Waveguide Core WC 2145/2150 is made up of silicon with a refractive index of $n_{HRCWC}=3.5$. The Lower Refractive index Contrast Waveguide Core LRCWC 2155 is made up of lead-titania-silica material mixture with mixture composite designed to give a refractive index distribution that approximates half of a parabolic distribution in the vertical direction as governed by the following equation and detailed in Table III.

TABLE III $$n_{LRCWC}(y) = 1.65 + 0.03\left[1 - \left(\frac{y^2}{10\,\mu m)^2}\right)\right],\ y \geq 0.$$

The refractive index profile of a high focusing power 10 μm height half GRIN waveguide

| coordinate y (μm) | LRCWC refractive index n | SWCL refractive index n |
|---|---|---|
| 0.0–0.4 | 1.950 | 1.940 |
| 0.4–0.8 | 1.948 | 1.938 |
| 0.8–1.2 | 1.946 | 1.936 |
| 1.2–1.6 | 1.942 | 1.932 |
| 1.6–2.0 | 1.938 | 1.928 |
| 2.0–2.4 | 1.933 | 1.923 |
| 2.4–2.8 | 1.926 | 1.916 |
| 2.8–3.2 | 1.919 | 1.909 |
| 3.2–3.6 | 1.911 | 1.901 |
| 3.6–4.0 | 1.902 | 1.892 |
| 4.0–4.4 | 1.892 | 1.882 |
| 4.4–4.8 | 1.881 | 1.871 |
| 4.8–5.2 | 1.869 | 1.859 |
| 5.2–5.6 | 1.856 | 1.846 |
| 5.6–6.0 | 1.842 | 1.832 |
| 6.0–6.4 | 1.827 | 1.817 |
| 6.4–6.8 | 1.811 | 1.801 |
| 6.8–7.2 | 1.794 | 1.784 |
| 7.2–7.6 | 1.777 | 1.767 |
| 7.6–8.0 | 1.758 | 1.748 |
| 8.0–8.4 | 1.738 | 1.728 |
| 8.4–8.8 | 1.718 | 1.708 |
| 8.8–9.2 | 1.696 | 1.686 |
| 9.2–9.6 | 1.674 | 1.664 |
| 9.6–10.0 | 1.650 | 1.640 |
| >10.0 | 1.470 | 1.470 |

The Lower Waveguide Cladding LWCL 2110 is made up of silica with a refractive index of $n_{LWCL}$=1.47. The Upper Waveguide Cladding UWCL is made up of silica with a refractive index of $n_{UWCL}$=1.47. The Side Waveguide Cladding SWCL is made up of lead silica-titania with a refractive index of distribution given in Table III.

For the case of a laterally up-tapered Waveguide Core WC 2145, the dimensions of the WC are as follows: $l_{HRCSWCa}$=110 μm, $t_{HRCSWCa}$=0.3 μm, $l_{HRCVTDWCa}$=30 μm, $t_{HRCVTDWCaSB}$=0.3 μm, $t_{HRCVTDCaLB}$=0 μm, $l_{HRCSWCb}$=10 μm, $w_{HRCSWCb.}$=0.3 μm, $l_{HRCLTUWCb}$=100 μm, $w_{HRCLTUWCbSB}$=0.3 μm, $w_{HRCLTUCbLB}$=10 μm, $l_{HRCWSWCb}$=30 μm and $w_{HRCWSWCb}$=10 μm. The dimensions of the Lower Refractive index Contrast Waveguide Core LRCWC 2155 are as follows: $l_{LRCWC}$=170 μm, $w_{LRCWC}$=10 μm, $t_{LRCWC}$=10 μm. The Lower Waveguide Cladding LWCL 2110 has a length of $l_{LWCL}$=170 μm, a width of $w_{LWCL}$=30 μm and a thickness of $t_{LWCL}$=2 μm. The Upper Waveguide Cladding UWCL 2160 has a length of $l_{UWCL}$=170 μm, a width of $w_{UWCL}$=30 μm and a thickness of $t_{UWCL}$=2 μm. The two side waveguide claddings SWCL 2176*b* have a length of $l_{SWCL}$=170 μm, a width of $w_{SWCL}$=10 μm and a thickness of $t_{SWCL}$=10 μm.

For the case of a laterally down-tapered Waveguide Core WC 2150, the dimensions of the WC are as follows: $l_{HRCSWCa}$=10 μm, $t_{HRCSWCa}$=0.3 μm, $l_{HRCVTDWCa}$=30 μm, $t_{HRCVTDWCaSB}$=0.3 μm, $t_{HRCVTDCaLB}$=0 μm, $l_{HRCSWCb}$=10 μm, $w_{HRCSWCb.}$=0.3 μm, $l_{HRCLTDWCb}$=30 μm, $w_{HRCLTDWCbSB}$=0.3 μm, $w_{HRCLTDCbLB}$=0 μm. The dimensions of the Lower Refractive index Contrast Waveguide Core LRCWC 2155 are as follows: $l_{LRCWC}$=70 μm, $w_{LRCWC}$=10 μm, $t_{LRCWC}$=10 μm. The Lower Waveguide Cladding LWCL 2110 has a length of $l_{LWCL}$=70 μm, a width of $w_{LWCL}$=30 μm and a thickness of $t_{LWCL}$=2 μm. The Upper Waveguide Cladding UWCL 2160 has a length of $l_{UWCL}$=70 μm, a width of $w_{UWCL}$=30 μm and a thickness of $t_{UWCL}$=2 μm. The two side waveguide claddings SWCL 2176*c* have a length of $l_{SWCL}$=70 μm, a width of $w_{SWCL}$=10 μm and a thickness of $t_{SWCL}$=10 μm. It should be appreciated by one skilled in the art that all parameter values used in this and other exemplary embodiments are approximate and that the actual values can vary significantly.

(ii) General Operation of the Device

Figure 41A:
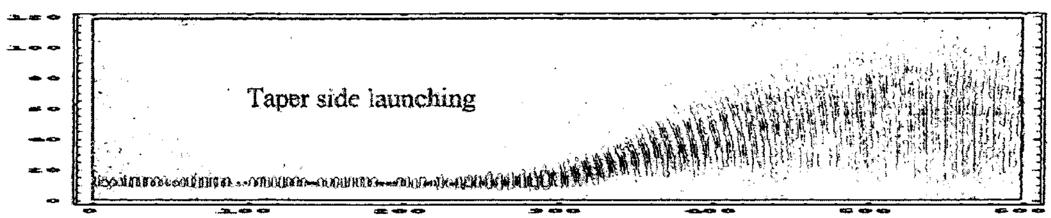
FIG. 41 is a result of a computer simulation of light propagation in the super mode transformation coupler of FIG. 40A.
Figure 41B:
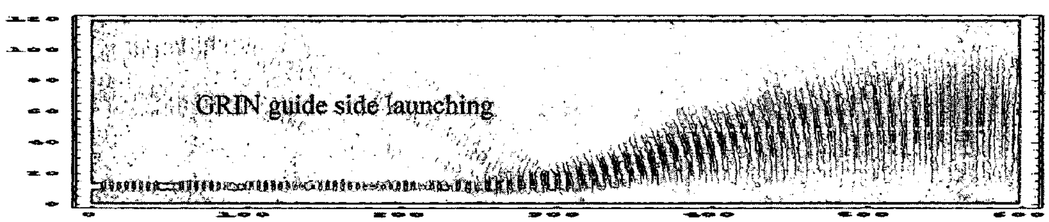

FIG. 41 shows the results of a computer simulation of the spatial distribution of the electric field strength in the vertical direction for light input from either direction at λ=1.5 μm. The upper graph shows the behavior when light is input into the small light beam input/output port 2171*a*; the mode size at input/output port 2171*a* is 0.3 μm in the vertical direction. As the tapering down section only lies towards the right for the last 30 μm and the cascading beam expansion action occurs on both the left and the right part of the vertical WC taper tip, the computer simulation is thus zoomed into the last 60 μm of the coupler structure. The lower graph is similar. It shows the behavior when light is input to the large light beam output/input port 2177. Comparing the two graphs demonstrates that the device has good coupling efficiency in both directions.

The beam expansion in the lateral direction for the laterally tapered up and laterally tapered down cases are similar to what has been described for exemplary devices 7 and 8 respectively; these cases are not shown in FIG. 41.

As can be seen from FIG. 41, the combined module coupler structure can transform a very small beam of about 0.3 μm in size to a large size beam of about 10 μm in both the vertical and the horizontal directions. Very efficient bidirectional coupling is thus made possible by the super-coupler.

(iii) Device Fabrication Procedures

An exemplary procedure for fabricating a VSDT+NSV-GRIN ICMT device 2100 will now be described with reference to FIGS. 42A–N. This procedure is given for the purpose of illustration and not limitation, as there are other procedures that can be used to achieve the same fabrication results and other materials systems or device structures that can be utilized to fabricate devices with the same functional capabilities.

The VSDT+NSVGRIN ICMT may be fabricated by starting with a Silicon-On-Insulator (SOI) wafer, as shown in FIG. 42A, which may be fabricated via a commercial process known to those skilled in the art. For an SOI wafer, a silicon layer 2105 is already made on an insulating $SiO_2$ 2110 which is on top on a silicon substrate 2115. The fabrication of the VSDT+NSVGRIN ICMT structure according to one embodiment is now described.

Figure 42F:
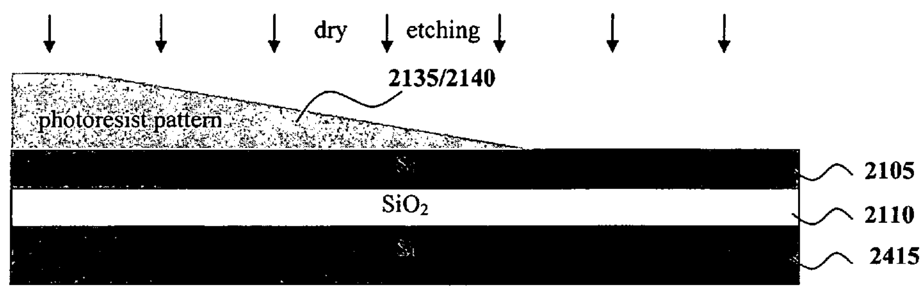
FIGS. 42A–N illustrate exemplary fabrication steps for the super mode transformation couplers of FIG. 40.
Figure 42G:
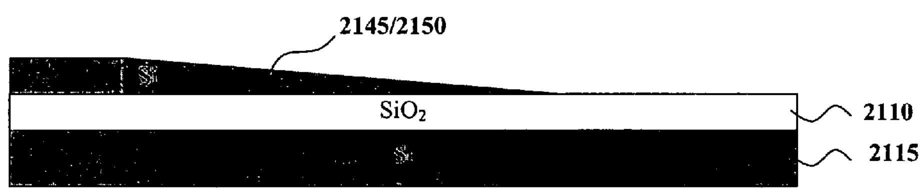
Figure 42H:
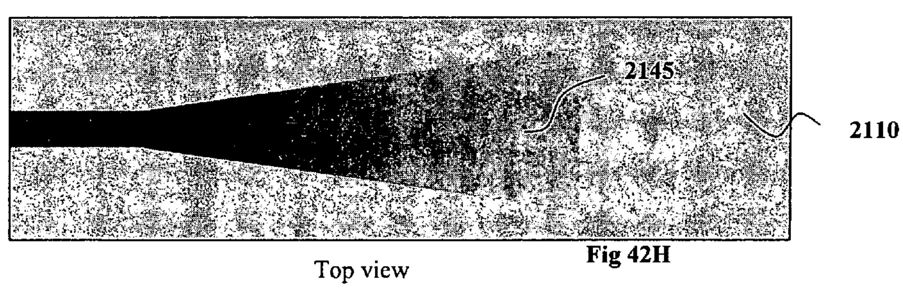
Figure 42I:
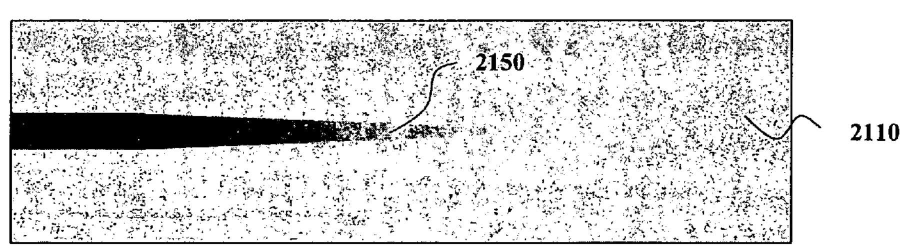

A Si taper may be fabricated by spin-coating a photoresist layer 2120 on the Si waveguide layer 2105, as shown in FIG. 42A. A mask pattern with a gray scale transparency along the longitudinal direction and also a laterally tapered up pattern 2125, as shown in FIG. 42B, or a laterally tapered down pattern 2130, as shown in FIG. 42C, can be used together with UV exposure and photoresist development to make a tapered photoresist pattern that is vertically tapered down and laterally tapered up (pattern 2135 in FIG. 42D) or down (pattern 2140 in FIG. 42E). Followed by dry etching, indicated in FIG. 42F, the tapered photoresist pattern 2135 or 2140 may be transferred to the high refractive index Si layer and form the corresponding Si section 2145 or 2150, shown in FIGS. 42G–I. The interface between the top Si layer and the lower $SiO_2$ layer may be used as a natural stop during the dry etching process. A shadow mask based dry etching or a diffusion-limited wet etching may also be used to form the Si taper.

Figure 42J:
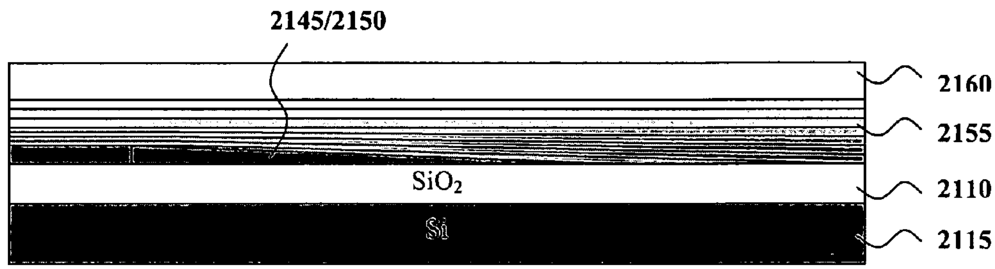

To form the top half of the vertically GRIN waveguide 2155, multiple layers of effective refractive-index-decreasing dielectrics may be deposited on top of the Si taper, as shown in FIG. 42J. Preferably photosensitive silica is spin-coated so that confinement of light in the horizontal/lateral direction may be easily achieved using UV imprinting. On the very top, a relatively thick (say 2 μm) silica layer 2160 may be deposited to act as an upper cladding.

Figure 42K:
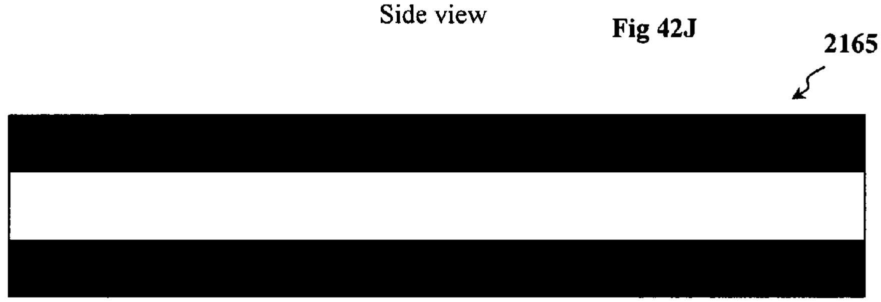
Figure 42L:
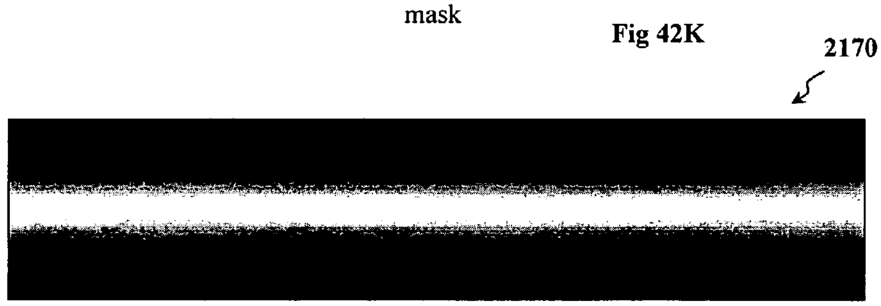
Figure 42M:
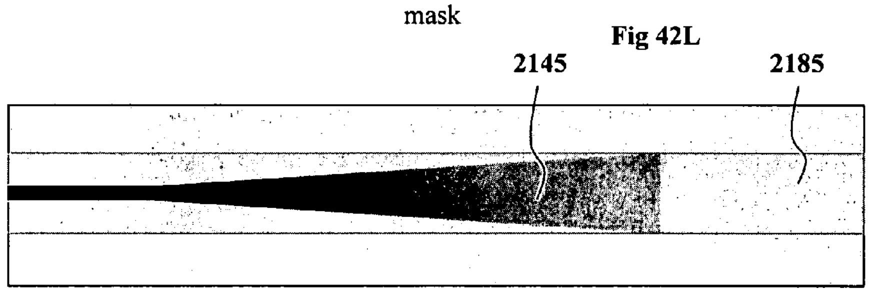

As has already been discussed, to form a dielectric channel waveguide with either a GRIN or step refractive index distribution in the lateral direction to confine light propagation, UV imprinting may be used as the deposited vertically GRIN film can be made photosensitive. In this respect, a step channel mask 2165, as shown in FIG. 42K, or a GRIN channel mask 2170, as shown in FIG. 42L, may be used to form a single-mode step channel waveguide 2185, as shown in FIG. 42M, or GRIN channel glass waveguide 2190, as shown in FIG. 42N, to confine light in the horizontal/lateral direction.

One skilled in the art will recognize that high efficiency coupling from the buried GRIN channel waveguide to a single mode optical fiber or vice versa is not a problem as the mode size is already designed to match that of a single mode fiber. The chief consideration is the location for this joining. Preferably, the fiber is made to butt-join the GRIN channel waveguide at a fully expanded/collimated location rather than a focused location. The fiber is also preferably located at the first fully expanded location from the tip of the Si taper, in order to reduce light propagation losses in the glass channel waveguide.

It should be understood that the above dimensions and exemplary lengths are presented for the purposes of illustrating a useful embodiment of the device 2100 and are not intended to limit other embodiments of any exemplary device, or the device 2100. A variety of dimensions and sizes can be used, depending on the application desired, as well as the fabrication materials, processes and technologies that are employed.

Also, it should be understood that the shapes of the waveguides or the taper (for example the shapes as defined by the surfaces dividing the cladding regions and the core regions) do not generally have to be linear or in the form of straight lines and planar surfaces. Curved shapes and different waveguide dimensions may be utilized as long as they achieve the same functions such as waveguiding or optical mode size transformation with similar topological connections. This applies for all the surfaces of the waveguide structures of the various embodiments of the present invention, including the side surfaces, the top and bottom surfaces, and the input/output surfaces.

In addition, it should be understood that the substrate is used to mechanically support the waveguide structures, and can be made up of irregular shapes, or structures, or materials as long as it serves the function of providing mechanical support for the waveguide structures.

Furthermore, it should be understood that the output ports can also be used as input ports and the input ports can be used as output ports. This is due to the reciprocal nature of light propagation in passive optical devices and hence the bi-directional nature of the devices.

It should be understood to those skilled in the art that the device 2100 can be fabricated on a different substrate other than a silicon substrate. In particular, it can be fabricated directly on InP or GaAs substrates used for making semiconductor photonic devices or integrated circuits and may be fabricated directly at the input/output ports of the photonic devices by sharing the same substrate as the photonic device.

Figure 43A:
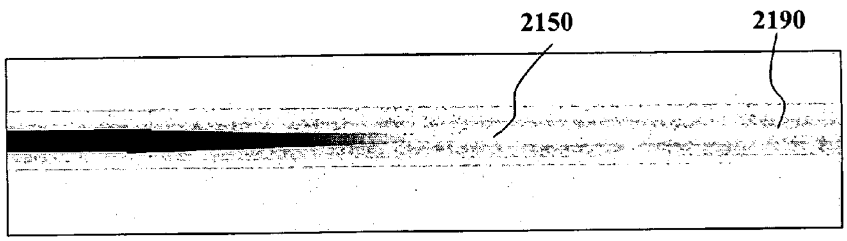
FIG. 43 is a result of a computer simulation of light propagation in a variation of the super mode transformation coupler of FIG. 40A.
Figure 43A:
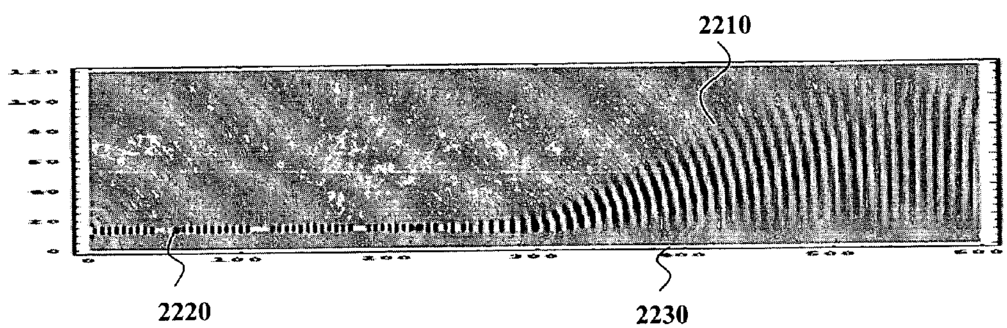
Figure 43B:
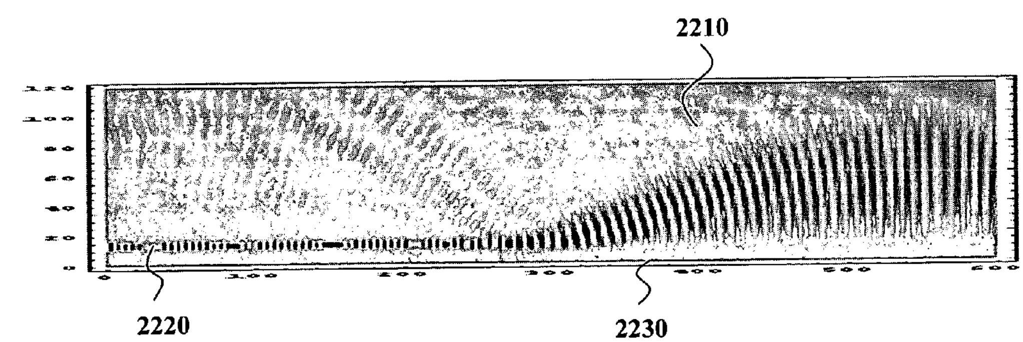

(10) Variations of Exemplary Devices and Integration of ICMT with V-(Grooves for Fiber Alignments Platform for Photonic Chips In the above mentioned exemplary combined module ICMTs that involve connecting a vertical sharp-down-taper waveguide core with a lower-refractive-index-contrast vertically graded waveguide, only two cases of placing the taper in the GRIN waveguide have been discussed, namely at the center of a symmetric GRIN waveguide or at the bottom of a half-GRIN waveguide. One skilled in the art will recognize that the GRIN waveguide need not to be restricted to these two cases. For example, the GRIN waveguide may have a refractive index distribution that is similar to the bottom half of a symmetric GRIN profile, and the taper can then be fabricated near the top of the GRIN waveguide. As another example, the GRIN waveguide can be three quarters of a symmetric GRIN profile; as long as the taper is fabricated near the high-refractive-index region of the GRIN profile, cascaded light beam expansion or reduction can be achieved. In fact, the GRIN waveguide may have an arbitrary profile, and the taper may be placed within a relatively large tolerance around the high-index region of the GRIN profile. FIG. 43 shows the structure and simulation results of light coupling from either side to the other. Note that compared to device 2100 of FIG. 40A, the Si taper 2210 is now shifted upward into the GRIN region 2220 and is buried above the lower cladding SiO2 layer 2230. It can be seen that the while the taper to the half GRIN waveguide coupling is basically not changed as compared to the previous case, there is a slight increase in the reverse direction light coupling efficiency.

Figure 44A:
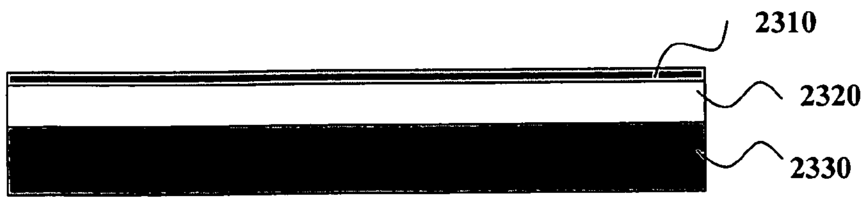
FIGS. 44A–C illustrate exemplary fabrication steps for a variation of the super mode transformation coupler of FIG. 40A.
Figure 44B:
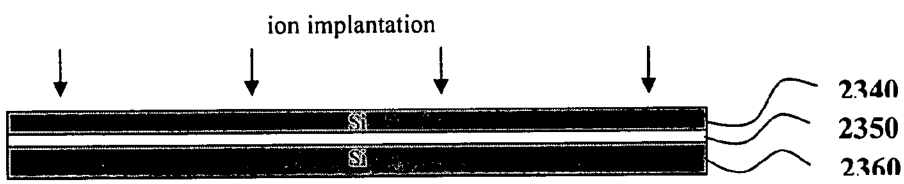
Figure 44C:
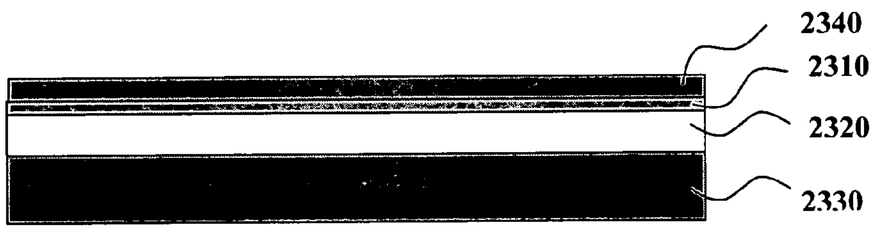

In terms of device fabrication, a silicon waveguide layer may be bonded on top of an X—$SiO_2$—Si structure illustrated in FIG. 44A. X may be a dielectric thin film 2310 with a refractive index equal to the GRIN waveguide core. $SiO_2$ layer 2320 is a lower cladding layer for the GRIN glass/polymer waveguide, and Si layer 2330 is the substrate. The structure can be easily achieved by, for example, sputtering a glass film 2310 on the SiO2—Si wafer 2320/2330. An ion-implanted silicon wafer with a structure of Si layer 2340 on ion-implanted layer 2350 on Si 2360, shown in FIG. 44B, can be flipped over and bonded with the X—SiO2—Si wafer. Si layer 2360 is lifted off as discussed previously, leaving the structure shown in FIG. 44C. The rest of the fabrication steps are similar to those described above for exemplary device 9, beginning with fabrication of a tapered waveguide core in Si layer 2340.

With respect to the various combined module ICMTs, at least three basic vertical structure configurations may be manufactured. While the symmetric GRIN waveguide structure offers the best coupling efficiency, it is the most challenging structure to fabricate as there is a need to bond an ion implanted Si wafer to a GRIN dielectric coated $SiO_2$—Si wafer. However, it should be understood that the sol-gel spin-coating approach described above is only one exemplary way to fabricate such a structure; modifications of the fabrication process can be made that may simplify the fabrication process. For example, instead of using the sol-gel technique described above, any other thin film deposition technique including flame hydrolysis, sputtering, Ion-Assisted Deposition, evaporation and chemical vapor deposition may be used to deposit the graded refractive index layers. As a result, the wafer-bonding can be relatively easily done as long as the bottom half of the GRIN waveguide is of high quality.

One preferred technique for simplifying fabrication is to first deposit a relatively thin dielectric film having a refractive index about equal to that of the GRIN waveguide core onto a SiO2—Si wafer before wafer bonding to an ion implanted Si wafer. For example, sputtering is a well-established process for depositing such films; as a sputtered film is relatively thin, it will be less challenging to wafer-bond an ion implanted Si wafer to a sputtered dielectric-$SiO_2$—Si wafer.

Another approach is to use a commercially available Si—$SiO_2$—Si or SOI wafer, make the top Si waveguide layer into a taper and spin-coat a half GRIN waveguide. Although the resulting light-coupling efficiency is slightly lower as compared to couplers with a full GRIN waveguide, the commercial availability of SOI wafers makes this a simple and easy option in terms of fabrication.

Figure 45A:
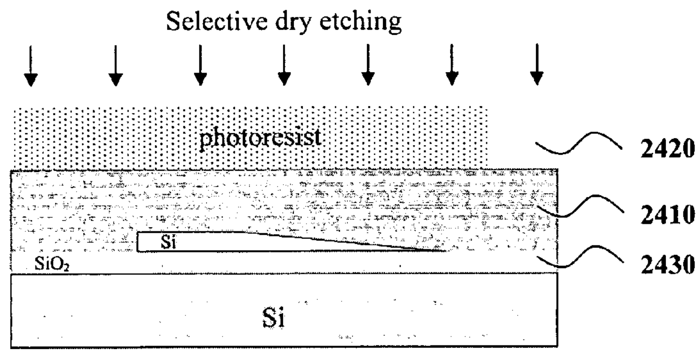
FIGS. 45A–C illustrate exemplary fabrication steps for mounting an optical fiber and a semiconductor optical device coupled by a super mode transformation coupler according to the present invention.
Figure 45B:
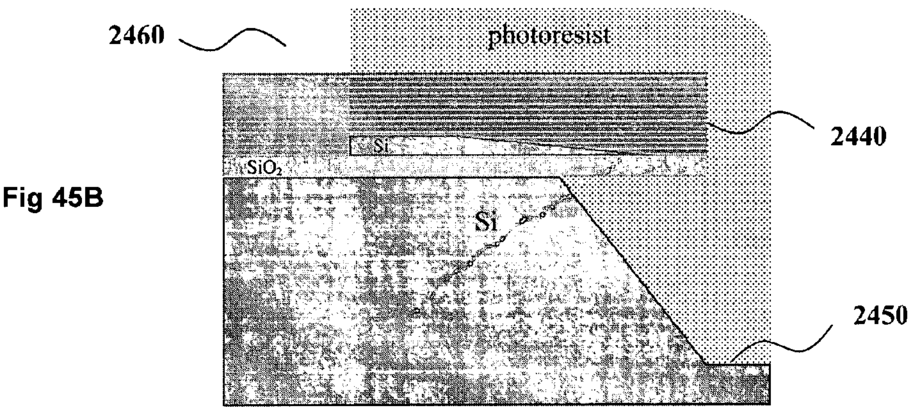
Figure 45C:
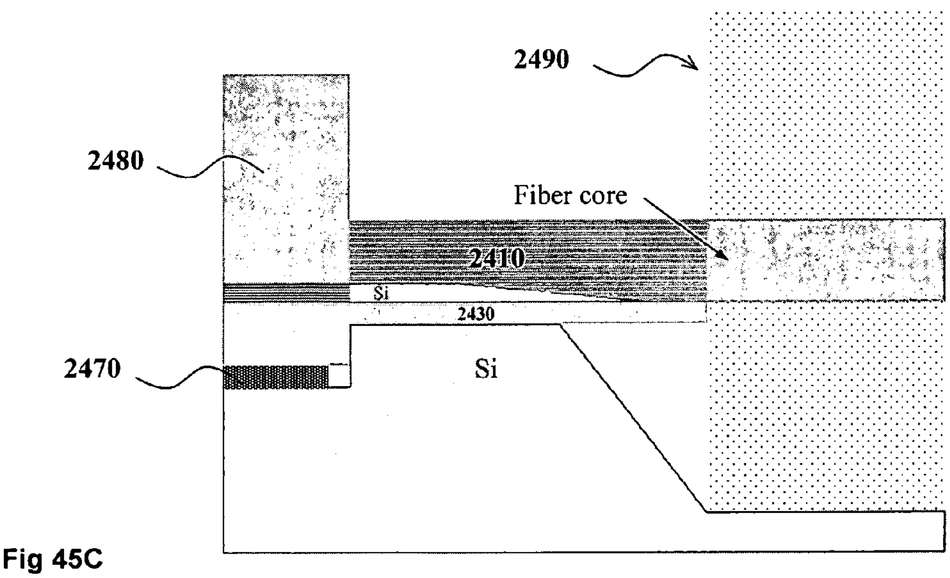

In terms of photonic chip mounting and optical fiber alignment with the couplers of the present invention, there are various options. FIGS. 45A-C illustrates one process. After the formation of channel waveguides in the vertically GRIN glass waveguide layer 2410 using, for example, UV imprinting, photolithography, as illustrated in FIG. 45A, can be used to define the Si V-groove wet etching opening 2420. Selective dry etching of the GRIN glass waveguide layer 2410 and the insulating $SiO_2$ layer 2430 can then be employed to define a vertical wall 2440 in the GRIN glass waveguide layer, and Si V-grooves 2450 can be wet etched through the dry etched V-groove openings, as shown in FIG. 45B. To fabricate a photonic chip recess, another photolithography process can be carried out to define the recess/well opening 2460. Dry etching can be carried out to etch the recess/well to a precise depth. FIG. 45C illustrates a section of the completed device. Metal contact pads 2470 as well as electrical conduction paths may be made by metal evaporation. Photonic chip 2480 may be mounted and soldered in the recess/well with slight heating to ensure good adhesion and electrical contact. The silicon wafer with the photonic chips attached and the Si V-grooves already made can be diced into small pieces. Subsequently, optical fiber arrays 2490 can be mounted in the Si V-grooves and fixed.

Figure 46:
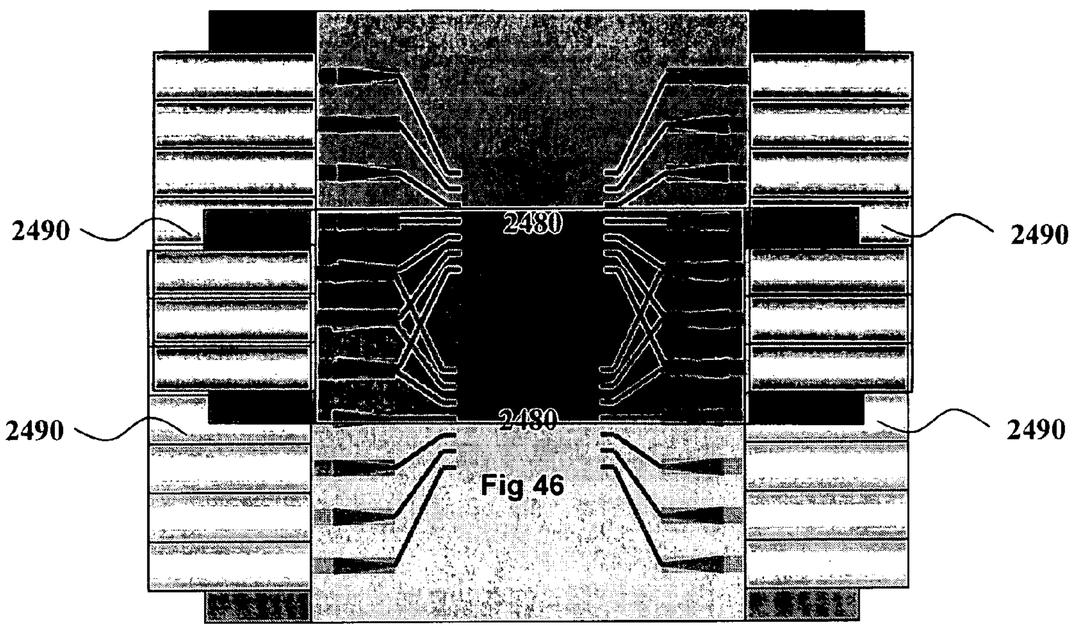
FIG. 46 illustrates a device in which a number of semiconductor optical devices are coupled to a number of optical fibers using super mode transformation couplers according to the present invention.

The process is readily adaptable to multiport devices, as illustrated in FIG. 46, where photonic chip 2480 may comprise one or more semiconductor optical devices connected by waveguides 2482 to multiport integrated couplers of the present invention 2484. These devices, in turn, couple to optical fibers 2490.

While the exemplary devices described above use a silicon substrate and a silicon based high refractive index taper, it should be understood that these materials are only meant to illustrate exemplary cases. The embodiments of the present invention also include the use of other suitable materials for the substrate and the high index waveguide core or taper, wherein these suitable materials include compound semiconductor based material such as gallium arsenide, indium phosphide and gallium nitride, or an optical crystal based material such as lithium niobate, lithium tantalate and barium titanate, or a dielectric material such high index glasses.

IV. Applications

The applications of the mode transformation couplers of the present invention are numerous as the technology addresses the bottleneck of the present photonic integrated circuit (PIC) technologies. Couplers are used in the pigtailing and packaging of almost all semiconductor and optical crystal based photonic devices, especially those with multi-function and multiple ports. One application is in optical communication, where a coupler can be used for the packaging of all kinds of semiconductor and optical crystal based devices including semiconductor lasers, modulators, switches, multiplexers/demultiplexers, amplifiers, power splitters and so on. Presently, there are a number of technologies that are producing these photonic devices, such as III–V-based OEICs, Si-based optical or photonic MEMS, SOI- and SiGe-based integrated optical systems. All these will need mode conversion couplers to link to each other and to the outside world.

Figure 47:
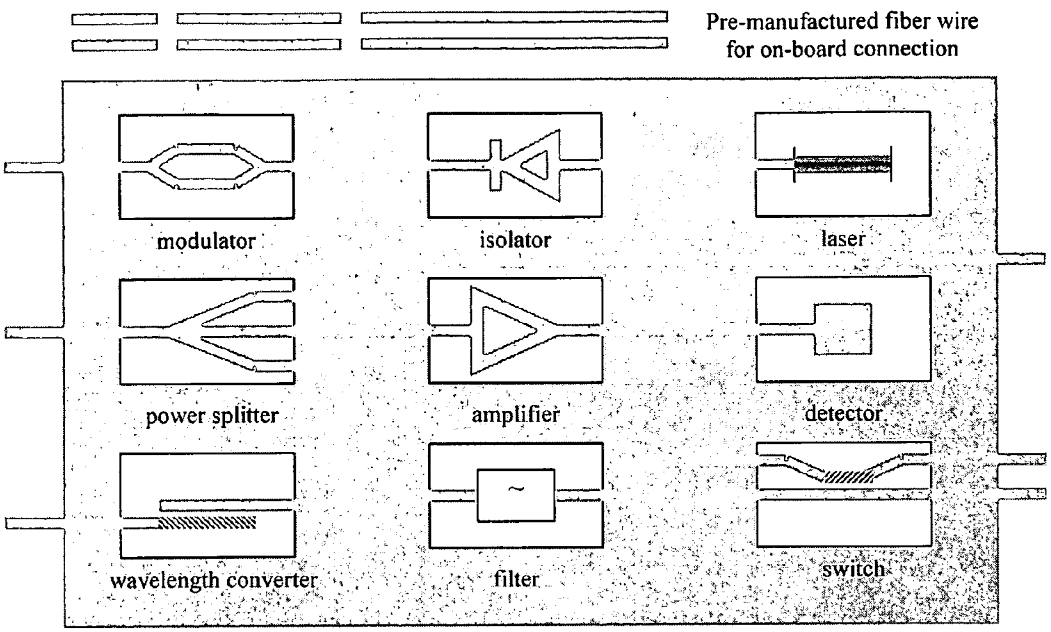
FIG. 47 is a schematic illustration of a photonic breadboard on which various integrated photonic chips are mounted and interconnected via coupler modules according to the present invention.

Another application is the concept of a photonic breadboard on which different integrated photonic chips are mounted and interconnected to one another via couplers of the present invention as shown in FIG. 47. Such an optical breadboard can be used to construct a system and test its function or performance before a fully integrated system chip is fabricated.

Note that a future trend of photonics is in the integration of multiple functional components on the same chip with multiple input and output ports to be connected to fiber arrays. In addition to optical communication, these chips will basically do the work that today is done by microelectronics chips, but at a much faster speed than their electronic counterparts. It can thus be foreseen that the cost of each component will drastically drop through photonic integration, as has happened for semiconductor-based electronics. The couplers of the present invention together with the associated packaging technology provide a significant reduction in the overall cost of such a multi-port photonic chip. The application areas of these photonic chips are potentially very wide, encompassing, for example, processors, computers, sensors, etc.

The foregoing description has provided exemplary embodiments of multiport integrated couplers and processes for fabricating these exemplary devices; these examples are intended to illustrate and not to limit the scope of the invention. One skilled in the art will recognize that various modifications are possible. For example, the waveguides are described with reference to coupling with particular optical devices such as semiconductor optical devices and optical fibers. One skilled in the art will recognize that the utility of the waveguides according to the present invention is not limited to the particular devices mentioned herein; indeed, the waveguides may be used with any optical device, and the dimensions of the waveguides may be varied for optimal matching to the optical device. Therefore, the scope of the present invention should be determined by the following claims, including their full range of equivalents.

What is claimed is:

1. An optical mode transformer comprising:

a substrate having a substrate surface;

a lower cladding disposed on the substrate surface, the lower cladding having a vertical refractive index having a vertical value that varies according to first substantially stepwise function of a y-coordinate, the y-coordinate representing a distance from the substrate surface, the first function having a maximum value and a minimum value, and the lower cladding having a horizontal refractive index having a horizontal value that varies according to first substantially stepwise function of an x-coordinate, the x-coordinate representing a position in a dimension parallel to the substrate surface and transverse to the long axis, the first function having a maximum value and a minimum value, the lower cladding further having an upper surface;

a transformer core disposed on the upper surface of the lower cladding, the transformer core having a core refractive index, the ratio of the core refractive index to the maximum value of the first function being at least about 1.3, the transformer core further having a first end located substantially at the small beam port, a second end defining an intermediate beam port, and an upper surface; and an upper cladding disposed on the upper surface of the transformer core and on the upper surface of the lower cladding, the upper cladding having a refractive index having a value that varies as a second function of the y-coordinate and of the x-coordinate, the second function having a maximum value and a minimum value, the ratio of the core refractive index to the maximum value of the second function being at least about 1.3, wherein the optical mode transformer is configured such that the transformer core has a first region with a vertical taper along the long axis, the vertical taper being a changing thickness of the transformer core in a dimension normal to the substrate surface, wherein the thickness decreases along the long axis from a first thickness value at a transition point away from the small beam port to a second thickness value at a second point near the intermediate beam port, the second thickness value being less than a critical thickness value, the critical thickness value being defined as a thickness value below which a significant portion of the energy of a light beam having a small mode size received at the small beam port and propagating in the transformer core penetrates into at least one of the upper cladding layer and the lower cladding layer, and wherein the vertical taper modifies a wavefront curvature of the light beam, thereby enlarging the small mode size.

2. The optical mode transformer according to claim 1, wherein the optical mode transformer is configured such that in a second region along the long axis between the small beam port and the transition point, the transformer core cross section has a thickness in a dimension normal to the substrate surface that is substantially constant and equal to a first thickness value, and in a third region along the long axis between the intermediate beam port and a large beam port, the transformer core cross section has a thickness that is approximately constant and equal to the second thickness value.

3. An optical mode transformer comprising:

a substrate having a substrate surface;

a lower cladding disposed on the substrate surface, the lower cladding having a refractive index distribution that varies according to a first function of a y-coordinate, the y-coordinate representing a distance from the substrate surface, the first function having a maximum value and a minimum value, the lower cladding further having an upper surface;

a transformer core disposed on the upper surface of the lower cladding, the transformer core having a center and a refractive index having a value that is graded in the y-coordinate and gradually decreases from a maximum effective refractive index at the center of the core to a minimum effective refractive index at an outer border of said transformer core, the y-coordinate representing a distance from the substrate surface, the transformer core further having a first end located substantially at a small beam port, a second end defining an intermediate beam port, and an upper surface; and an upper cladding disposed on an upper surface of the transformer core and on the upper surface of the lower cladding, the upper cladding having a refractive index distribution that varies as a second function of a y-coordinate, the second function having a maximum value and a minimum value, a ratio of the core refractive index to the maximum value of the second function being at least about 1.3, wherein the optical mode transformer is configured such that the transformer core has a first region with a vertical taper along a long axis of the transformer core, the vertical taper being a changing thickness of the transformer core in a dimension normal to the substrate surface, wherein the thickness decreases along the long axis from a first thickness value at a transition point away from the small beam port to a second thickness value at a second point near the intermediate beam port, the second thickness value being less than a critical thickness value, the critical thickness value being defined as a thickness value below which a significant portion of the energy of a light beam having a small mode size received at the small beam port and propagating in the transformer core penetrates into at least one of the upper cladding layer and the lower cladding layer, and wherein the vertical taper modifies a wavefront curvature of the light beam, thereby enlarging the small mode size.

4. The optical mode transformer according to claim 3, wherein the transformer core has a refractive index that is graded in an x-direction and gradually decreases from a maximum effective refractive index at the center of the core to a minimum effective refractive index at the outer border of said transformer core, an x-coordinate representing a distance transverse to said y-coordinate and perpendicular to the long axis.

5. The optical mode transformer according to claim 4, wherein for any value of the y-coordinate, the first function is a stepwise function of the x-coordinate having substantially a first value in a first range of x-coordinate values, substantially a second value in a second range of x-coordinate values, and substantially the first value in a third range of x-coordinate values, wherein the second value is higher than the first value and wherein the transformer core is located at a position having x-coordinate values within the second range, wherein the x-coordinate is in the axial direction parallel to the surface of said optical mode transformer and perpendicular to a light propagation direction of the light through the optical mode transformer.

6. The optical mode transformer according to claim 3, wherein the transformer core further has a lateral taper along the direction of light propagation, the lateral taper causing a width of the transformer core in a dimension parallel to the substrate surface and transverse to the direction of light propagation to increase from a first width value to a second width value, the second width value being substantially equal to a desired large mode size of a light beam.

7. The optical mode transformer according to claim 3, wherein the transformer core has a lateral taper along the direction of light propagation, the lateral taper causing a width of the transformer core to decrease from a first width value to a second width value, the second width value being smaller than a critical width value, the critical width value being defined as a width value below which a significant portion of the energy of a light beam having a small mode size received at the small beam port and propagating in the transformer core penetrates into the cladding, thereby enlarging the small mode size.

8. The optical mode transformer according to claim 3, further comprising a low refractive index buffer layer between the transformer core and the upper or lower cladding.

9. The optical mode transformer according to claim 3, wherein the optical transformer is configured such that in a second region along the long axis between the small beam port and the transition point, the transformer core cross-section has a thickness in a dimension normal to the substrate surface that is substantially constant and equal to a first thickness value, and in a third region along the long axis between the intermediate beam port and a large beam port, the transformer core cross section has a thickness that is substantially constant and approximately equal to the second thickness value.

10. The optical mode transformer according to claim 9, wherein: a light beam having a small mode size enters the optical transformer at the small beam port, the small mode size being substantially equal to a mode size of a semiconductor optical device; the light beam is modified to have an intermediate mode size as it passes through the first region; and the light beam is further modified to have a large mode size as it passes through the third region, the large mode size being substantially equal to a mode size of an optical fiber.

11. The optical mode transformer according to claim 9, wherein: a light beam having a large mode size enters the optical transformer at the large beam port, the large mode size being substantially equal to a mode size of an optical fiber; the light beam is modified to have an intermediate mode size as it passes through the third region; and the light beam is further modified to have a small mode size as it passes through the second and first regions to the small beam port, the small mode size being substantially equal to a mode size of a semiconductor optical device.

12. The optical mode transformer according to claim 9, wherein: a recess is formed in the substrate near the small beam port, the recess being configured for mounting of a semiconductor optical device in alignment with the small beam port; and a groove is formed in the substrate near the large beam port, the groove being configured to hold an optical fiber in alignment with the large beam port.

13. The optical mode transformer according to claim 12, wherein a semiconductor optical device is mounted in the recess.

14. The optical mode transformer according to claim 12, wherein an optical fiber is mounted in the groove.

15. The optical mode transformer according to claim 9, wherein: the first function and the second function are chosen such that the upper and lower cladding provide a lens function in the third region, whereby a light beam propagating from the small beam port to the large beam port is caused to be enlarged and collimated.

16. The optical mode transformer according to claim 9, wherein: the first function and the second function are chosen such that the upper and lower cladding provide a lens function in the third region, whereby a light beam propagating from the large beam port to the small beam port is caused to be reduced and focused onto the intermediate beam port.

17. The optical mode transformer according to claim 3, wherein the lower cladding comprises a first plurality of lower cladding layers substantially parallel to the substrate, wherein each lower cladding layer has a layer-specific refractive index that is a function of the y-coordinate; and the upper cladding comprises a second plurality of upper cladding layers, wherein each upper cladding layer has a layer-specific refractive index that is a function of the y coordinate.

18. The optical mode transformer according to claim 17, wherein, for any value of the y-coordinate, the effective layer-specific refractive index of each of the first plurality of lower cladding layers is higher than the layer-specific refractive index of the lower cladding layer below; and wherein the effective layer-specific refractive index of each of the second plurality of upper cladding layers is lower than the layer-specific refractive index of the upper cladding layer below.

19. The optical mode transformer according to claim 17, wherein the layer-specific refractive index of each of the first plurality of lower cladding layers forms a first refractive-index distribution that is symmetric with a second refractive index distribution formed by the layer-specific refractive index of each of the second plurality of upper cladding layers.

20. The optical mode transformer according to claim 19, wherein the first and second distributions together comprise a substantially parabolic distribution.

21. The optical mode transformer according to claim 19, wherein the first function has a substantially parabolic dependence on the y-coordinate and the second function has a substantially parabolic dependence on the y-coordinate.

22. The optical mode transformer according to claim 3 wherein: the difference between the maximum value of the first function and the minimum value of the first function is not less than about 0.02; and the difference between the maximum value of the second function and the minimum value of the second function is not less than about 0.02.

23. The optical mode transformer according to claim 4, wherein the first function is a constant function of the y-coordinate, and the upper cladding comprises a plurality of upper cladding layers substantially parallel to the substrate, wherein each upper cladding layer has a layer-specific refractive index that is a function of the x-coordinate.

* * * * *